US008086467B2

(12) United States Patent
Jin et al.

(10) Patent No.: US 8,086,467 B2
(45) Date of Patent: Dec. 27, 2011

(54) PROCESS MANAGEMENT SUPPORT SYSTEM AND SIMULATION METHOD

(75) Inventors: Yan Jin, Arcadia, CA (US); Yoshitaka Fukuo, Kanagawa (JP); Masayuki Kawase, Ibaraki (JP); Yoichiro Suzuki, Chiba (JP)

(73) Assignee: Japan Marine Science Inc., Kawasaki-Shi (JP)

( * ) Notice: Subject to any disclaimer, the term of this patent is extended or adjusted under 35 U.S.C. 154(b) by 0 days.

(21) Appl. No.: 12/810,771

(22) PCT Filed: Dec. 28, 2007

(86) PCT No.: PCT/JP2007/075269
§ 371 (c)(1),
(2), (4) Date: Oct. 6, 2010

(87) PCT Pub. No.: WO2009/084102
PCT Pub. Date: Jul. 9, 2009

(65) Prior Publication Data
US 2011/0022538 A1    Jan. 27, 2011

(51) Int. Cl.
*G06Q 10/00* (2006.01)
*G06F 17/50* (2006.01)
*G06F 9/44* (2006.01)
(52) U.S. Cl. .......................... 705/1.1; 705/7
(58) Field of Classification Search ........................ None
See application file for complete search history.

(56) References Cited

U.S. PATENT DOCUMENTS
5,764,543 A * 6/1998 Kennedy .................... 703/2

FOREIGN PATENT DOCUMENTS
JP   09-016686 A   1/1997

OTHER PUBLICATIONS

Okano Tomoka, "Microsoft Project Version 2002 at a Glance (a Microsoft official practical guide)" 59, 88, & 89 (2002).
Microsoft Press, "Microsoft Office Project 2003: Official Manual Client Version (a Microsoft official practical guide)" 113 (2004).
Microsoft Corporation, "Microsoft® Project 2000 for Windows®" 151-57 (2000).
James E. Kelley, Jr., et al. "Critical path planning and scheduling" Proc. Eastern Joint Computer Conf. 160-73 (1959).
Manuel Laguna & Johan Marklund, "Business Process Modeling, Simulation, and Design" 24-38 (2005).

(Continued)

*Primary Examiner* — Jonathan Ouellette
(74) *Attorney, Agent, or Firm* — Edwards Wildman Palmer LLP; Peter C. Schechter; Brian R. Landry

(57) ABSTRACT

There is provided a process management support system and the like which supports searching continuously a business process appropriate to a change of the external environments. The system defines an action of a CLIENT 103 as a mode of progress of client operations (COPs), and correlates each COP to each SERVICE 104 of a service provider 101. In a simulation, the COP to be executed is specified based on the defined mode of progress of COPs, and a request for the SERVICE 104 is made occur from the specified COP under a predetermined condition. Then, each time the request occurs, the SERVICE 104 correlated to the specified COP is provided to the CLIENT 103 from which the request occurred.

19 Claims, 41 Drawing Sheets

OTHER PUBLICATIONS

Ueli Wahli, et al., "Business Process Management: Modeling through Monitoring Using WebSphere V6.0.2 Products" (2007).
Geoff Cohen "The Virtual Design Team: An Information Processing Model of the Design Team Management," (Doctoral Thesis) (Stanford University, Dep't of Civil Eng.) (1992).
Yan Jin & Raymond E. Levitt, "The Virtual Design Team: A Computational Model of Project Organizations," published at 2(3) Computational & Mathematical Organization Theory 171-96 (1996).
John C. Kunz, et al., "The Virtual Design Team: A Computational Simulation model of Project Organizations," published at 41(11) Communications of the Association for Computing Machinery 84-92 (1998).
Andrew Greasley, "Simulation Modeling for Business" 3-6 (2004).
International Search Report for International Application No. PCT/JP2007/075269 (Feb. 26, 2008).
Decision of Refusal, Japanese Patent Application No. 2008-514262 (Jun. 30, 2009).
"System Simulation by Visual SLAM" 186-92 (2001).

* cited by examiner

FIG. 8A
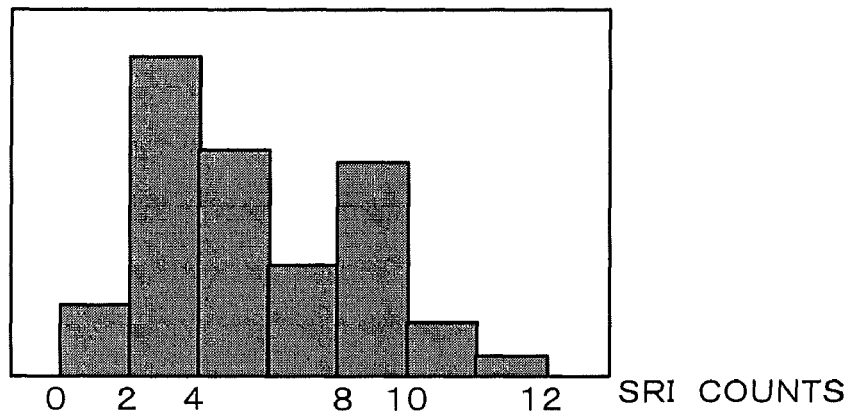
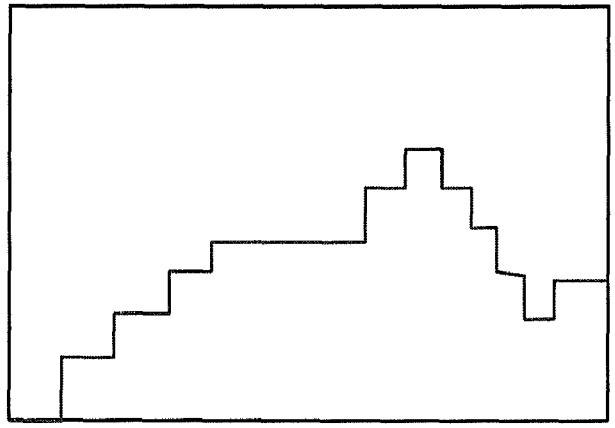

FIG. 8B
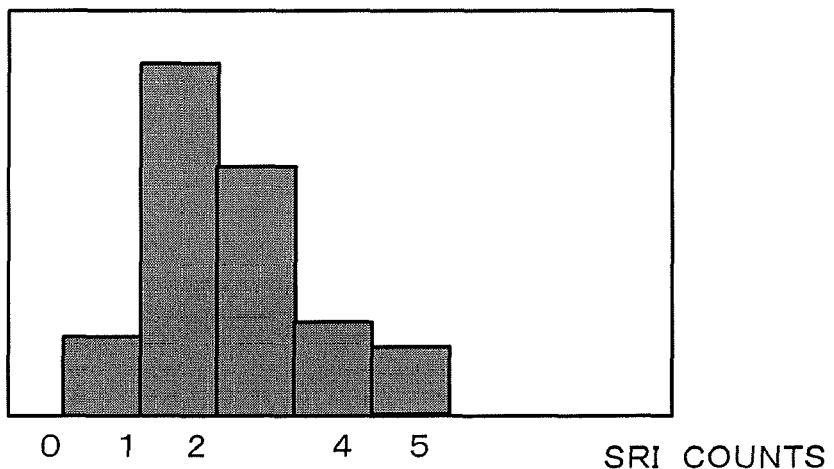
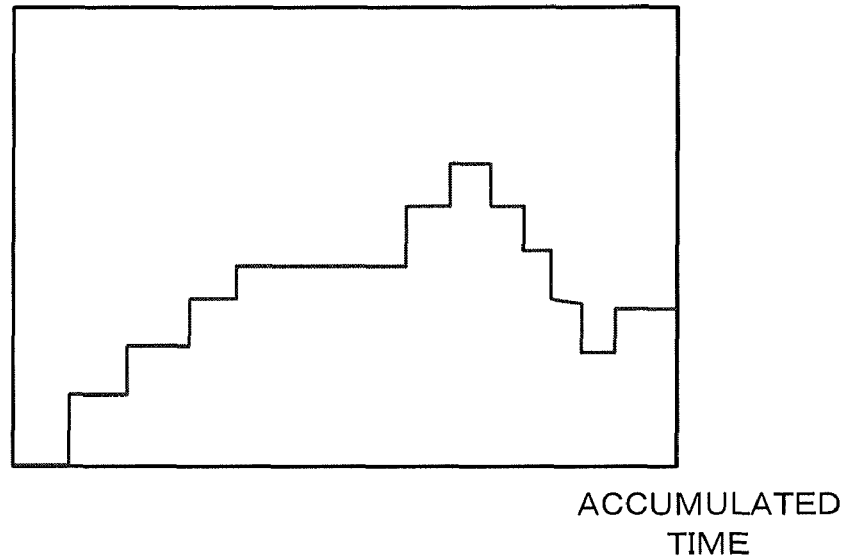

|  | SOP130a | | | | SOP130b | | | | TOTAL WORK VOLUME | % |
|---|---|---|---|---|---|---|---|---|---|---|
|  | TIME | WORKFORCE | WORK VOLUME | % | TIME | WORKFORCE | WORK VOLUME | % | | |
| DIRECT WORK | 100 | 5 | 500 | 60.6 | 80 | 2 | 160 | 50.0 |  | 57.6 |
| COMMUNICATION | 20 | 5 | 100 | 12.1 | 20 | 2 | 40 | 12.5 | 140 | 12.2 |
| REWORK | 25 | 5 | 125 | 15.2 | 30 | 2 | 60 | 18.8 | 185 | 16.2 |
| DECISION WAIT | 15 | 5 | 75 | 9.1 | 20 | 2 | 40 | 12.5 | 115 | 10.1 |
| IDLE | 5 | 5 | 25 | 3.0 | 10 | 2 | 20 | 6.2 | 45 | 3.9 |
| TOTAL ACTUAL WORK VOLUME |  |  | 825 | 100.0 |  |  | 320 | 100.0 | 1145 | 100.0 |

FIG. 10
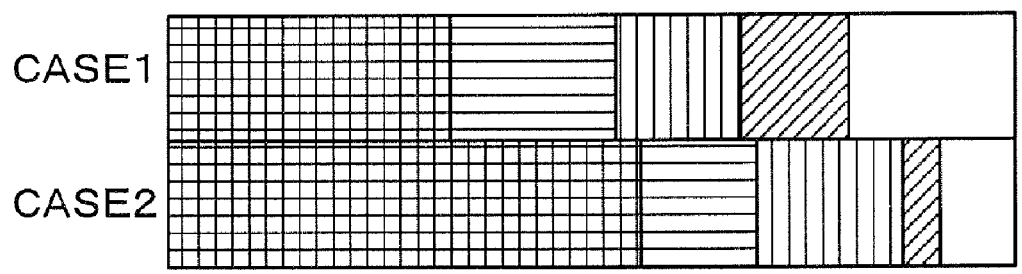
 DIRECT WORK
 REWORK
 COMMUNICATION
 DECISION WAIT
 IDLE

FIG. 17A

| CLIENT | BRANCH DESTINATION |
|---|---|
| NEW VESSEL | ANALYSIS OPERATON(NEW) |
| OLD VESSEL | ANALYSIS OPERATON(OLD) |

FIG. 17B

DECISION1

| NEXT OPERATION | % |
|---|---|
| EXIT | 80 |
| MEASURES OPERATION (NEW) | 20 |

DECISION2

| NEXT OPERATION | % |
|---|---|
| EXIT | 60 |
| MEASURES OPERATION (OLD) | 40 |

FIG. 17C

| | | SOP NAME | |
|---|---|---|---|
| | | ANALYSIS OPERATION | MEASURES OPERATION |
| NEW | SOP EXPECTED WORK VOLUME | 1 human-time | 5 human-time |
| OLD | SOP EXPECTED WORK VOLUME | 1 human-time | 5 human-time |

FIG. 19A

SOP COMPLEXITY

SKILL LEVEL
(WITHIN SKILL FIELD)

|  | LOW | MIDDLE | HIGH |
|---|---|---|---|
| LOW | 1.0 | 0.9 | 0.7 |
| MIDDLE | 1.1 | 1.0 | 0.9 |
| HIGH | 1.3 | 1.1 | 1.0 |

FIG. 19B

SOP COMPLEXITY

SKILL LEVEL
(EXCEPT SKILL FIELD)

|  | LOW | MIDDLE | HIGH |
|---|---|---|---|
| LOW | 0.5 | 0.3 | 0.3 |
| MIDDLE | 0.6 | 0.5 | 0.4 |
| HIGH | 0.7 | 0.6 | 0.5 |

FIG. 19C

| EXECUTION ABILITY | FACTOR |
|---|---|
| R1 | 1 |
| R2 | 1.2 |
| R3 | 1.4 |
| R4 | 1.6 |
| R5 | 1.8 |

FIG. 20A

SOP COMPLEXITY

| | | LOW | MIDDLE | HIGH |
|---|---|---|---|---|
| SKILL LEVEL (WITHIN SKILL FIELD) | LOW | 1.0 | 1.2 | 1.8 |
| | MIDDLE | 0.8 | 1.0 | 1.2 |
| | HIGH | 0.7 | 0.8 | 1.0 |

FIG. 20B

SOP COMPLEXITY

| | | LOW | MIDDLE | HIGH |
|---|---|---|---|---|
| SKILL LEVEL (EXCEPT SKILL FIELD) | LOW | 1.4 | 1.6 | 1.8 |
| | MIDDLE | 1.3 | 1.4 | 1.5 |
| | HIGH | 1.2 | 1.3 | 1.4 |

FIG. 21
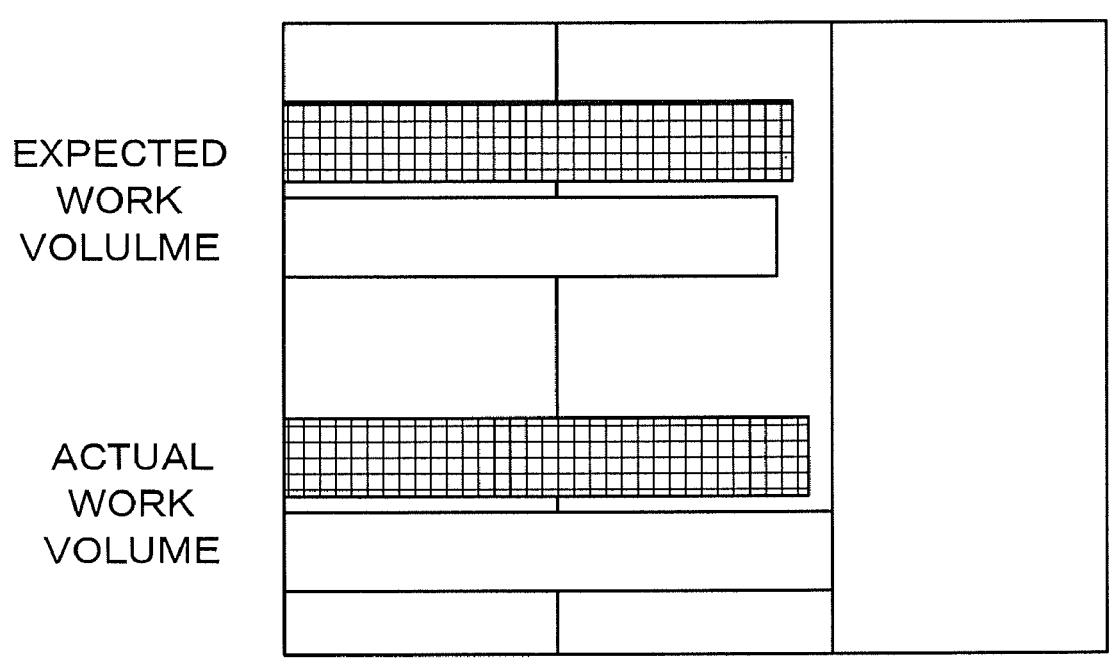
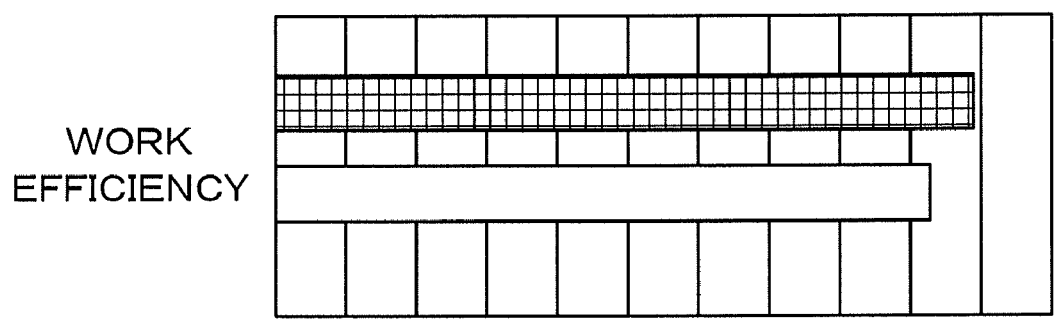
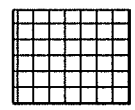 CASE1
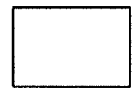 CASE2

CASE1

CASE2

| NAME | WORKFORCE |
|---|---|
| MEMBER AAA | 0.5 |
| MEMBER BBB | 0.5 |

1100b

| NAME | WORKFORCE |
|---|---|
| MEMBER CCC ▼ | 0.5 |

ADD

1100a

EDIT

OK

PROCESS MANAGEMENT SUPPORT SYSTEM AND SIMULATION METHOD

CROSS-REFERENCE TO RELATED APPLICATION

This application is the national phase application pursuant to 35 U.S.C. §371 of International Application No. PCT/JP2007/075269, filed Dec. 28, 2007. This application is hereby incorporated herein by reference in its entirety.

TECHNICAL FIELD

The present invention relates to a process management support system and a simulation method on the system, where forecasts and evaluations are executed with respect to a business performance by designing and simulating a business process.

BACKGROUND ART

In order to find out a business process, and further a management strategy, appropriate to the environments surrounding an enterprise. Various business process modeling tools and simulation & analysis tools thereof are developed. Generally, there are a project type and a process type as a business type. In the project-type business, it takes a comparatively long time to handle one order, a frequency of accepting order is small and a way of working is different depending on the order. Accordingly, in this type of business, for the orders one by one, a way of working suitable to each order is planned as a project. On the other hand, in the process-type business, it takes a comparatively short time to handle one order, a frequency of occurring the order is big, and the way of handling can be classified by a specific operation process (a service). Accordingly, for this type of business, a way is designed for each service to handle a lot of orders. Business process modeling tools based on conventional techniques are provided to each of the two different business types. In what follows, a tool for the project-type business is referred to as a project design tool, and a tool for the process-type business is referred to as a process design tool.

First, as the project design tool, it is known that necessary works for a specific procedure are defined by using network diagrams and arrow diagrams, and the order of the works and the allocation of human resource to be injected can be planned (for example, cf. a non-patent document 1 to a non-patent document 4). In these tools, it is possible to simulate a load for each of workforces and a logical shortest term when handling one order, by easy calculations like the Loading and the Leveling based on the workforces and the Positions thereof. However, since this simulation is a simple calculation, stochastic dispersion, such as a delay due to various kinds of uncertainness which could occur through operations of the work, is not reflected in the result.

On the other hand, in a part of the process design tools for modeling such as an industry process and evaluating the model, work operations appropriate to a type of each order are defined with respect to a plural orders which discretely occur, and it is possible to plan and evaluate the procedure of the operations and an allocation of human and the other resources to be injected (for example, cf. non-patent documents 5 and 6). In these tools, objects having various functions, such as an occurrence of event, a retainment of event, a waiting queue of event, a conditional branch, a divide or a combination of event, and an elimination of event, are combined, the process of the combined objects is modeled in detail, and the Monte Carlo simulation is executed. Thereby, it is possible to reflect the stochastic dispersion in the result due to the uncertainness. In these tools, though it is possible to model various processes freely and in detail by the various functions of the objects, the model becomes complicated and intricate due to the freedom, which impairs visibility and sharability which are important aims of modeling. Moreover, the items obtained as a result of the simulation are basic ones for an event driven simulation such as an interval of events, waiting queues, and rates. Although a user can set his/her own evaluation markers uniquely, common and important evaluation markers for a business process are not defined.

In these years, a method is suggested, in which a business process is represented by a rule based on the Object Oriented such as UML to improve the visibility and the sharability of the models. In accordance with this movement, there is such a tool coming onto a market as defines models to conceptualize a actual business process, executes the design and the Monte Carlo simulation by the objects defined with these models, and can obtain the result thereof. In the tools to be provided as the process design tool within this-type tools, there is a tool in which a part of the business process is modeled based on a start and end of the process, a branch of the process by conditions, each of works for constituting the process and a human resource for executing the works (for example, cf. a non-patent document 7). In the simulation, a work to be executed is made occur as an order by occurring an event at a start object of the process. The work which has occurred is handled in accordance with the defined process, and is eliminated at the end of the process. At this moment, by giving a stochastic dispersion to the operation time, it is possible to reflect the uncertainness in the simulation result. Moreover, in these tools, time, money and the like to be spent necessary for handling one work are provided as a scale for evaluating a modeled business process.

Moreover, among the project design tools, there is some tools which provides project models in which a relation between a structure of the project and objects thereof is defined clearly, behavior models in which the uncertainness and motions thereof to be reflected in a simulation result are defined clearly, and evaluation markers which is defined for evaluating this simulation result are included (for example, cf. a non-patent document 8 to a non-patent document 10). In the project model, the project is defined by objects, such as a start and end of the project, a work necessary for completing the project, the Position allocated to the work, and a milestone, and a relation between the objects. In the behavior model, there are defined motions relating to the occurrences and the operations, and characteristics of the events such as a Work Item, an Exception Item, and the Communication Item, the events occurring during the simulation and being handled by the Positions. Thereby, the uncertainness to give influence to a project performance, such as term, cost and quality, are modeled.

The work item occurs regularly from the work object in accordance with a schedule of the work object, and is handled by the allocated Positions. The time required for this operation is determined by a characteristic of the work object (a difficulty level of the work and a required skill) and a characteristic of the allocated Positions (experience and a skill level). The except item occurs under a probability to be determined by an occurrence probability of Exceptions to be expected, a characteristic of the work object (a difficulty level and a required skill), a characteristic of the allocated Positions (experience and a skill level), and a state of the Information Exchange. The Positions, to the except item which has occurred, execute any one of operations which are the Rework, the Modify, and the Ignore. It is determined probabilistically in accordance with a characteristic of the organization (centralization) which one of the operations will be executed. The Information Exchange item occurs under a probability which is determined by information exchange to be expected, a characteristic of the work object (uncertainty), and a characteristic of the allocated Positions (experience). The Position treats the Information Exchange Item which has occurred under the probability determined by a characteristic of the organization (formalization). In an organization emphasizing the formalization, a lateral communication is not good. Accordingly, the probability of handling the Information Exchange item becomes lower.

As the evaluation scale for the project design, term, cost and quality are defined. The term and the cost are defined as time required to complete all works and as a total of the products of the Position injected during the term and a unit value of the Position respectively. The quality is measured depending on a way of treating the Exception which is the uncertainness and the Information Exchange. Concretely, the quality is determined in accordance with ratios of the handled Exceptions and Information Exchange items to these items which has occurred respectively. This scaling of quality is made possible due to an existence of a Behavior model. Moreover, as an analysis method of a designed project, the following markers are prepared, a work duration of each work, a work breakdown (The Direct Work, the Rework, the Information Exchange and the Decision Wait) and a change of the Backlog Volume.

Non-patent document 1: At a glance You can tell Microsoft Project Version 2002 (a Microsoft official practical guide), Okano Tomoka, Microsoft Press (Nikkei BP soft press), 2002.

Non-patent document 2: Microsoft Office Project 2003 Official manual client version (a Microsoft official practical guide), E-Trainer.jp, Microsoft Press (Nikkei BP soft press), 2004.

Non-patent document 3: Micro Project 2000 User's guide, Microsoft Co., 2000.

Non-patent document 4: KELLEY, JAMES E., JR., AND MORGAN R. WALKER. Critical path planning and scheduling. Proc. Eastern Joint Computer Conference (1959), 160-173.

Non-patent document 5: Business Process Modeling, Simulation, and Design, Manuel Laguna, Johan Marklund, Prentice Hall, 2005

Non-patent document 6: Simulation Modelling for Business, Andrew Greasley, Ashgate Publising, February 2004.

Non-patent document 7: Business Process Management: Modeling through Monitoring Using WebSphere V6.0.2 Products, 2007.

Non-patent document 8: The Virtual Design Team: An Information Processing Model of the Design Team Management, Cohen, G. P., Unpublished Ph.D Thesis, Stanford University, 1992.

Non-patent document 9: The Virtual Design Team: A Computational Model of Project Organizations, Jin Y. and R. E. Levitt, Computational and Mathematical Organization Theory, 2(3), 171-196.

Non-patent document 10: The Virtual Design Team: A Computational Simulation Model of Project Organizations, JOHN C. KUNZ2, RAYMOND E. LEVITT, YAN JIN, Communications of the Association for Computing Machinery, 41(11), pp 84-92, 1998.

DISCLOSURE OF THE INVENTION

Problem to be Solved by the Invention

As mentioned above, as a project design tool for a project-type business, there is a tool in which a project model and an evaluation scale thereof are defined clearly, and the uncertainness such as the Behavior model is also defined clearly. However, in process design tools utilized in the process-type business, there is only a tool, the visibility and the sharability of which are improved by UML. That is, there is no process design tool in which various kinds of uncertainness, which at the moment of handling an order, could give influence to the quality, the cost and the fulfillment delivery time of the operation, and evaluation markers have been defined clearly. Moreover, it is impossible to apply the definitions in the project-type business process to the process-type business process as it is.

Further, any tools take only elements existing inside an enterprise such as an operation process of an into account, and there is no tool as of yet which takes external environments of an enterprise into account. The environments are environments (markets) around the enterprise which, in light of an original purpose that is an continuous improvement of business process, could become a motivation of the improvement. In other words, though it is possible to search an appropriate process to a specific problem, it is impossible to design an appropriate process as an enterprise strategy and a management strategy to various external environments around an enterprise. Namely, there is no tool which has a model defining a business process including the external environments such as customers that are a source of orders to be handled by the business process. As mentioned above, with respect to the process-type business, there is no tool for addressing the important proposition, "searching continuously a business process appropriate to a change of the environments around the enterprise" for the purpose of the enterprise strategy and management strategy.

Then, it is a purpose of the present invention to provide a process management support system and a simulation method thereof which supports searching continuously a business process appropriate to a change of the external environments for the enterprise strategy and management strategy with respect to the process-type business.

Means for Solving the Problem

A process management system solves the above problems by being configured as follows: a process management support system for simulating a business process that a service provider provides a service to at least one client to evaluate the business process, comprising: a client definition portion to define contents of action of each of the clients; a service definition portion to define with respect to a service to be provided by the service provider; and a simulation portion to simulate a process flow in which a request of service occurs due to the action of each client in a predetermined period, and the service is provided by the service provider, wherein the client definition portion has: a COP definition device to correlate a plurality of actions executed by each client to a plurality of client operations (COP) respectively and define for each client, a mode of progress of the COPs at the moment of the simulation; a COP correlating device to correlate each of the plurality of COPs to a service to be provided by the service provider to each of the COPs; and an occurrence conditions definition device to define a condition for making a request of service occur from each of the COPs, the service definition portion has an SOP definition device to define a procedure that the service provider provides the service correlated to the COP by using a plurality of service operations (SOP) to be executed in a predetermined sequence, and the simulation portion has: a client operation progress device to specify a COP to be executed based on the mode of progress for each of the clients; a request occurrence device to make a request of the service occur based on the condition, the service being correlated to the COP specified by the client operation progress device; and a service provision device to, each time when the request occurs, with respect to the service correlated to the specified COP, execute operations for providing the service in accordance with the procedure defined by the SOP definition device.

The process management system of the present invention has the client definition portion and defines clearly the action of the client who requires a service. When the mode of progress in the simulation of client operations (COP) each of which corresponds to each action of the client is defined in the same way as actual actions by the COP definition device, it is possible to simulate the actual action of the client by the client operation progress device. Then, if the condition for making each COP occur a request for a service is set in the same way as the condition for requiring the service in the actual action, by the request occurrence device, also in the simulation, it is possible that the request for the service is made occur from the client under the condition. The service provision portion provides the service to the client replying to the occurrence of the request due to the request occurrence device. Accordingly, according to the present invention, it is possible to make a request for a service occur on the action of the client, and simulate a mode of the process-type business for providing the service replying to the request. Thereby, it is possible to obtain a simulation result based on the different timings of the request, the different numbers of requests depending on the client. Moreover, if the external environments surrounding the enterprise, such as a condition of market, social needs, a legal system, and a technology progress, are defined as a motion of the client operations, it is possible to model various changes of market which the enterprise should address. As a result of this, it is possible to search the best business process.

The mode of progress of COPs includes, for example, a sequence that the COP comes into a state of acting on the simulation, a period, a priority level, and a condition to come into the state of acting. The condition for making the request of service occur includes, for example, a predetermined period, a occurrence ratio of request based on past results, a state of a predetermined item, and also a condition using a random number. As a method of defining each service by the service definition portion, the method in conventional bushiness process modeling tools can be applied. As a method of evaluating a business process, the general methods for evaluating an actual business process can be applied.

The COP correlating device may define for each of the requests which occur from each COP, attributes of the request. Some items per request, such as the work volume, the complexity, the expected delivery time, and the fee, are different depending on the client. However, according to the present invention, it is possible to set these different contents of request depending on the client as abilities of the request to occur from the client.

The COP correlating device may correlate the each of the COPs to data defined by the service definition portion with respect to the service to be provided to each of the COPs, the simulation portion may execute the operations based on the data defined by the service definition portion, and an evaluation operation device may be further comprised, the evaluation operation device managing data to be obtained due to a simulation by the simulation portion, the data being correlated to the service, and calculating an evaluation marker for evaluating a performance of the service provider which provides the service based on the data obtained. According to the present invention, it is possible to define a range of the service, such as SOP, human resource, a set of resource, and a correlation thereof by the service definition portion. Accordingly, it is possible to make clear the range of each service of the service action performed by the service provider. Moreover, as the service of the present invention corresponds to the COP which is the action performed by the client, it is possible to evaluate a service performance provided by the service provider, dividing into services by using the COP as a unit. "based on the data obtained" includes a case of only obtained data and a case of referring other data in addition to the obtained data. As the evaluation marker, there are included, the human costs, the work costs, the service lead time, the reworked work volume at the moment of occurring the Exception, and the like. Although these evaluation markers can be also obtained due to the simulation of a conventional project design tool, the tool evaluates the performance by using a completion period. However, for the process-type business, it is difficult to evaluate the performance thereof by using a completion period, because, even though requests are handled by the same service, due to an affection such as a waiting time, a required time for handling the requests are different depending on the request. However, according to the present invention, it is possible to gather the evaluation markers using a service, not a completion period, as a unit The evaluation operation device, based on the evaluation marker using the request as a unit, may calculate statistics of the evaluation maker. As a service is provided replying to a request from the client in the present invention, when a plurality of requests occur in the simulation, the service is provided for each of the plurality of requests. Accordingly, it is possible to evaluate the performance for each request by managing data per request. It is possible to calculate the evaluation markers per request and obtain statistics, such as a variance value and a standard variation. As the request occurs based on the action of the client, it is possible to obtain statistics showing variance for the waiting time relating to handling the request, the service lead time, the cost and the like. This variance is not valiance which gives suitable variability to operation velocity or operation time like the conventional technology, but a meaningful variance based on the grounds which is the external environments. As a result, it is possible to evaluate precisely a sensitivity and a risk to the external environments.

the service definition portion may comprise: a group definition device to define with respect to a plurality of groups constituting the each service provider; and a group allocation device to correlate each of the plurality of groups to any of the SOPs as a group who executes the SOP, the service provision device may comprise: a handling SOP specification device to specify the SOP to be executed in accordance with a predetermined sequence; a queue record device to record the SOP specified in a waiting queue of the group correlated to the SOP; and an operation execution device to determine, from operations recorded in the waiting queue, an operation to be executed by the group correlated to the sop, and make the correlated group execute the operation to be executed.

Thereby, by the group definition device, it is possible to set a plurality of groups as an actor who actually executes the operation with respect to service for providing the service, and by the group allocation device, it is possible to correlate each of the groups to the SOP to be executed by the group.

Then, by the operation execution device, an operation to be executed is determined from the operations recorded in the waiting queue, and a simulation in which the operation is executed by the group correlated is executed. Accordingly, it is possible to define clearly who executes which operation. When plural requests occurs sequentially, the operations for providing the plural services are executed in parallel. In the entire operation for providing the services, the operations having a anteroposterior relation are could be executed at the same time, and the same operation could be repeated. Moreover, even though, in a certain request, all of precedent SOPs are completed, when there is a prior request which is waiting for execution, waiting time for execution occurs to the following SOP. By providing a waiting queue to each group, it is possible to also simulate such a state which could occur when plural requests sequentially occurs. Even though any request to be executed does not exist (any work to be executed does not exist), the workloads which are allocated to SOPs are always employed for the next request. Thereby, a cost occurs in accordance with time. Note that, as the method of determining an operation to be executed from the waiting queue, a conventional method, such as the First-in-First-out (FIFO method), the Last-in-First-out (LIFO method), and the priority sequence, may be applied.

The operation execution device may record, in a case where it is necessary for the operation to be executed to be executed also by the other group, the operation to be executed in the waiting queue of the other workloads, determine the operation to be executed next from the operations recorded in the waiting queue of the correlated group, and make the correlated group execute the operation to be executed next. In a case where, in the middle of executing operation of service, there occurs a case necessary for operation to be handled by another group, such as a case of obtaining an instruction of a boss and a case of obtaining information from another post, the another group executes the operation to be executed, and the group correlated to the operation comes into a state of waiting execution by the another group. However, according to the operation execution device, in a case where the next operation is recorded in the waiting queue, it is possible to determine the next operation as the operation to be executed, and make the group to be correlated to the operation execute the operation.

The service definition portion may comprise: a member definition device to define a plurality of members included in the service provider; a group allocation device to correlate to each of the SOPs, the group to execute the SOP; and a member allocation device to correlate at least one of the plurality of members to at least one of the plurality of groups, and the member allocation device may comprise; a workforce set device to set, with respect to each of the members, a workforce to be provided by the member to the at lease one group correlated to the member; a workforce control device to control the workforce set device, so that a sum of the workforces is not beyond a predetermined upper limit, the workforces being provided by the member to the at least one group correlated to the member, and the service provision device may make a total of workforces set to the group, as a workforce of the group, influence operation velocity of the SOP which is executed by the group.

The group is a concept indicating an actor executes, for example, the SOP, and corresponds to a section, a team, a post or the like. The member is a concept corresponding to a specific individual. Thereby, it is possible to allocate the specific plural members included in the service provider to each group which is the actor to execute the SOP. Accordingly, even though the member executes operations of plural SOPs, it is possible to treat a change of members only by changing the correlation between the members and the groups. With respect to each member, each workforce is set so that a sum of workforces to be provided to each of the SOPs correlated to the member is not beyond a upper limit. Thereby, it is possible to provide a state that one member having a limited workforce is allocated to plural SOPs. The mode of making the workforce influence an operation velocity includes a case that the workforce itself is utilized as the operation velocity and a case that the workforce is utilized as a factor to influence the operation velocity.

The service provision portion may comprise: a tool definition device to define a plurality of tools utilized by each service provider; a tool group allocation device to correlate to each of the SOPs, a tool group which is utilized to execute the SOP; and a tool allocation device to correlate at least one of the plurality of tools to at least one of the plurality of tool groups, the tool allocation device may comprises: an execution ability set device to set, with respect to each of the tools, execution ability to be provided by the tool to the at least one tool group correlated to the tool; and an execution ability control device to control the execution ability set device, so that a sum of the operation abilities is not beyond a predetermined upper limit, the operation ability being provided by the tool to the at least one tool group correlated to the tool, and the service provision device may make a total of set operation abilities in the tool group as a workforce of the tool group influence operation velocity of the SOP which is executed by the tool group.

"The tool group" is a concept indicating a kind of tools, such as a printer, a facsimile apparatus, a personal computer. "The tool" is a concept corresponding to an apparatus, an equipment or the like which could be actually utilized by the service provider. Thereby, it is possible to allocate the specific tool which could be utilized by the service provider to each tool group to be utilized for operations of the SOPs. With respect to each tool, each execution ability is set so that a sum of operation abilities to be provided to each of the SOPs correlated to the tool is not beyond a upper limit. Thereby, it is possible to provide a state that one tool having a limited execution ability is allocated to plural SOPs. The mode of making the execution ability influence an operation velocity includes a case that the execution ability itself is utilized as the operation velocity and a case that the execution ability is utilized as a factor to influence the operation velocity.

A simulation method of the present invention solves the above problems by being configured as follows: A simulation method for a process management support for, by simulating a business process that a service provider provides a service to at least one client, evaluating the business process, including the steps: a client definition step of defining contents of action of each of the clients; a service definition step of defining with respect to a service to be provided by the service provider; and a simulation step of simulating a process flow in which a request of service occurs due to the action of each client in a predetermined period, and the service is provided by the service provider, wherein the client definition step includes: a COP definition step of correlating a plurality of actions executed by each client to a plurality of client operations (COP) respectively and defining for each client, a mode of progress of the COPs at the moment of the simulation; a COP correlating step of correlating each of the plurality of COPs to a service to be provided by the service provider to each of the COPs; and an occurrence conditions definition step of defining a condition for making a request of service occur from each of the COPs, the service definition step includes an SOP definition step of defining a procedure that the service provider provides the service correlated to the COP by using a plurality of service operations (SOP) to be executed in a predetermined sequence, and the simulation step includes: a client operation progress step of specifying a COP to be executed based on the mode of progress for each of the clients; a request occurrence step of making a request of the service occur based on the condition, the service being correlated to the COP specified by the client operation progress step; and a service provision step of, each time when the request occurs, with respect to the service correlated to the specified COP, executing operations for providing the service in accordance with the procedure defined by the SOP definition step.

The COP correlating step may define for each of the requests which occur from each COP, attributes of the request.

EFFECTS OF THE INVENTION

As mentioned above, according to the present invention, the simulation of a business process is executed as the following: by the client definition portion, the mode of progress of plural COPs which indicate the action performed by the client 103 is defined, and each COP is correlated to each service of the service provider; in the simulation portion, a COP to be executed is specified based on the mode of progress of the defined COPs, a request for the service 104 (SRI) is made occur from the specified COP based on a predetermined condition; every time the SRI occurs, the service 104 correlated to the specified COP is provided to the client 103 from which the SRI occurred. Thereby, it is possible to provide a process management support system and the like which supports searching continuously a business process appropriate to a change of the external environments.

BRIEF DESCRIPTION OF THE DRAWINGS

FIG. 8A is a graph showing in-process volume with respect to a service using the SRI as a unit.

FIG. 8B is a graph showing in-process volume with respect to a SOP using the SRI as a unit.

FIG. 10 is a graph showing the Work Breakdown compared using a case as a unit.

FIG. 17A is a diagram showing an example of information to be correlated to the client-based decision.

FIG. 17B is a diagram showing an example of information to be correlated to each of the probability-based decisions.

FIG. 17C is a diagram showing an example of executed work volume.

FIG. 19A shows a table of influence factor for making the skill level of a position and the complexity of a SOP influence the operation velocity when a position has a required skill to execute a SOP.

FIG. 19B shows a table of influence factor for making the skill level of a position and the complexity of a SOP influence the operation velocity when a position has a skill except a required skill to execute a SOP.

FIG. 19C shows a table of factor for making the effect of resource influence the operation velocity.

FIG. 20A shows a table of influence factor for making the skill level of a position and the complexity of a SOP influence the occurrence ratio of Exception when a position has a required skill to execute a SOP.

FIG. 20B shows a table of influence factor for making the skill level of a position and the complexity of a SOP influence the occurrence ratio of Exception when a position has a skill except a required skill to execute a SOP.

FIG. 21 shows graphs indicating work efficiency of the case 1 and the case 2 respectively.

FIG. 40 is a diagram showing an example of member allocation screen.

BEST MODE FOR CARRYING OUT THE INVENTION

1. Model Structure of the Present Invention (1) SBPM

Figure 1:
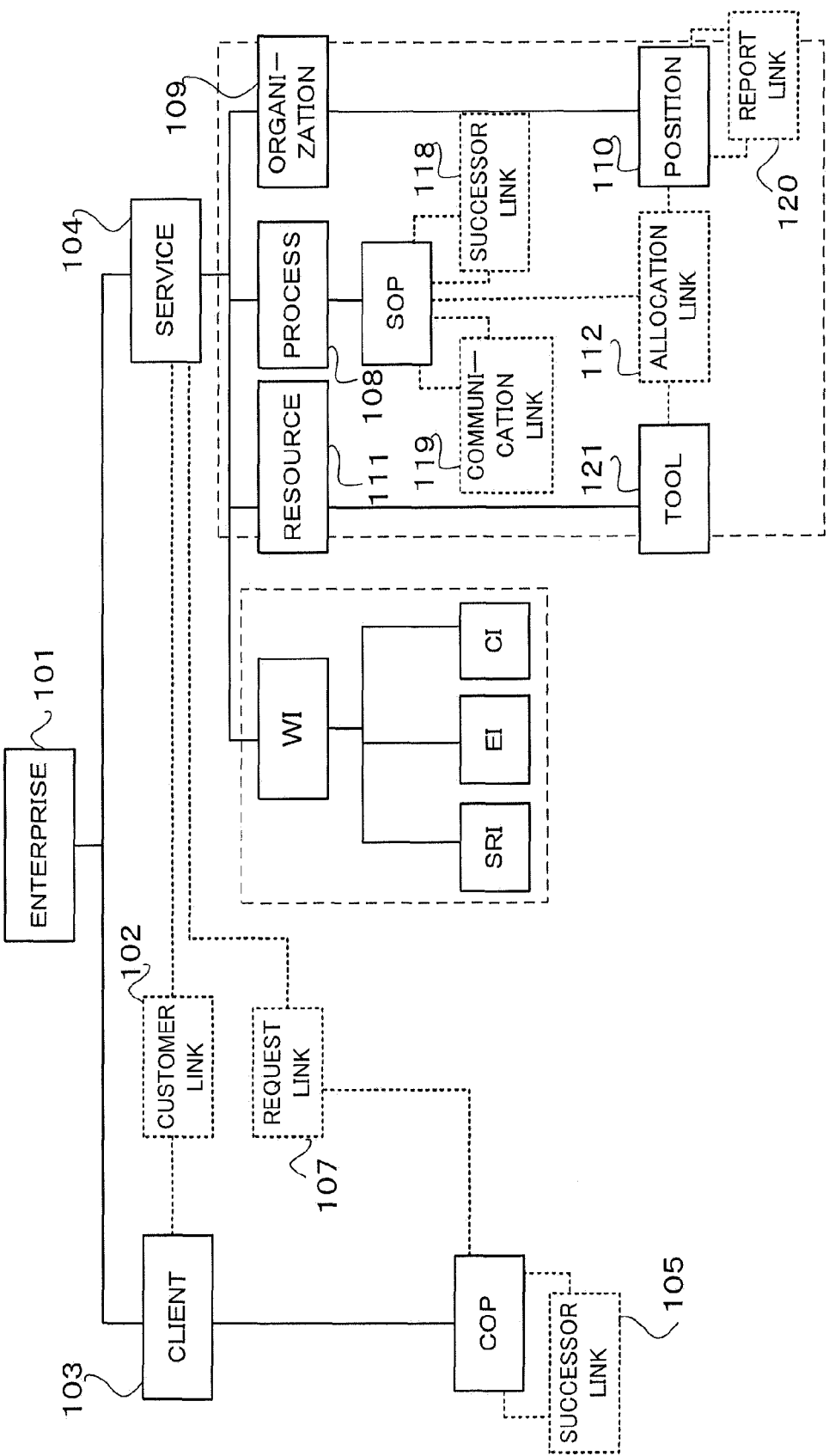
FIG. 1 is a diagram showing a SBPM defined in the system of the present invention.

In a process management support tool of the present invention, the process-type business is treated as requests and provisions of services which occur sequentially, and a basic model for this business is clearly defined as SBPM (Service Business Process Model) shown in FIG. 1. By modeling each business process under this SBPM, it is possible to visualize information included in the business process without loss the information to make the information comprehensible and sharable. In the SBPM, main elements in the business process and relations of them are clearly defined, and those elements are provided as common parts throughout the bushiness process. By changing the attributes and the combinations of the common parts, it is possible to design various business processes freely.

Moreover, in the SBPM, at the moment of modeling a business process, the items which have been vague so far, such as a allocation rate of workloads to plural services, an effect to an operation velocity due to using tools, an effect of skill level, and conditional branches are clearly defined with numerals. As a result of that, the items which have conventionally depended on a vague judge under the experiences and guesses, can be treated under a rational supported by numerals. In what follows, each of the objects forming the SBPM will be described.

In the SBPM, a business process is structured in a stepwise manner from a general view to details. Thereby, it is possible to represent a complicated structure of the process-type business process as a model comprehensible intuitively. The general view of an ENTERPRISE 101 which is an actor of the business process are represented with more than one CLIENT 103 and a SERVICE 104 which are correlated with each other by a customer link 102. The customer link 102 defines a demand-supply relation between the SERVICE 104 to be provided and the CLIENT 103 to provide this SERVICE 104. The attributes which should be set to the ENTERPRISE 101 include a probability of Exception occurrence, the centralization, the formalization, the experience and the like.

The CLIENT 103 is structured by a COP (Client Operation). An execution sequence of each COP is defined by a subsequent link 105 (hereinafter referred to as "a successor link 105"). The COP is an operation by the CLIENT 103 itself, and requires to the ENTERPRISE 101, a provision of the SERVICE 104 necessary for the operation. The relation between the COP and the SERVICE 104 which is provided to the COP is defined by the a request link 107.

The structure of the SERVICE 104 will be described. The SERVICE 104 is described by defining how workload 110 (hereinafter referred to as "the POSITION 110") and resource 111 (hereinafter referred to as "the RESOURCE 111") of an ENTERPRISE ORGANIZATION 109 (hereinafter referred to as "the ORGANIZATION 109") are correlated to PROCESS 108 which is a way for handling requests from the CLIENT 103. The definition of this correspond is described by an allocation link 112.

The PROCESS 108 is constituted by SOPs (Service Operation), are operations necessary to provide the SERVICE 104. The procedure of the plural SOPs is defined by successor links 118, and information dependency is defined by a communication link 119. The information dependency is a necessity that the POSITION 110 corresponded to the SOP obtains information from other POSITION 110.

The ORGANIZATION 109 is constituted by plural POSITION 110. By a report line 120 connecting each POSITION 110, a lineage of report and instruction is determined. The POSITION 110 is a conception corresponding to a predetermined group which functions as an actor to provide a service, such as a team, a section, a post and the like. For instance, there are a staff as a subordinate and a manager as a boss. The RESOURCE 111 is a set of a TOOL 121 and the like utilized at the moment of executing the SOP.

The operations executed in the SERVICE 104 is collectively called as "the work", and are executed by using a PROCESS 108, an ORGANIZATION 109 and a RESOURCE 111. In the present invention, The contents of the work are categorized into three work items (hereinafter referred to as "the WI"). The WI of the present invention includes the SRI (Service Request Item) which is a work for addressing a request from the CLIENT 103, the EI (Exception Item) which is a work for addressing the Exception which could occur in the operations for the SRI, and the CI (Communication Item) which is a work for addressing the Information Exchange such as a meeting, a conference with other POSITION 110.

The WI is an event object, different from an object which keep existing during a simulation, which occurs based on a predetermined condition, and occurs and disappears one after another during a simulation period. Each item included in the WI will be described later.

(2) CLIENT

Figure 2:
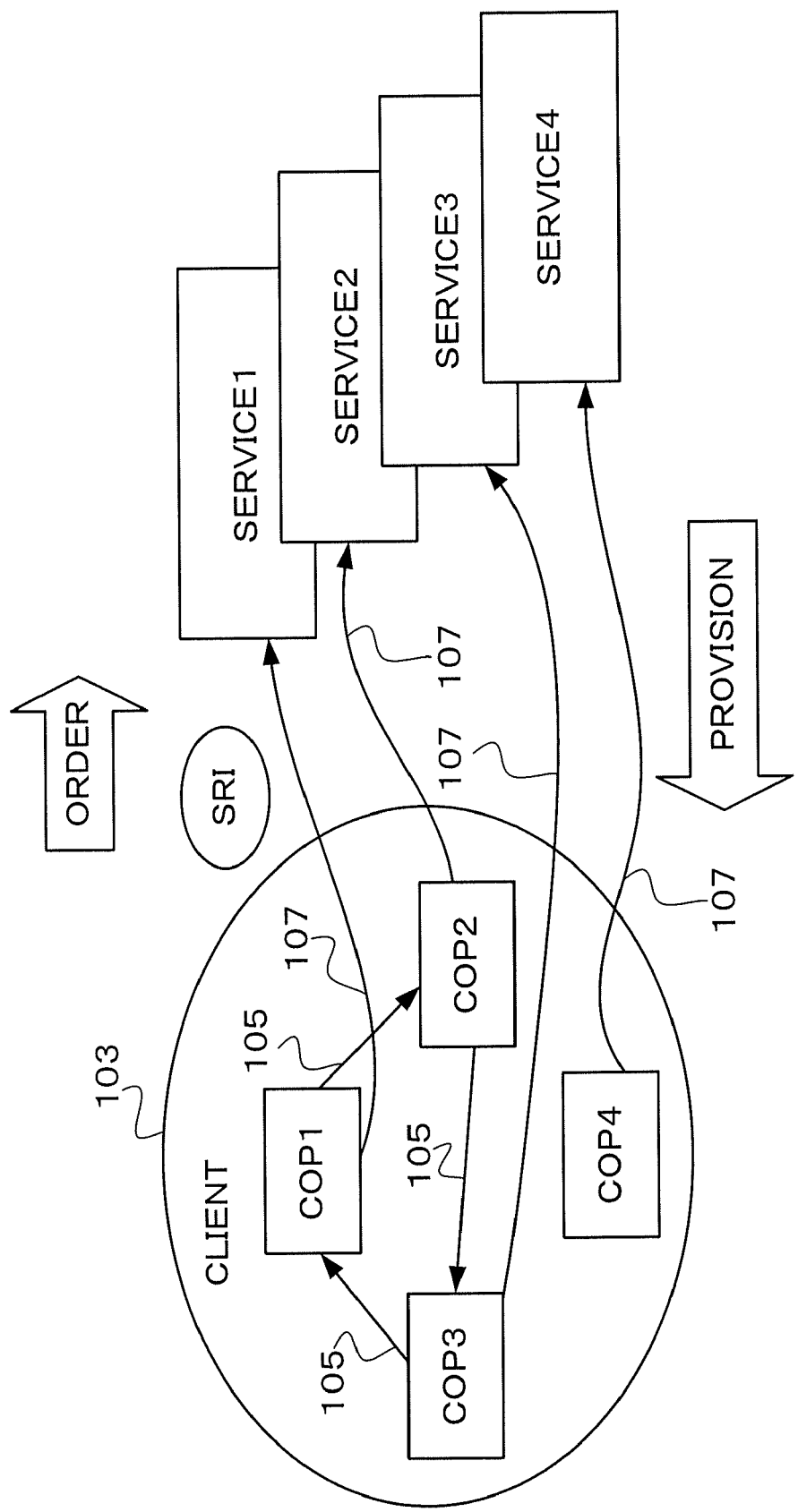
FIG. 2 is a diagram showing a relation between a COP of a client and a service.

The CLIENT 103 is a set of at least one COP. As mentioned above, the COP is an action of the client itself, and the execution sequence of the COPs is defined with the successor links 105. For example, the CLIENT 103 shown in FIG. 2 has four kind of COP1 to COP4 as its own action. The COP1, the COP2 and the COP3 are defined by the successor links 105 to be executed in this sequence, and the COP4 is defined to be executed independently. Each of the COP1 to the COP4 is correlated to each of the SOP1 to the SOP4. The CLIENT 103 makes the SRI occur toward the Service 1 to the Service 4 correlated by the request links 107 as a request to provide a service necessary for execution of its own COP1 to its own COP4.

(3) COP

Figure 3:
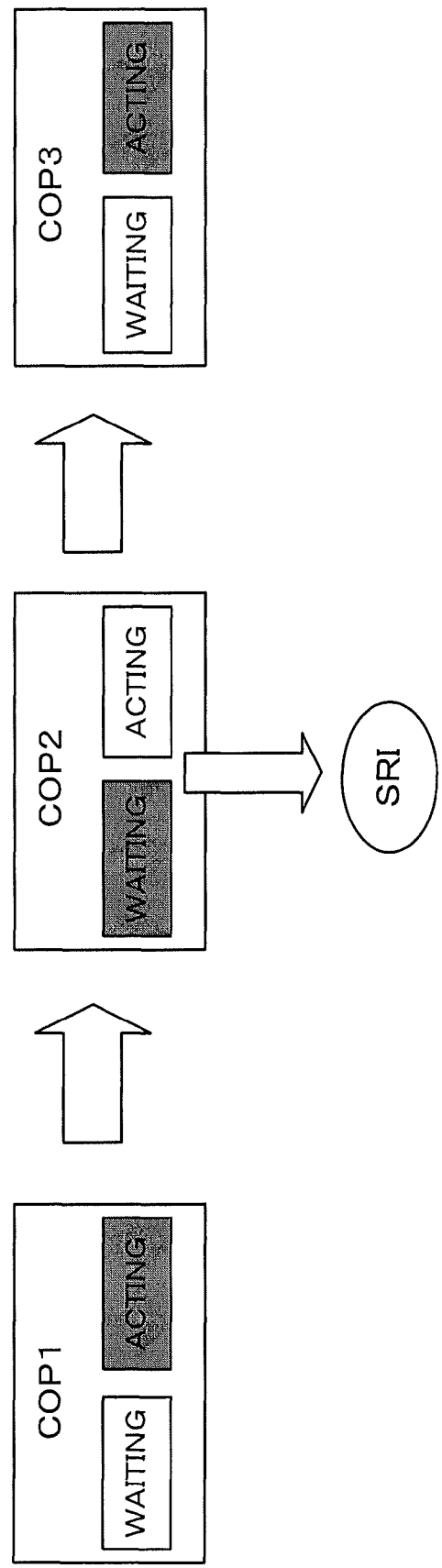
FIG. 3 is a diagram showing a motion of COPs in the simulation of the present invention.

The motion of the COP1 to COP3 shown in FIG. 3 will be described. The COP has two state, one is "acting" which indicates the action of the COP is being acted and another one is "waiting" which indicates the action of the COP is not acted. For example, in a case of the COP1 to the COP3, the COP2 indicating "acting" comes into "waiting" when the action of the COP1 preceding the COP2 is terminated, and the COP2 occurs a request to provide a service necessary for execution of its own action as the SRI. The SRI occurs under a probability showing a predetermined variance in consideration of the past demand-and-supply state in the ENTERPRISE. Then, when the time previously set as action time of the COP2 elapses, the COP2 terminates its own action to return the "waiting", and the following COP3 comes into the "acting".

To the COP, information such as the state of the COP, a distribution of SRI occurrence as a condition of SRI occurrence, the action time of the COP and the like is correlated as its own attribute. Moreover, the start time of the action and the end time of the action may be set. The distribution of SRI occurrence of the present invention shows a variance attribute of the probability with respect to the service request of the COP. With the SRI, information, such as a technical field necessary for execution of the required service (hereinafter referred to as "the skill field"), a priority level, cost, a fee of service to be provided, an occurrence date, an actual work volume, a deadline and the like, is correlated as its own attribute. The cost includes a case of cost for unit time and a case of cost for each SRI. The actual work volume indicates a work volume which is actually injected in the simulation. In what follows, something with "actual" means something "as a result of the simulation".

Figure 4A:
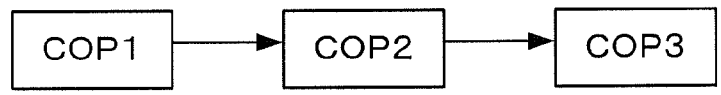
FIG. 4A is a diagram showing a mode of a sequence of executing the COPs.
Figure 4B:
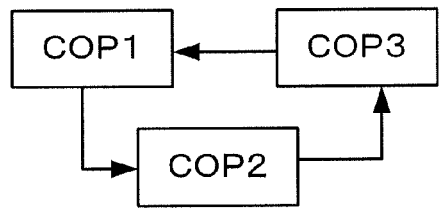
FIG. 4B is a diagram showing a mode of a sequence of executing the COPs.
Figure 4C:
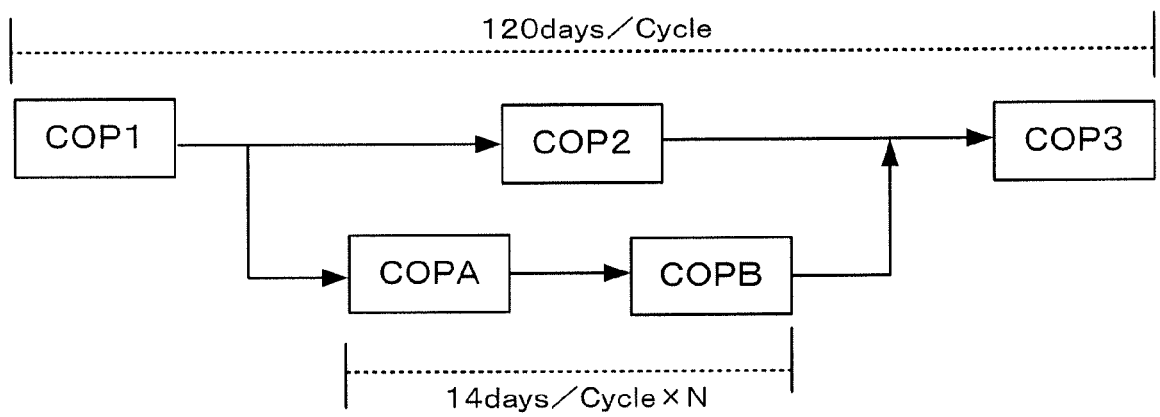
FIG. 4C is a diagram showing a mode of a sequence of executing the COPs.

FIG. 4A to FIG. 4C show examples of modes of a sequence of executing the plural COPs. FIG. 4A shows a case where the COPs are executed in line. FIG. 4B shows a case where the COPs are executed cyclically. Additionally, the COPs may be executed in parallel and a part of the COPs may be executed repeatedly. In the example shown in FIG. 4C, the COP1, the COP2 and the COP3 are executed repeatedly over a 120-day cycle, and in parallel with this repeat, after the COP1 finishes, the COPA and COPB are repeated n times over a 14-day cycle.

(4) SERVICE

Figure 5:
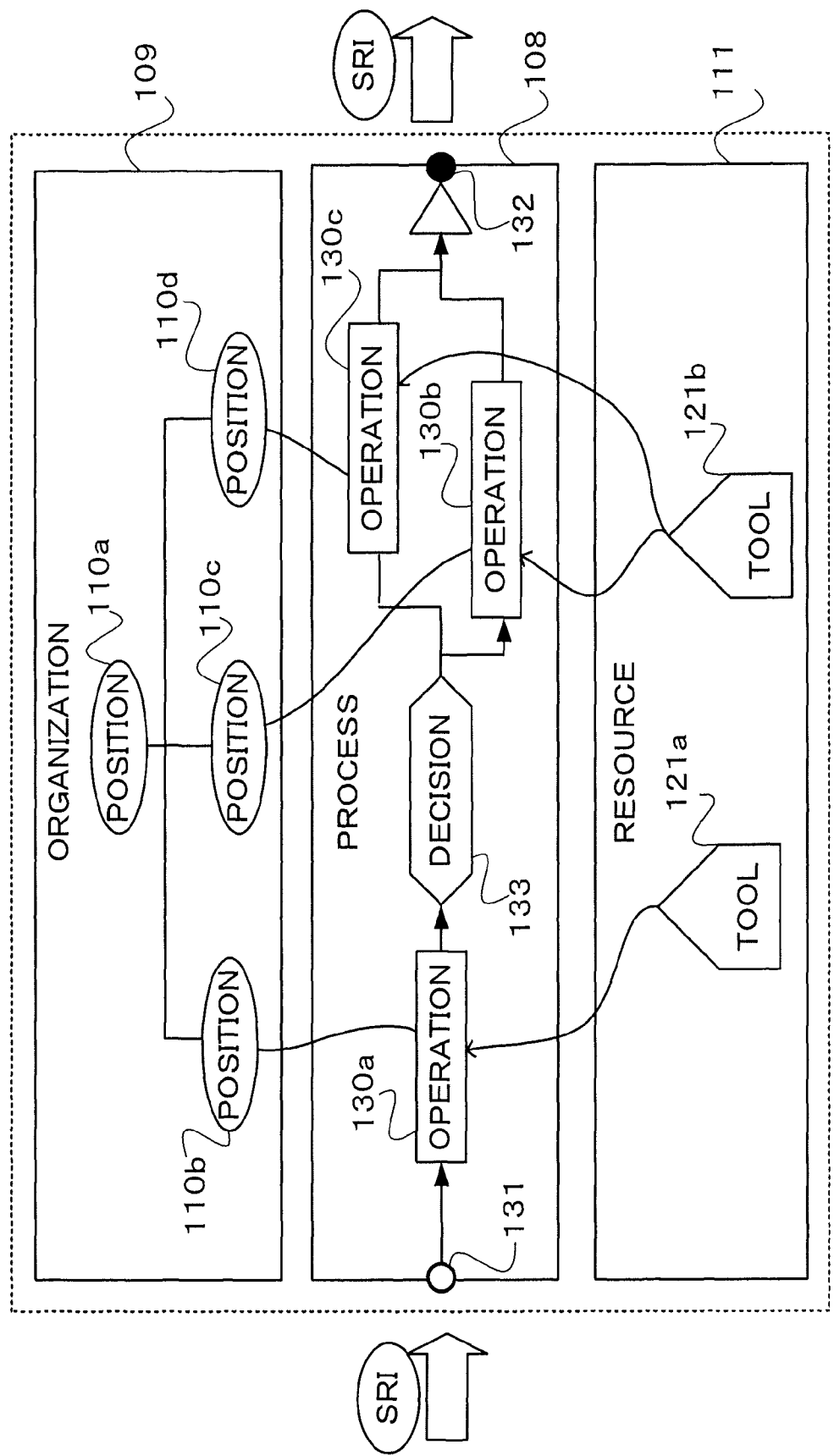
FIG. 5 is a diagram showing an example of modeling the service.

The SERVICE 104 is a mechanism to pass to the PROCESS 108, the SRI which has occurred from the COP, and handle it by the correlated POSITION 110 and RESOURCE 111. An example where the SERVICE 104 is defined is shown in FIG. 5. In the example shown in FIG. 5, the ORGANIZATION 109 is composed of the POSITION 110*a* and the POSITION 110*d*. The POSITION 110*a* indicates a manager, and the POSITIONs 110*b* to 110*d* indicate staffs who are subordinates of the manager. The RESOURCE 111 is composed of the TOOL 121*a* and the TOOL 121*b*.

In the PROCESS 108, procedures of the OPERATIONs 130*a* to 130*c* are described. The OPERATIONs 130*a* to 130*c* are the operations to provide the service which is requested by the SRI. Each of the OPERATIONs 130*a* to 130*c* is a kind of SOP as mentioned later. In what follows, when it is not needed to distinguish the OPERATIONs 130*a* to 130*c*, they are sometimes referred to as the OPERATION 130 or the SOP 130. Each OPERATION 130 is executed by the correlated POSITION 110 using the correlated the TOOL 121. In the PROCESS 108 shown in FIG. 5, the POSITION 110*b* and the TOOL 121*a* are correlated to the OPERATION 130*a*, the POSITION 110*c* and the TOOL 121*b* are correlated to the OPERATION 130*b*, and the POSITION 110*d* and the TOOL 121*b* are correlated to the OPERATION 130*c*. In what follows, in order to mean that the TOOL 121 or the POSITION 110 "is correlated to" the OPERATION 130, "is allocated to" is sometimes used instead of "is correlated to". When the SRI having occurred from the client is accepted by the SERVICE 104, each of the OPERATIONs 130*a* to 130*c* is executed by the correlated POSITION 110. The operations corresponding to the SRI in the SERVICE 104 finishes when the operation for the last OPERATION 130 in the PROCESS 108 is completed. Thereby, the service has been provided to the request of the CLIENT 103.

(5) SOP

The SOP is a minimum unit to handle the SRI. The SOP is categorized into four types; an ENTRY 131 of the service (in what follows, referred to as "the ENTRY 131"), an EXIT 132 of the service (in what follows, referred to as "the EXIT 132", a BRANCH 133 (in what follows, referred to as "the DECISION 133") and an OPERATION 130.

The EXIT 132 and the ENTRY 131 are an exit and entrance of the PROCESS 108 corresponding to the SRI respectively. The ENTRY 131 accepts the SRI having occurred, and the EXIT 132 provides the SRI the operation which has been completed to the COP where the SRI occurred. In a case where, the SRI is handled by different SOPs and procedures in the same service due to different orders depending on the CLIENTs 103, an admission decision by a check, a state in the operation or the like, the DECISION 133 defines a condition of branch. The DECISION 133 includes, for example, a client-based branch and a probability-based branch. The client-based branch is a branch using a kind of client as a branch condition. The probability-based branch branches according to a probability. To any kind of DECISION 133, the branch condition and the SOP as a branch destination are defined as its own attribute.

The OPERATION 130 is an operation to address the SRI which has occurred at the CLIENT 103. The SRI moves the subsequent OPERATION 130 in accordance with a progress of the operation of the OPERATION 130. With each OPERATION 130, information, such as a skill level to be required (in what follows, referred to as "the required skill level"), uncertainty, complexity, an expected work volume, an occurrence probability of Exceptions, Information Exchange frequency and the like is correlated as its own attribute. To each OPERATION 130, the POSITION 110 to execute the OPERATION 130 and the RESOURCE 111 to be utilized are correlated.

(6) Work Item

In the SERVICE 104 of the ENTERPRISE 101, at the moment of handling the SRI which has occurred from the CLIENT 103, as mentioned above, the Exception and the Communication which are spun-off on the way during the operations in the SRI are also handled. The WI which has occurred exists until the operation thereof is completed or an expected completion time elapses. For instance, in a case where it takes too long time to reply to a request with respect to an instruction to address the Communication and the Exception, the side that issued the request could progress the work under its own decision without waiting the instruction. In a case where the WI is executed, the time according to the work volume of the WI is spent.

(i) SRI

The SRI is the WI that occurs at the COP as a request of service necessary to execute the COP which is an action of the client. The occurrence of the SRI in the present invention is determined based on the probability showing the predetermined variance. The attribute items are those mentioned above.

(ii) EI

The EI is the WI that occurs to address a failure or a unexpected situation which could occur when the SRI is handled (in what follows, referred to as "the Exception"). The occurrence of the EI is determined based on the occurrence probability of Exceptions of the ENTERPRISE 101, the difficulty level of the OPERATION 130 which is an object to be executed, the skill level of the POSITION 110. To the EI, a work volume, a priority level, an EI occurrence date, an operation completion date and the like are correlated as the attribute items.

(iii) CI

The CI is the WI that occurs to address the Information Exchange with the other POSITION which could occur when the SRI is handled. The occurrence of CI is determined based on the formalization of the ENTERPRISE 101, an experience value, features (such as uncertainty) of the OPERATION 130 which is an object to be executed and the like. To the CI, a work volume, a priority level, a CI occurrence date, an operation completion date and the like are correlated as the attribute items.

(7) POSITION

The POSITION 110 constitutes the ORGANIZATION 109 with the report line 120 which defines a relation of a report and instruction with the other POSITION 110. For example, in a case where the Exception occurs in the operation of the OPERATION 130, the POSITION in charge of the operation could require an instruction to the POSITION 110 correlated by the report line 120 as a boss. To the POSITION 110, information such as a role, a skill field, a skill level (in what follows, the skill field and the skill level are collectively called "the skill"), an experience level, a head-count, a workforce, a cost per time, salary and the like is correlated as its own attribute. The workforce is a human volume (a head-count) per unit time to be provided by the POSITION 110 to execute the OPERATION 130. The POSITION 110 executes the WI such as the SRI, EI and CI relating to each OPERATION 130 which is correlated to the POSITION 110. The POSITION 110 come into the following five kinds of types due to the execution of the WI.

(i) The Direct Work

The Direct Work is a state of addressing the SRI that the PROCESS 108 had accepted.

(ii) The Rework

This is a state of addressing the work (EI) with respect to the Exception that has occurred in the OPERATION 130 executed. In the present invention, as a method for addressing the Exception, the operation in which the Exception has occurred is sometimes executed again. In this case, this is a state of executing the OPERATION 130 again.

(iii) The Communication

In a case where the operation is executed, the necessity of the Information Exchange with the other POSITION 110. The necessity is spun-off under a certain probability. The Communication is a state of addressing the work with respect to the Information Exchange (CI).

(iv) The Decision Wait

The POSITION 110 sometimes reports to the bass, the Exception which has occurred at the moment of handling the SRI, and requests the instruction of the boss. At this moment, the POSITION 110 stops the operation for the SRI, and if there is no SRI to be executed next, the POSITION 110 comes into a state of the Decision Wait and wastes the workforce for waiting the instruction until accepting the instruction of the boss.

(v) The Idle

In a case where there is no WI to be executed by the POSITION 110, such as a situation where the SI, CI, and EI to be executed in all OPERATIONs 130 to which the POSITION 110 is correlated don't exist, the POSITION 110 comes into a state of waiting (Idle), and wastes a workforce for the wait.

(8) RESOURCE

The RESOURCE 111 includes a TOOL 121 which is a tool to be utilized for executing the OPERATION 130, such as a calculator, a software, a system, a machine, a work standard. The TOOL 121 is correlated to the OPERATION 130 which the TOOL 121 is utilized, and gives influence to an operation velocity that the SRI is handled in the OPERATION 130. For each TOOL 121, information, such as a usability, an execution ability, a required skill to operate the tool, is determined as its own attribute.

As mentioned above, a business process in which each of the objects in the SBPM is defined is referred to as "the case" in the present invention. By changing any one of definitions in the SBPM, it is possible to generate plural cases. For example, if plural cases which are different from each other in a defined content of the PROCESS 108 are defined, it is possible to compare and consider the results of simulation with respect to plural business processes. Moreover, if the definition with respect to the CLIENT 103 is changed, it is possible to generate a case with respect to a different client.

2. Measurement of Enterprise Performance

When the execution period of the simulation and the number of executions of the simulation are set, the simulation of the business process determined as the SBPM as mentioned above is executed. Through the entire simulation period, data with respect to performances of enterprise actions (in what follows, referred to as "the enterprise performance") is recorded. After the simulation is completed, the recorded data is utilized to measure the enterprise performance.

The operation time of the present invention which is one of parameters to be utilized in order to measure the enterprise performance, will be described. In the present invention, the following formula is defined: WODKFORCE×OPERATION PERIOD=WORK VOLUME (human-time). Accordingly, the operation period can be obtained by the following formula: WORK VOLUME/WORKFORCE. For example, in a case where the expected work volume is set to the OPERATION 130, it is possible to calculate the expected operation period based on the workforce of the corresponding POSITION 110. The workforce is represented as the head-count per unit time as mentioned above, and functions as the expected operation velocity of the present invention. Thereby, the workforce is sometimes referred to as the expected operation velocity. By giving influence, such as the skill field of the work, the skill level of the POSITION 110, to the expected operation velocity, the operation velocity is obtained. The influence will be described later.

In what follows, the evaluation markers based on the data obtained by the simulation will be described. By the evaluation markers of the present invention, it is possible to evaluate the enterprise performances which are measured. The various kinds of data which occur in the operations corresponding to all of the SRI, EI, and CI to occur during the simulation period, are managed for each COP, that is, service to obtain data for a predetermined unit, such as the SOP, the POSITION, the SRI, or the service. In a case where there are plural cases, the evaluation markers are obtained for each case.

(1) Profitability

The profitability is obtained by a relation between earnings that the ENTERPRISE 101 accepted as a fee of the service and costs injected actually to execute the service. In the simulation, the SRI occurs from the COP. Since handling the SRI is providing the service, the costs of the service are the costs for the service which is a system to handle the SRI. Accordingly, The costs of the service are defined for each relation between the SRI and the COP. The costs of the service are the summation of the costs with respect to the OPERATIONs 130 which occur when the service is executed within a predetermined period and the costs with respect to the labor costs which occurs by allocating the POSITION 110.

Figure 6A:
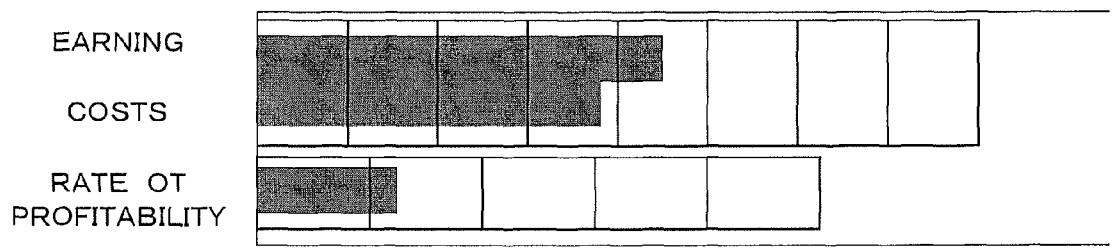
FIG. 6A is a graph showing the rate of profitability as a result of simulation.

Each of the costs is obtained for each SRI which is used as a unit. The costs with respect to the OPERATION 130 is obtained by calculating a product of the costs per time or per SRI and the operation time or the executed SRI counts. The costs of the POSITION 110 is obtained by calculating a product of the costs per time, the period when the POSITION is allocated to the OPERATION 130, and the workforce. In a case where plural same COP1s are executed during the simulation period and plural same SRIs occur, the earnings and the costs are calculated for each SRI and summed up. The fee in a case where plural SRIs occur is obtained by the following formula: FEE×EXECUTED SRI COUNTS. A ratio of the costs actually injected to the earnings is a rate of profitability. An example of graph indicating the rate of profitability is shown in FIG. 6A.

Figure 6B:
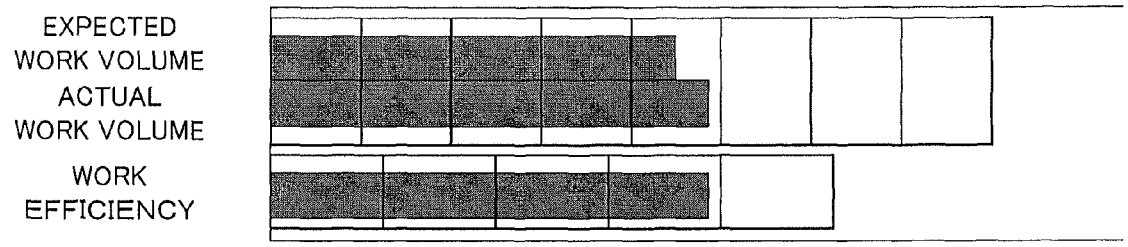
FIG. 6B is a graph showing work efficiency as a result of simulation.

Moreover, in the present invention, it is possible to measure work efficiency for each SRI based on a relation between the expected work volume and the actual work volume. First, it is possible to estimate the expected work volume for each SRI based on the sum of the expected work volumes of the SOP 130s included in the PROCESS 108 corresponding to each SRI which has occurred. On the other hand, the actual work volume is the summation of the actual work volume injected to each SOP 130 during the simulation period. The work efficiency is, as the formula 1 shows, obtained by a ratio of the expected work volume (RWV) and the actual work volume (IWV) for each SRI. An example of graph indicating the work efficiency is shown in FIG. 6B. Additionally, it is possible to obtain the work efficiency of the SOP 130 by calculating a ratio of the expected work volume of the SOP 130 and the actual work volume of the SOP 130.

$$\text{WORK EFFICIENCY} = RWV/IWV \quad \text{FORMULA 1}$$

(2) Customer Satisfaction Measurement

Figure 7A:
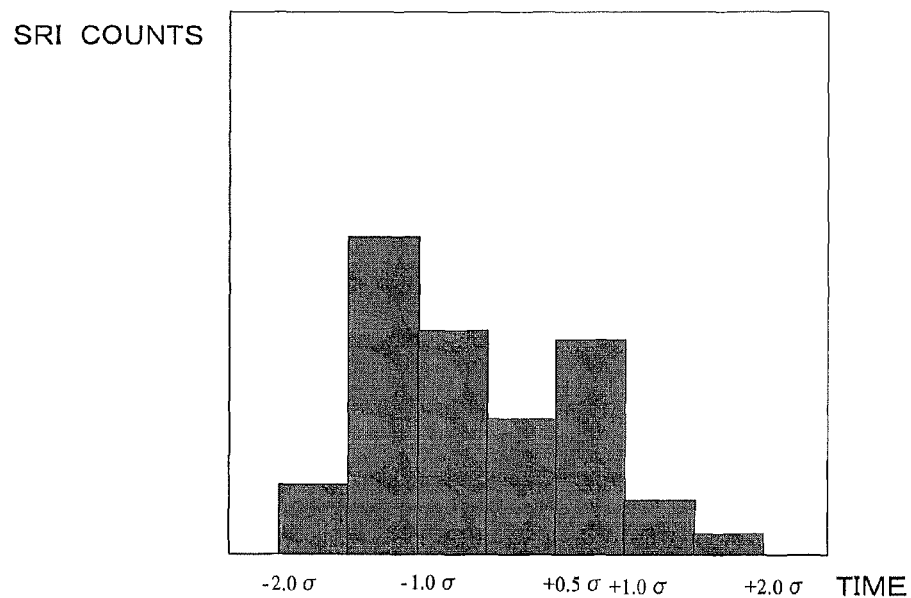
FIG. 7A is a graph showing service lead time using the SRI as a unit.

The customer satisfaction measurement is evaluated by the two evaluation markers, that is, lead time of the service (in what follows, referred to as "the service lead time") and a service quality. The service lead time is the time required for each SRI from the moment when the SRI occurs at the COP until the moment when operations with respect to the service corresponding to the SRI are completed. In the present invention, as shown in FIG. 7A, the relation between the service lead time of all of the SRIs executed in the simulation period and the SRI counts are shown by a histogram. Additionally, the average, the variance, the standard deviation ($\sigma$) and the like are also calculated and shown. The variance shows a risk with respect to the quality, that is a variability of the service quality.

The service quality shows how much correctively the service was able to complete the SRI which is an order of the CLIENT 103. The service quality (SQ) is, as shown by the formula 2, obtained by a ratio of the work volume which was correctly completed (FRWV) within the expected work volume (RWV) which is a sum of the expected work volumes (the expected work volume of the SOP) for operations necessary to complete the SRI.

$$\text{SERVICE QUALITY} = FRWV/RWV \quad \text{FORMULA 2}$$

The FRWV is calculated as the work volume corresponding to a final operation perfection level including redoing due to the Exception with respect to the operation of the PROCESS 108. A case where the PROCESS 108 corresponding to the SRI is constituted by the SOP1, SOP2 and SOP3 will be described. In such a case that: the expected work volumes of the SOP1, SOP2 and SOP3 are one human-time, two human-time, and three human-time respectively; the Exception occurs in each of the SOP2 and the SOP3; half of the operation for the SOP2 is going to be repeated (50%); and all of the operation for the SOP3 is going to be repeated (100%), the operation perfection level of the SOP1 and the SOP3 is 100%, and the operation perfection level of the SOP2 is 50%. Accordingly, the FRWV is 1×100%+2×50%+3×100%=5 human-time. The RWV is 1+2+3=6 human-time. The service quality is 5/6=0.8333.

Figure 7B:
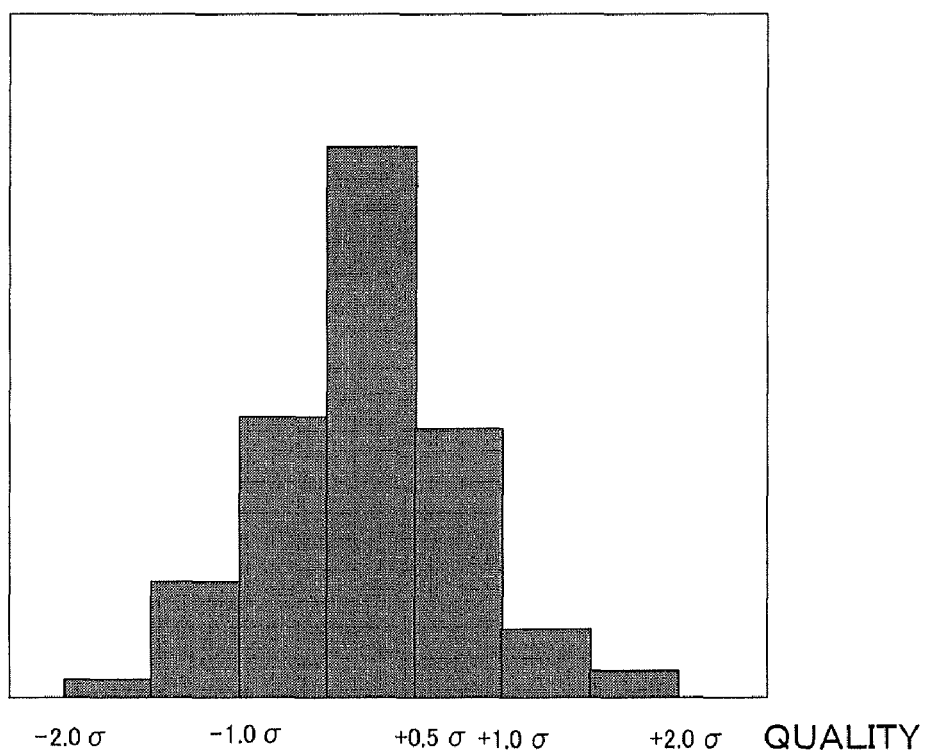
FIG. 7B is a graph showing service quality using the SRI as a unit.

As the occurrence of Exception increases and the number of Exceptions is ignored increases, the service quality decreases. In the present invention, as shown in FIG. 7B, the relation between the service quality of all of the SRIs handled in the simulation period and the handled SRI counts is shown by a histogram. Additionally, the average, the variance, the standard deviation ($\sigma$) and the like are also calculated and shown. The variance shows a risk with respect to the quality, that is a variability of the service quality.

(3) In-Process Volume

The in-process volume is a volume of SRI waiting completion of the operation in the SOP 130 or the SERVICE 104. The in-process volume of the SERVICE 104 is a total of the SRI counts in the middle of operation and the SRI counts in a state of waiting operation in each SOP 130. The in-process volume of the SOP 130 is the SRI counts in a state of waiting operation in the SOP 130. In the present invention, through the simulation period, the SRI counts in a state of waiting operation (the number of SRIs being recorded in an in-tray which will be mentioned later.) and the total of duration time of the state are shown by a histogram. Additionally, the average and the variance are calculated and shown. When the input volume of SRIs to the SERVICE 104 or the SOP 130 is much bigger than the execution ability of the SRIs, the peak of the histogram is shifted to the right. FIG. 8A shows an example of a graph indicating the in-process volume of the SERVICE 104. FIG. 8B shows an example of a graph indicating the in-process volume of the SOP 130.

(4) Work Breakdown

The Work Breakdown is the calculated, for each ENTERPRISE 101, each SERVICE 104, and each SOP 130, of the breakdown of work volume of each work executed by the POSITION 110 during the simulation period. The Work Breakdown is indicated by the above five works (the Direct work, the Rework, the Communication, the Decision Wait and the Idle). By the Work Breakdown, it is possible to analyze the quality of works executed.

Figure 9:
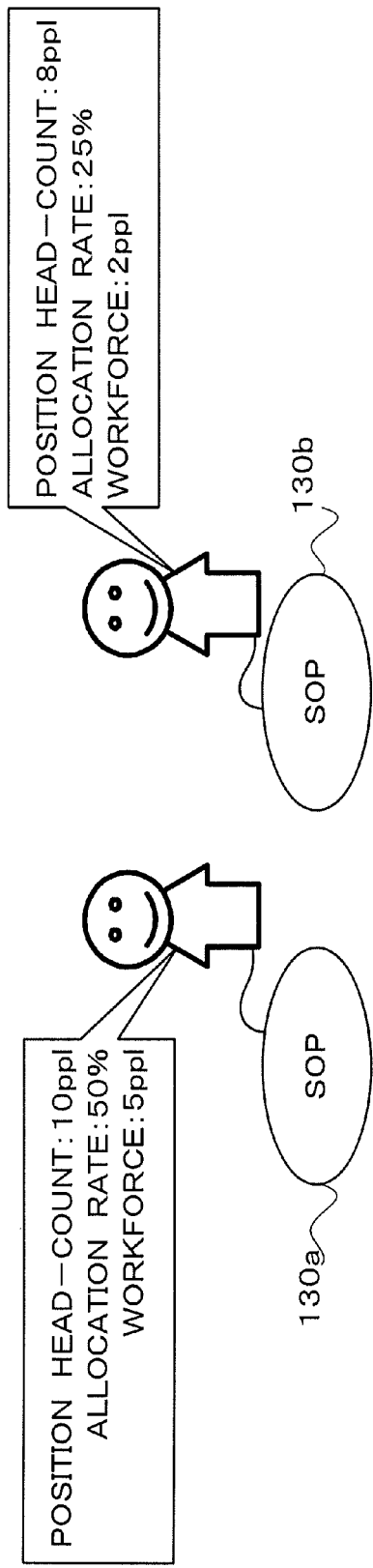
FIG. 9 is a table showing the Work Breakdown for two SOPs.

The Work Breakdown for each of the SOP 130a and the SOP 130b is shown in FIG. 9. The POSITION 110 allocated to the SOP 130a is constituted by ten people. The workforce is 50% of the allocated people, that is, 5 people. The POSITION 110 allocated to the SOP 130b is constituted by 8 people. The workforce is 25% of the allocated people, that is, 2 people. In the Work Breakdown table, a ratio of the work volume of each work to the total work volume is shown. Thereby, it is possible to recognize a balance between the work volumes of the operations.

Moreover, in a case where the simulation is executed with respect to plural cases, by counting, for each case, the work volume for each work, it is possible to compare the Work Breakdown of the cases to each other. For example, it is possible to show the Work Breakdown for each of the case 1 and the case 2 like a graph in FIG. 10.

(5) Communication Quality

Figure 11A:
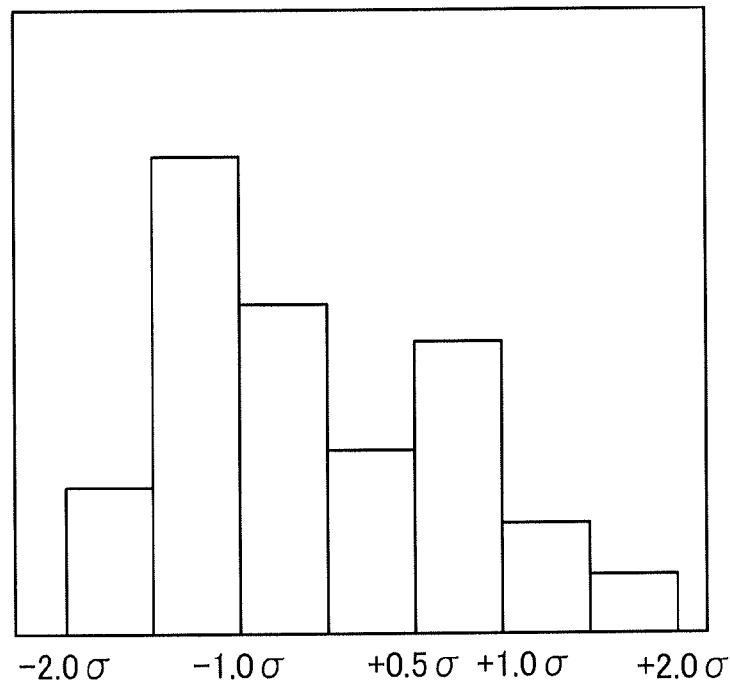
FIG. 11A is a graph showing communication quality with respect to an entire service.
Figure 11B:
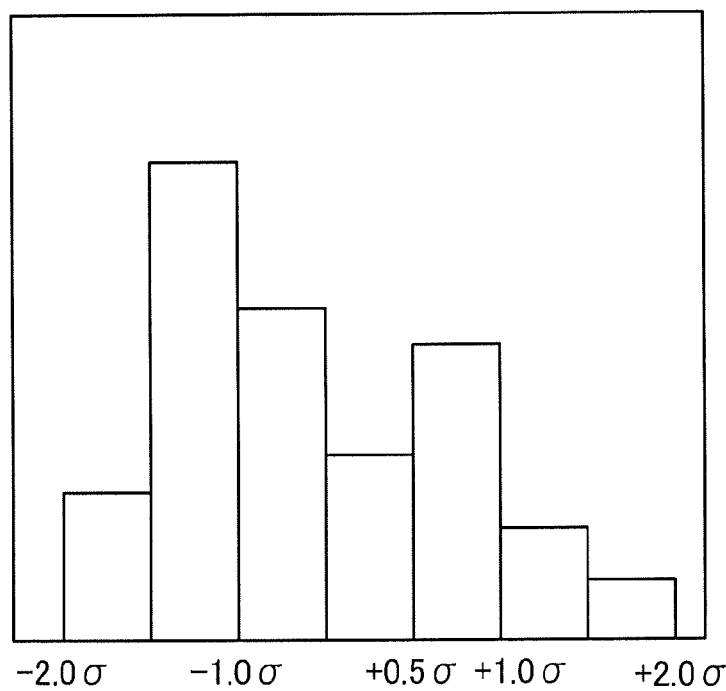
FIG. 11B is a graph showing communication quality with respect to a position.

Additionally, it is possible to provide the communication quality in order to evaluate a quality of the Communication. The communication quality is the evaluation marker to the provided service or the POSITION with respect to the CI. The communication quality of the present invention is illustrated as shown in FIG. 11A and FIG. 11B, as a correlation between the time required from the occurrence of the CI until the POSITION 110 to reply to the inquiry due to the CI completes the operation of the reply (in what follows, referred to as "the CI operation time") and the CI counts. In each of the graphs, the vertical axis indicates the CI counts, and the horizontal axis indicates the CI operation time. FIG. 11A shows the result of count using a SERVICE 104 as a unit, and FIG. 11B shows the result of count using a POSITION as a unit to reply. The further right the peak exists, the more it indicates that it takes longer time to obtain necessary information, and it is indicated that the quality of Communication is getting worse.

(66) Management Quality

Figure 12A:
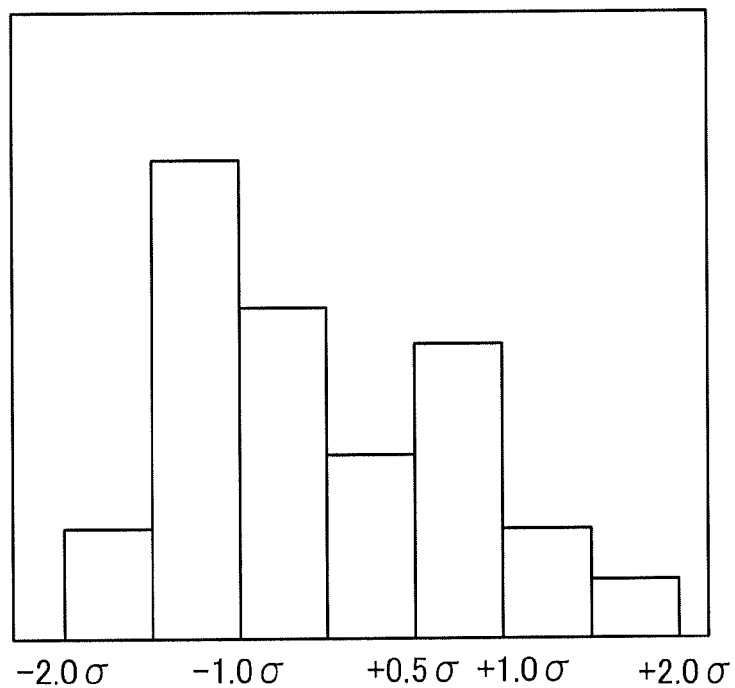
FIG. 12A is a graph showing management quality with respect to a entire service.
Figure 12B:
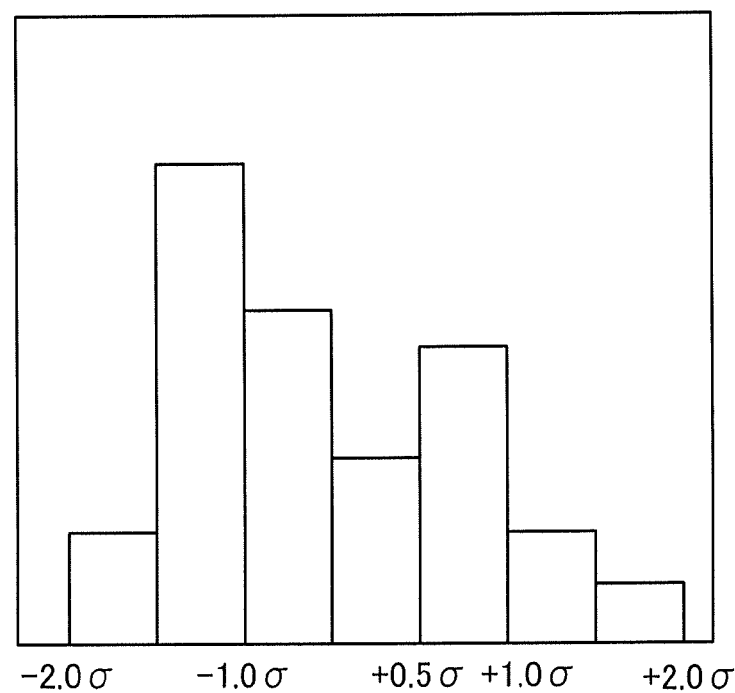
FIG. 12B is a graph showing management quality with respect to a position.

Additionally, it is possible to provide management quality in order to evaluate a quality of Exception operation when the Exception occurs. The management quality is the evaluation marker to the provided service or the POSITION 110 with respect to the EI. The management quality of the present invention is illustrated as shown in FIG. 12A and FIG. 12B, as a correlation between the time required from the occurrence of the EI until the POSITION 110 to determine an action to address the Exception completes the operation of the EI (in what follows, referred to as "the EI operation time") and the EI counts. In each of the graphs, the vertical axis indicates the EI counts which occurred, and the horizontal axis indicates the EI operation time. FIG. 12A shows the result of count using a unit of SERVICE 104, and FIG. 12B shows the result of count using a unit of POSITION to reply. The further right the peak exists, the more it indicates that it takes longer time to determine an action against the Exception, and it is indicated that a state of service management is getting worse in an aspect of management.

3. EXAMPLES (1) Determination of the Case

Figure 13:
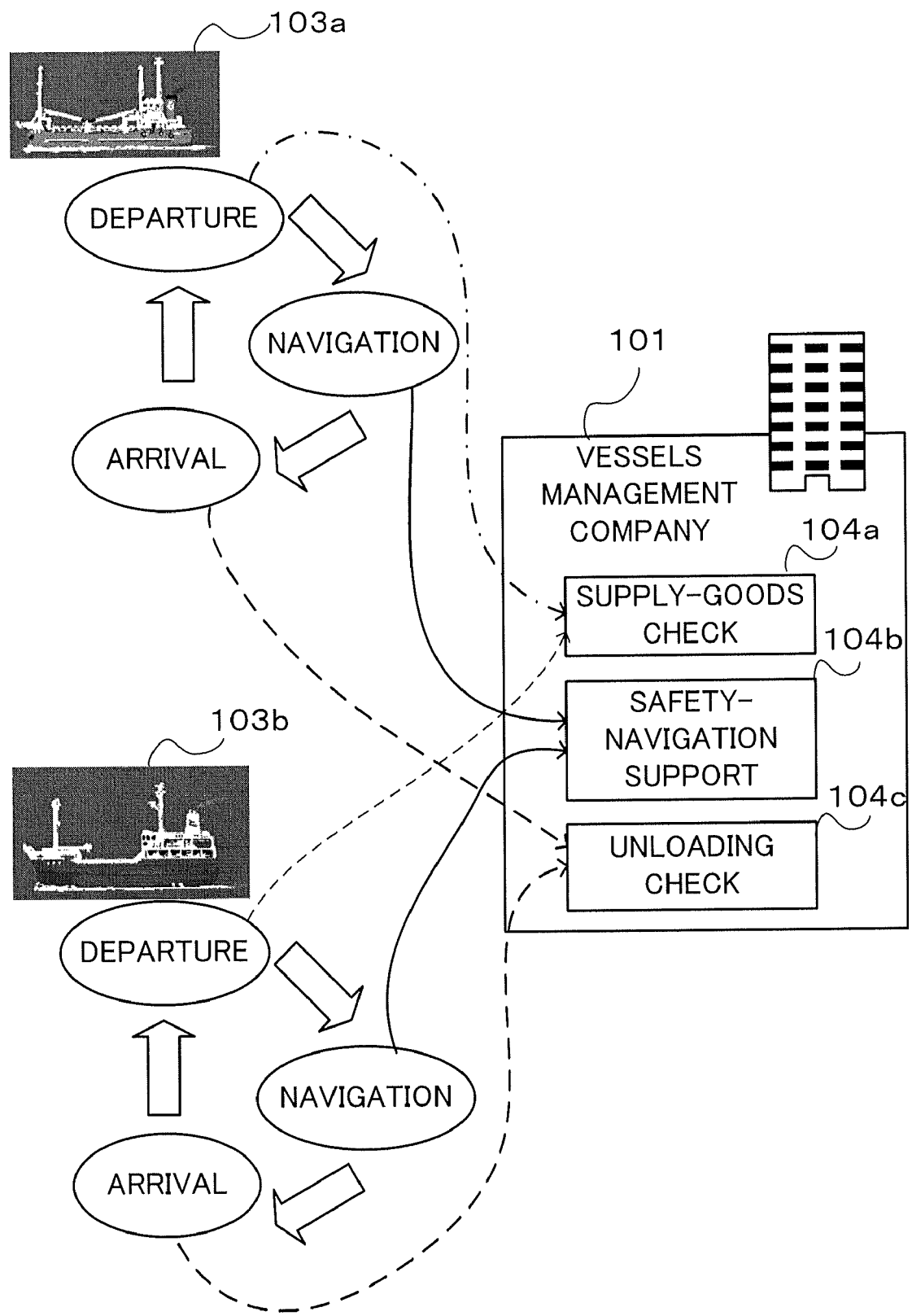
FIG. 13 is a diagram showing an example of an enterprise and a client of the present invention.

It is possible to apply an organization which provides various modes of services to clients to the ENTERPRISE of the present invention, such as a power company, a bank, a travel company, an airline company, an airport management company and the like. In what follows, as shown in FIG. 13, a case of applying a business to the present invention will be described, the business that a vessels management company as the ENTERPRISE 101 provides the SERVICEs 104a ... 104c to the vessels as two CLIENTs 103a, 103b. The two clients are a new vessel 103a and an old vessel 103b. The vessels management company 101 provides as the SERVICE 104, the supply-goods check 104a, the safety-navigation support 104b, and the unloading check 104c to the leaving from a port (the Departure), the navigation (the Navigation) and the arrival in port (the Arrival) respectively, which are daily handled by the CLIENTs 103a, 103b. The POSITION 110 in the ENTERPRISE 101 are constituted by the junior staff, the experience years of whom is comparatively short, the senior staff, the experience years of whom is comparatively long and the manager who is a boss of the staff.

First, the case 1 will be determined. As the case 1, it is preferable that a base case which could be a base of a search of the best practice and an analysis of a bottle neck is modeled.

Figure 14:
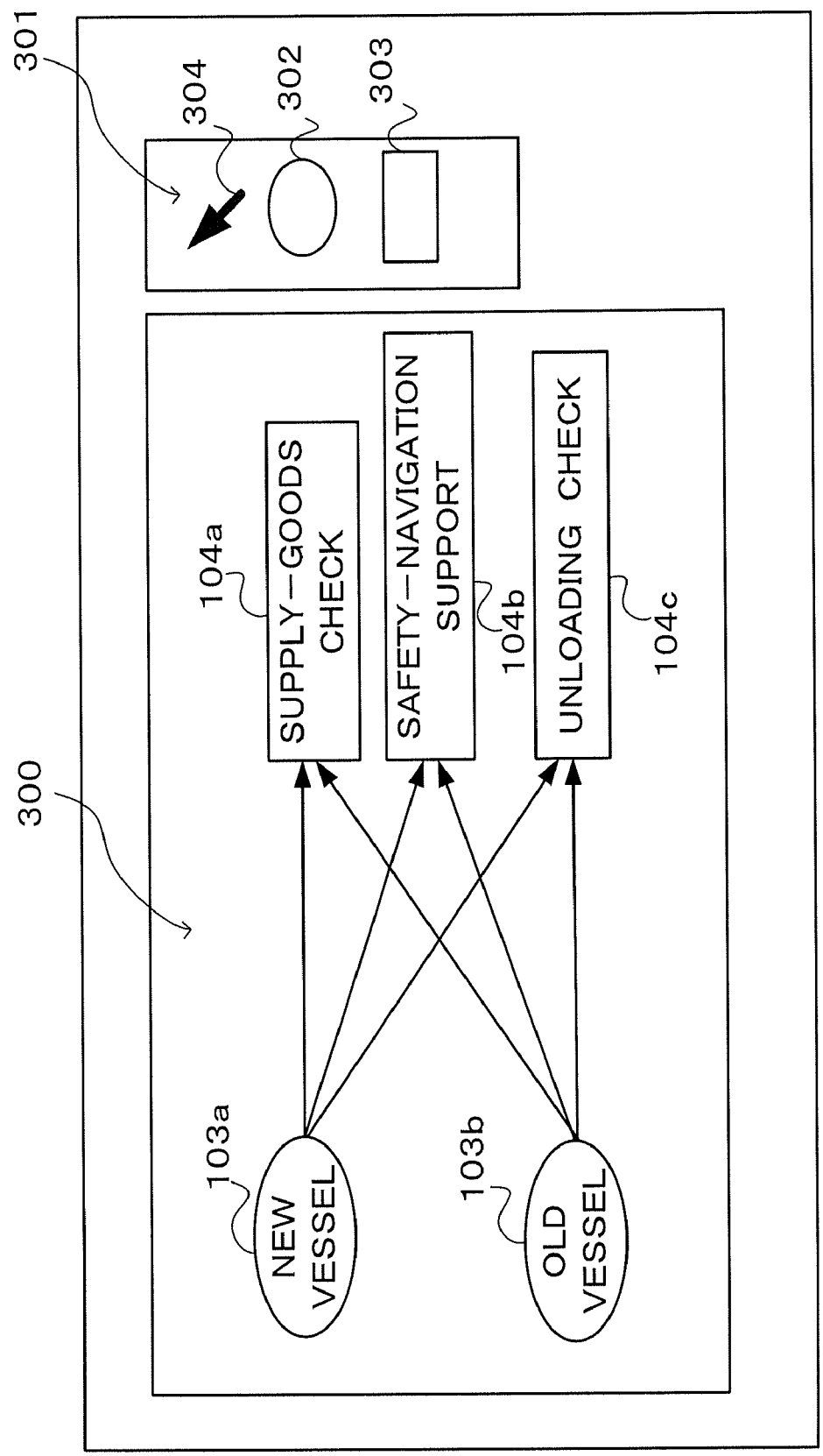
FIG. 14 is a diagram showing a state that the client is correlated to the service in the model editor.

First, a relation between the SERVICEs 104a ... 104c provided by the ENTERPRISE 101 and the CLIENTs 103a, 103b is determined, the relation being the most outer conception in a conception of business process. The procedure to set the determination will be described by using FIG. 14. In a case of the present invention, the CLIENT 103 and the SERVICE 104 can be generated by selecting the shapes 302,303 corresponding to the CLIENT 103 and the SERVICE 104 respectively from a palette 301 you can see on the right of the model editor 300, and dropping with a mouse click, the selected shape to the model editor 300.

The customer link 102 linking between the CLIENT 103 and the SERVICE 104 can be generated by selecting a connector-shape 304 from the palette 301 and clicking the shapes of the CLIENT 103 and the SERVICE 104. Due to the above mentioned procedures, the new vessel 103a and the old vessel 103b are set as the CLIENT 103. The supply-goods check 104a, the safety-navigation support 104b and the unloading check 104c are set as the SERVICE 104. The customer link 102 linking between each of the CLIENTs 103a, 103b and each of the SERVICEs 104a, 104b, 104c is set. The CLIENT 103 correlated to the SERVICE 104 by the customer link 102 is defined in the system as a client which is a destination where the SERVICE 104 is provided.

Figure 15:
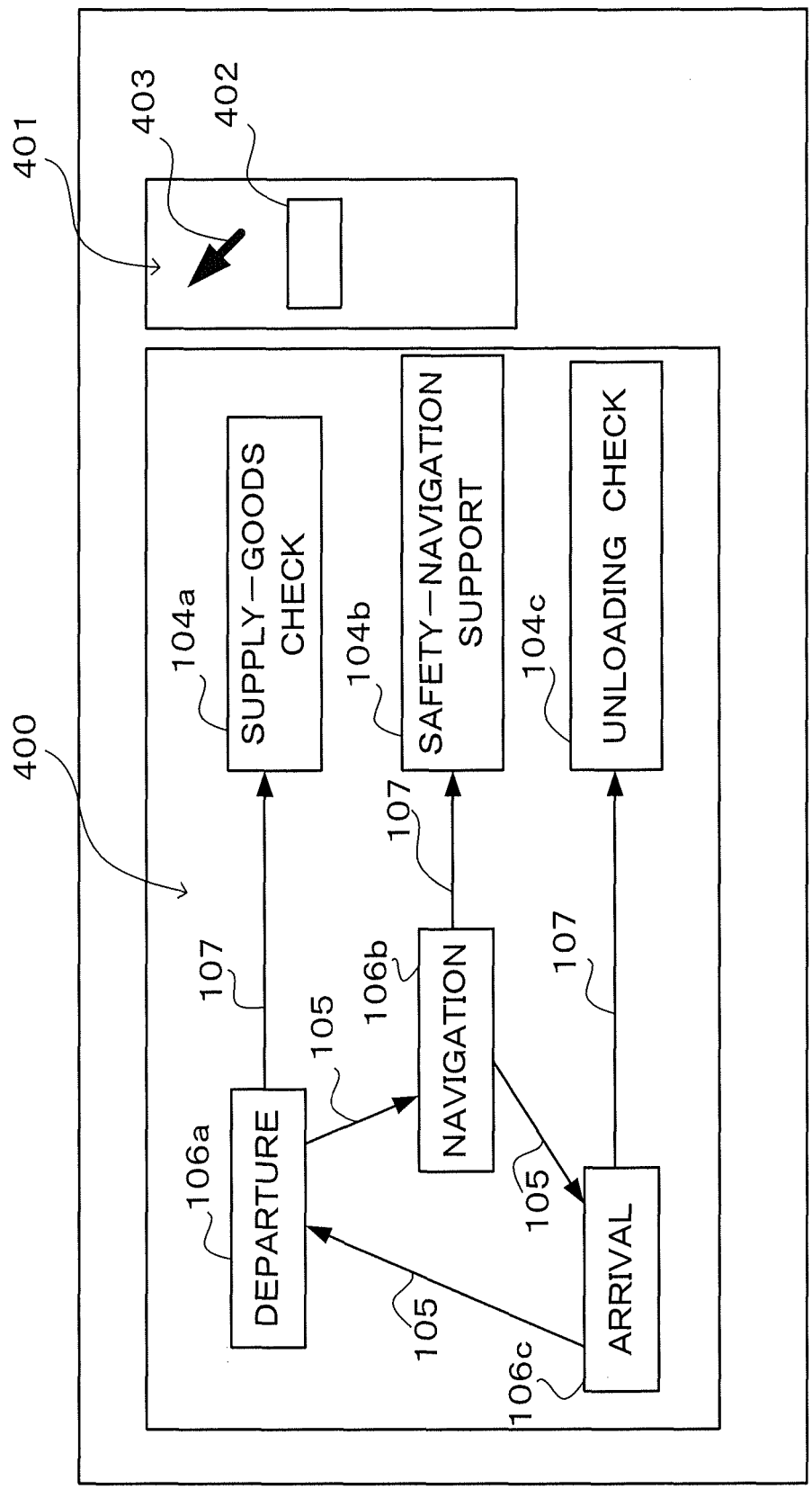
FIG. 15 is a diagram showing a state that each COP is correlated to each SOP in the model editor.

Next, a method of modeling the CLIENT 103 will be described using FIG. 15. The CLIENT 103 is modeled by defining the COP which is an action of the CLIENT 103. For example, in a case of modeling the new vessel 103a, the new vessel 103a is selected as an object to be modeled by a predetermined way. Thereby, the model editor 400 with respect to the new vessel 103a is shown. As the SERVICEs 104a ... 104c correlated to the selected CLIENT 103 are shown on the model editor 400, the COPs of the new vessel 103a can be generated and each of the COPs and each of the SERVICEs 104a ... 104c to be required from the COP can be linked by the request link 107.

The COP can be set by clicking the shape 402 of the COP from the palette 401 existing on the right side of the model editor 400 and dropping the shape 402 onto the model editor 400. The request link 107 and the successor link 105 for setting the execution sequence of the COPs can be set by selecting the connector shape 403 from the palette 401 and clicking the shape to be correlated on the model editor 400. By the above mentioned procedures, in the present embodiment, as the COPs, the Departure 106a, the Navigation 106b and the Arrival 106c are set. The execution sequence of each COP is defined by the successor link 105. Each COP and the SERVICE 104 necessary for the COP 106 are correlated to each other by the request link 107. All data set with respect to the SERVICE 104 and data which could occur are correlated to the SERVICE 104.

Moreover, by clicking the shape of each COP, the attribute of COP 106 can be set. The attribute of each SRI can be set by clicking each request link 107. The attribute of the COP 106 and the attribute of the SRI are those mentioned above. The COPs of the other CLIENT 103b can be also defined in the same way.

Subsequently, the procedure of modeling the SERVICE 104 will be described using FIG. 16. The SERVICE 104 is defined by allocating to the process defined to handle the SRI which is an order from the CLIENT 103, the POSITION 110 included in the ORGANIZATION 109 in order to execute the process.

For example, a case where the safety navigation support 104b is modeled as the SERVICE 104 will be described. First, the safety navigation support 104b is selected as a service which is an object to be modeled in a predetermined way. The model editor 500 where the selected service can be defined is displayed on the monitor. First, the PROCESS 108 is set on the model editor 500. The way of setting the PROCESS 108 is similar to the way of setting the COP. The desired PROCESS 108 can be formed on the model editor 500 using the shapes of the SOP, the client-based DECISION 133, the DECISION 133, the EXIT 132, the successor link 118 and the like, which are prepared in the palette.

Next, the ORGANIZATION 109 is defined. The structure of the ORGANIZATION 109 of the ENTERPRISE 101 can be formed on the model editor 500 using the shapes of the staff, the manager, the report line 120 and the like, which are prepared in the palette. Finally, each of the POSITIONs 110 which are formed on the model editor 500 is allocated to each of the SOPs 130. The POSITION 110 and the SOP 130 can be correlated to each other on the editor monitor 500 by a shape of the allocation link 112 which is prepared in the palette.

Figure 16:
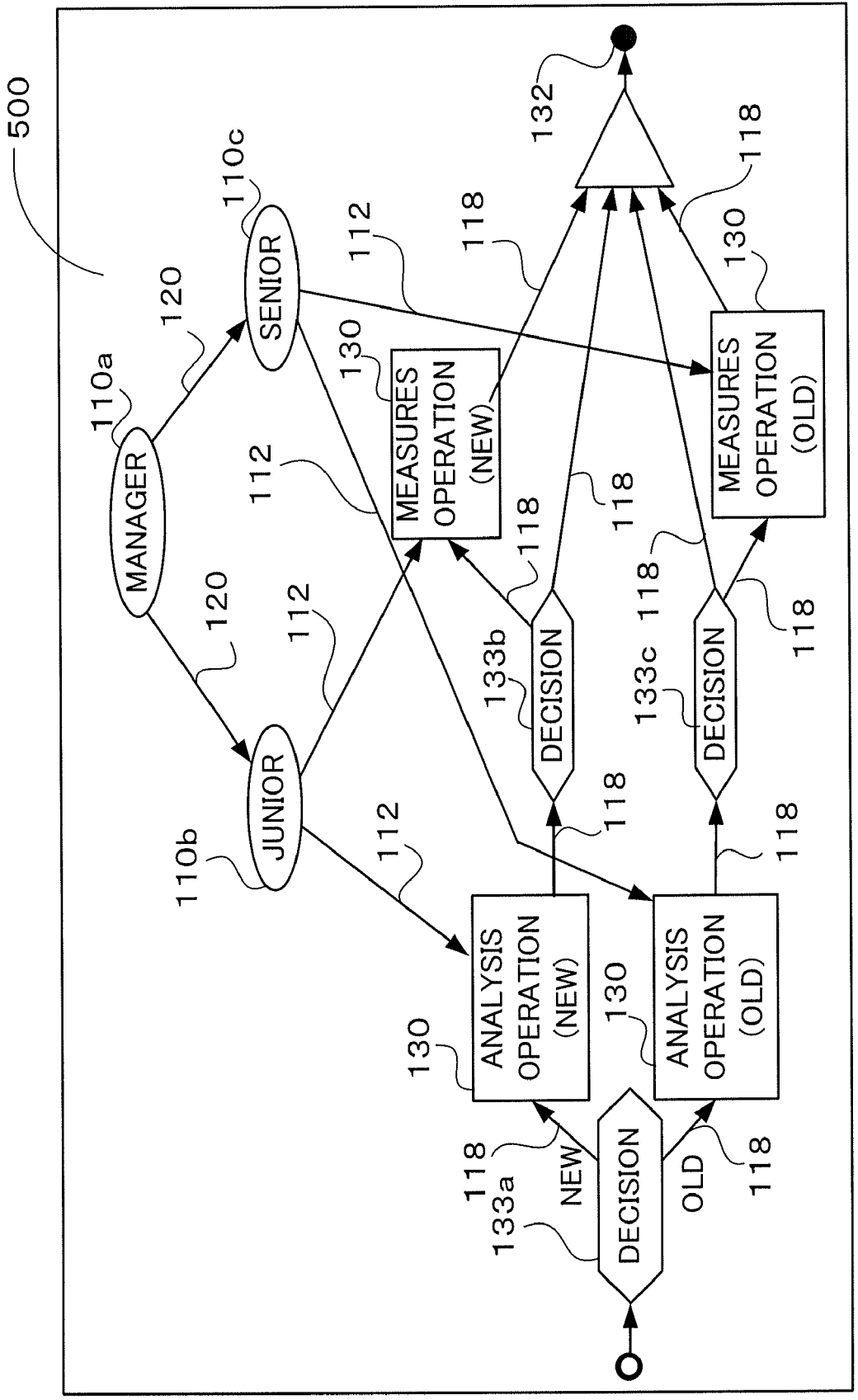
FIG. 16 is a diagram showing a state that a process with respect to one COP shown in FIG. 15 is modeled in the model editor.

FIG. 16 shows a state that the PROCESS 108 of the safety navigation support SERVICE 104b is defined. In the safety navigation support SERVICE 104b, with respect to each of the new vessel 103a and the old vessel 103b, the analysis operation of the state is periodically executed and when a trouble happens, a measures operation, such as mending is executed. In other words, the following PROCESS 108 is modeled. The vessels 103a, 103b, the clients, require to the ENTERPRISE 101 periodically to check the state of the vessels 103a, 103b in the middle of executing the COP of Navigation, and when a trouble is found, measures are taken. Additionally, with respect to the allocation of the TOOL 121, in the same way as the case of the POSITION 110, the SOP 130 and the TOOL 121 to be used in the operation of the SOP 130 can be correlated to each other using the shape of allocation link 112.

The details of the PROCESS 108 defined in the present embodiment will be described. First, the junior staff 110b within the POSITION 110 is correlated to the operation for the new vessel 103a. The senior staff 110c is correlated to the operation for the old vessel 103b. As the operation with respect to the order from the old vessel 103b is more difficult than the operation of the new vessel 103, and has a high probability that a trouble could happen, the two different process is prepared. The DECISION 133a, the client-based decision, branches an operation process coming thereafter depending on whether the CLIENT 103 is the new vessel 103a or the old vessel 103b. As shown in FIG. 17A, in a definition screen of the DECISION 133a, with respect to each of the vessels 103a, 103b, the correlation to the SOP 130 as the branched destination is defined. By this definition, the SRI from the new vessel 103a is handled in the process which is a upper branch, and the SRI from the old vessel 103b is handled in the process which is a lower branch.

In each process, the following actions are described. In a case where the CLIENT 103 is the new vessel 103a, in the "analysis operation (new)" the state of the vessel is analyzed. When a trouble happens, the "measures operation (new)" is further executed. In a case where the CLIENT 103 is the old vessel 103b, in the "analysis operation (old)", the state of the vessel is analyzed. When a trouble happens, further in the "measures operation (old), measures are taken. This probabilistic condition such as "when a trouble happens" is set in the DECISION 133b, DECISION 133c which are the probability-based branch. The SRI is determined which of the subsequent operations to go depending on the probabilistic condition. The state that the probability is set in each of the decision 1 and decision 2 is shown in FIG. 17B. FIG. 17B shows that, as the result of analysis by the analysis operation (new) and the analysis operation (old), it is determined that "a trouble" happens at 20% and 40% respectively, and the process progresses to each measures operation. In other words, FIG. 17B shows that as the result of analysis, the new vessel 103a needs the measures such as mending at 20%. On the contrary, the old vessel 103b needs the measures at 40%.

In the PROCESS 108 of the present embodiment, two types of POSITION 110, the senior staff 110c the skill level of which is high and the junior staff 110b the skill level of which is low. are set. The junior staff 110b is allocated to the operations with respect to the new vessel 103a, the difficulty level of which is low. The senior staff 110c is allocated to the operations with respect to the old vessel 103b, the difficulty level of which is high. These two types of POSITION 110 are managed by the manager 110a. The relation is formed using the report line 120 to form the ORGANIZATION 109.

The attributes of each SOP 130 and each POSITION 110 are set, for example, in an attribute window displayed downward of the model editor. This setting can be executed employing the conventional technology. The attributes of each object are those mentioned above. For example, the expected work volume required to execute each SOP 130 is set as shown in FIG. 17c. The expected work volume is an average work volume regardless of the skill level of the POSITION. Also, in "the case 2" which is defined differently from "the case 1", the expected work volume of each SOP 130 is the same as it in "the case 1". The case 2 will be described later.

Further, in a case where the communication link 119 is set to any of the COP 130s, for example, it is enough to select a shape indicating the communication link 119 from the palette and correlate the SOPs 130 to which the communication link 119 should be set. By the above mentioned procedure, "the case 1" is determined.

Figure 18:
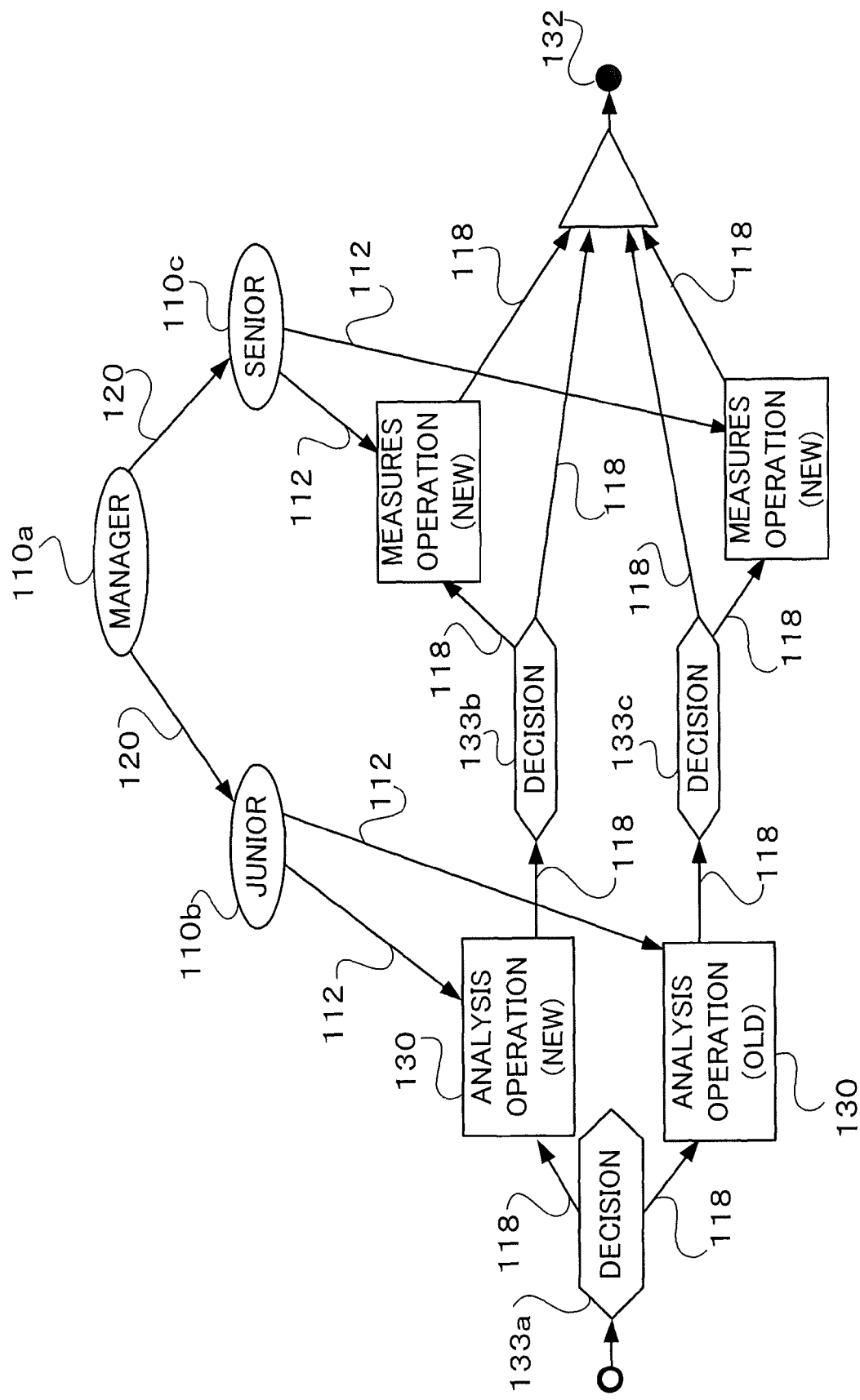
FIG. 18 is a diagram showing a state that a process as a case 2 is defined.

Subsequently, "the case 2" is also defined as another case. The case 2 of the present invention is, as shown in FIG. 18, different from the case 1 only in the definition of allocation of the POSITIONs 110. In the case 2, regardless of the type of vessel, it is defined that the junior staff 110b executes the analysis operation, and the senior staff 110c executes the measures operation. Each definition in the case 2 is enough to be defined in the same way as the case 1.

(2) Set of Tables

In the present invention, through the operations of the SRI, the elements relating to operation time, such as the operation velocity, the occurrence of Exception and the occurrence of Communication, are defined clearly. Then, for executing the simulation, various tables are set beforehand, the tables indicating a relation between the elements relating to the operation time and the influence to the operation time. In the present embodiment, by using the expected work volume and the workforce correlated to the SOP 130 on ahead, the operation time to be expected (in what follows, referred to as "the expected operation time") is obtained from this formula: the expected work volume/the workforce. Also, the occurrence ratio of Exception which is defined to the ENTERPRISE 101 on ahead, is referred to as the expected occurrence ratio of Exception.

The examples of tables to be set are shown in FIG. 19A to FIG. 20B. FIG. 19A and FIG. 19B show tables indicating the influence which the relation between the skill level of the POSITIONs 110 and the complexity of the SOP 130 gives to the expected operation velocity. FIG. 19A shows a case where the skill field of the POSITION 110 is coincident with the skill field which the SOP requires, and FIG. 19B shows a case of not coincident. FIG. 19C shows a table indicating an effect which the execution ability of TOOL 121 gives the expected operation velocity of SOP 130. FIG. 20A and FIG. 20B show tables indicating the influence which the relation between the skill level of the POSITIONs 110 and the complexity of the SOP 130 gives to the expected occurrence ratio of Exception. Each numerous in each table changes, as a factor (in what follows, referred to as "the influence factor"), the expected operation velocity or the expected occurrence ratio of Exception. Note that a default value may be set as the numerous in each table on ahead.

For example, in a case where the skill level of the junior staff 110b is set to "low", and the skill level of the senior staff 110c is set to "high", and the complexity of the SOP 130 relating to the new vessel 103a is set to "middle" and the complexity of the SOP 130 relating to the old vessel 103b is set to "high", if the skill field is coincident, the operation velocity, at which the junior staff 110b executes the SOP 130 relating to the new vessel 103a, is 0.9 times the expected operation velocity, and the occurrence ratio of Exception is 1.2 times the expected occurrence ratio of Exception. Further, in a case where the execution ability of the TOOL 121 correlated to the SOP 130 is R2, the operation velocity is 1.2 times (the expected operation velocity×0.9). Further, in a chase the senior staff 110 executes the SOP 130 relating to the old vessel, the operation velocity and the occurrence ratio of Exception are the same as the expected operation velocity and the expected occurrence of Exception.

(3) Execution of Simulation

At the moment of executing the simulation, the period that the defined business process is executed is set as "the simulation time". For example, it is preferable that the system is designed so that a monthly calendar is displayed on a monitor to set the simulation start date and the simulation end date by clicking the date on the calendar.

When the simulation period is set, the simulation is executed for all of the created cases. Thereby, as the simulation result of each case is obtained, it is possible to compare the simulation results of the cases to each other. In the present invention, the simulation is executed with respect to the above mentioned two cases, and it is possible to compare the simulation results to each other.

(4) Evaluation and Analysis of Simulation Result

When the simulation is completed, based on the data which occurred during the simulation, as mentioned above, the evaluation markers, such as the profit, the cost, the rate of profitability, the expected work volume, the actual work volume, the work efficiency, the service quality, and the operation time are calculated. Due to these evaluation markers, it is possible to measure and evaluate objectively the performance of business process such as the profitability and the customer satisfaction measurement. For example, FIG. 21 shows the performance with respect to the service in the case 1 and the case 2 by the expected work volume, the actual work volume and the work efficiency. By this result, it is recognized that the work efficiency of the case 1 is better than that of the case 2.

Figure 22A:
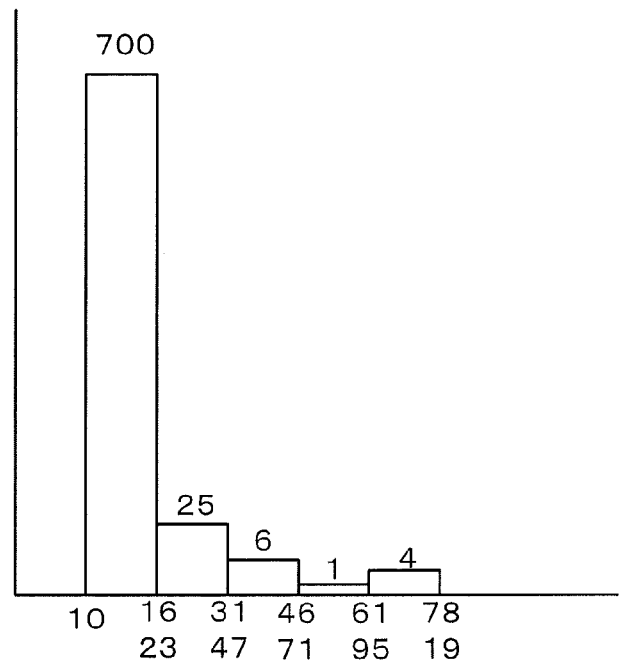
FIG. 22A is a graph showing service lead time using the SRI as a unit, with respect to the case 1.
Figure 22B:
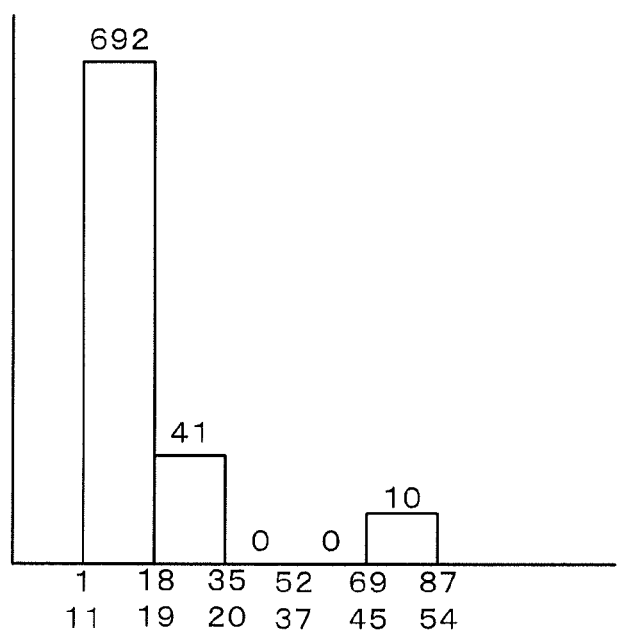
FIG. 22B is a graph showing service lead time using the SRI as a unit, with respect to the case 2.

FIG. 22A and FIG. 22B show the performance with respect to the customer satisfaction measurement of the case 1 and the case 2 by histograms with respect to the service lead time respectively. The horizontal axis indicates the service lead time and the vertical axis indicates the SRI counts which is completed to provide the service within each time.

By this results, it is recognized that the service lead time of the case 1 is, not so big difference but, shorter than that of the case 2. As the reason of that, it is considered that the fact that the work efficiency of the case 1 is higher is involved. Then, by analyzing in more detail, the bottle neck of the PROCESS 108 is specified.

Figure 23A:
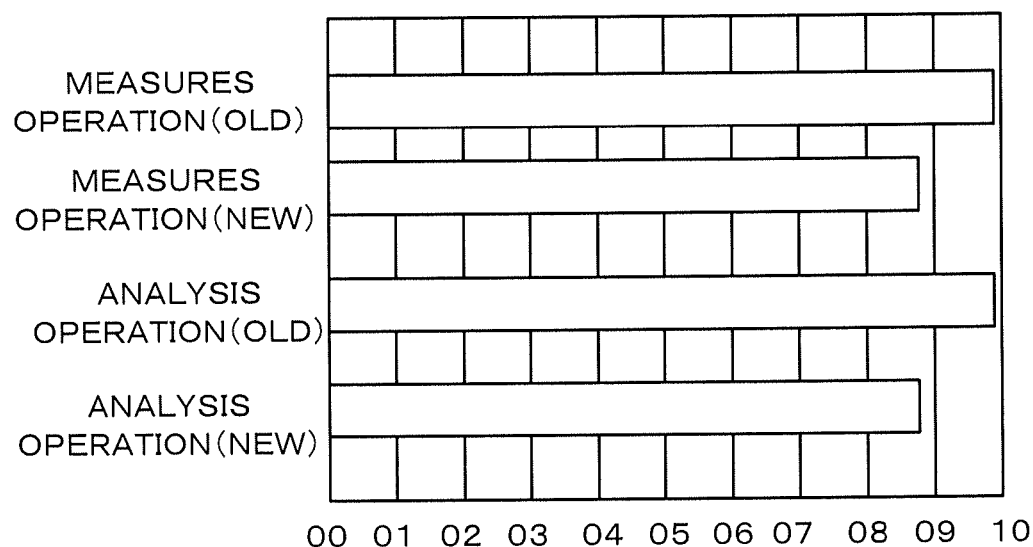
FIG. 23A is a graph showing work efficiency of each SOP for each client, with respect to the case 1.
Figure 23B:
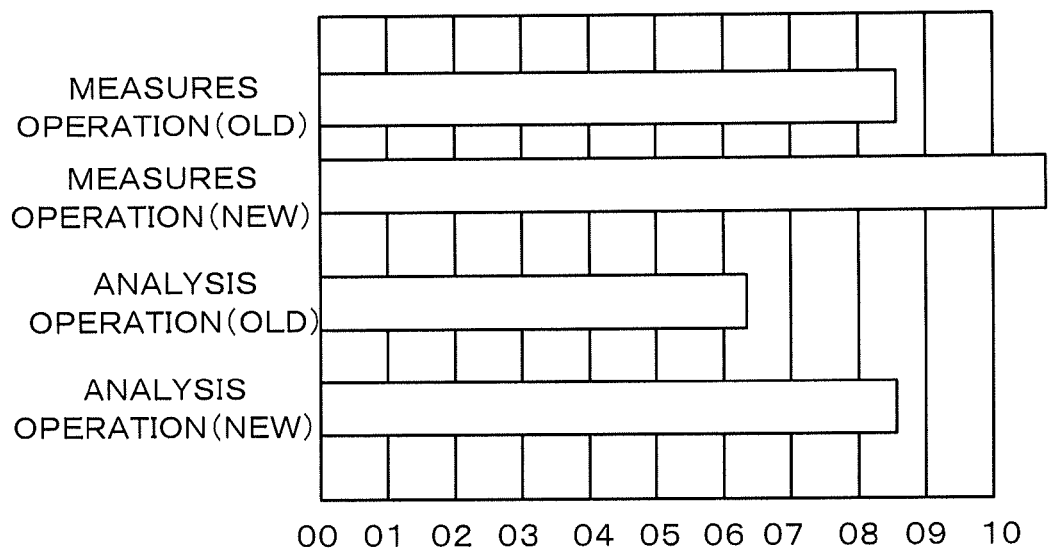
FIG. 23B is a graph showing work efficiency of each SOP for each client, with respect to the case 2.

FIG. 23A and FIG. 22B show the work efficiency of two SOPs in the PROCESS 108 (the analysis operation and the measures operation) with respect to the case 1 and the case 2 respectively. In the case 1, with respect to the new vessel 103a, the operation efficiencies of the two successive SOPs, that is, the analysis operation (new) and the measures operation (new) are the same as each other. Also, with respect to the old vessel 103b, the operation efficiencies are the same like the new vessel 103a. On the contrary, in the case 2, there is a big difference between the new vessel 103a and the old vessel 103b in the work efficiency of the successive SOPs. The reason of this is that the junior having a low skill level handles the precedent SOP (the analysis operation), and the senior having a high skill level handles the subsequent SOP (the measures operation). Eventually, it becomes clear that in this allocation of POSITION, the SOP where the junior is allocated is a bottle neck and gives an influence to the service lead time.

Figure 24:
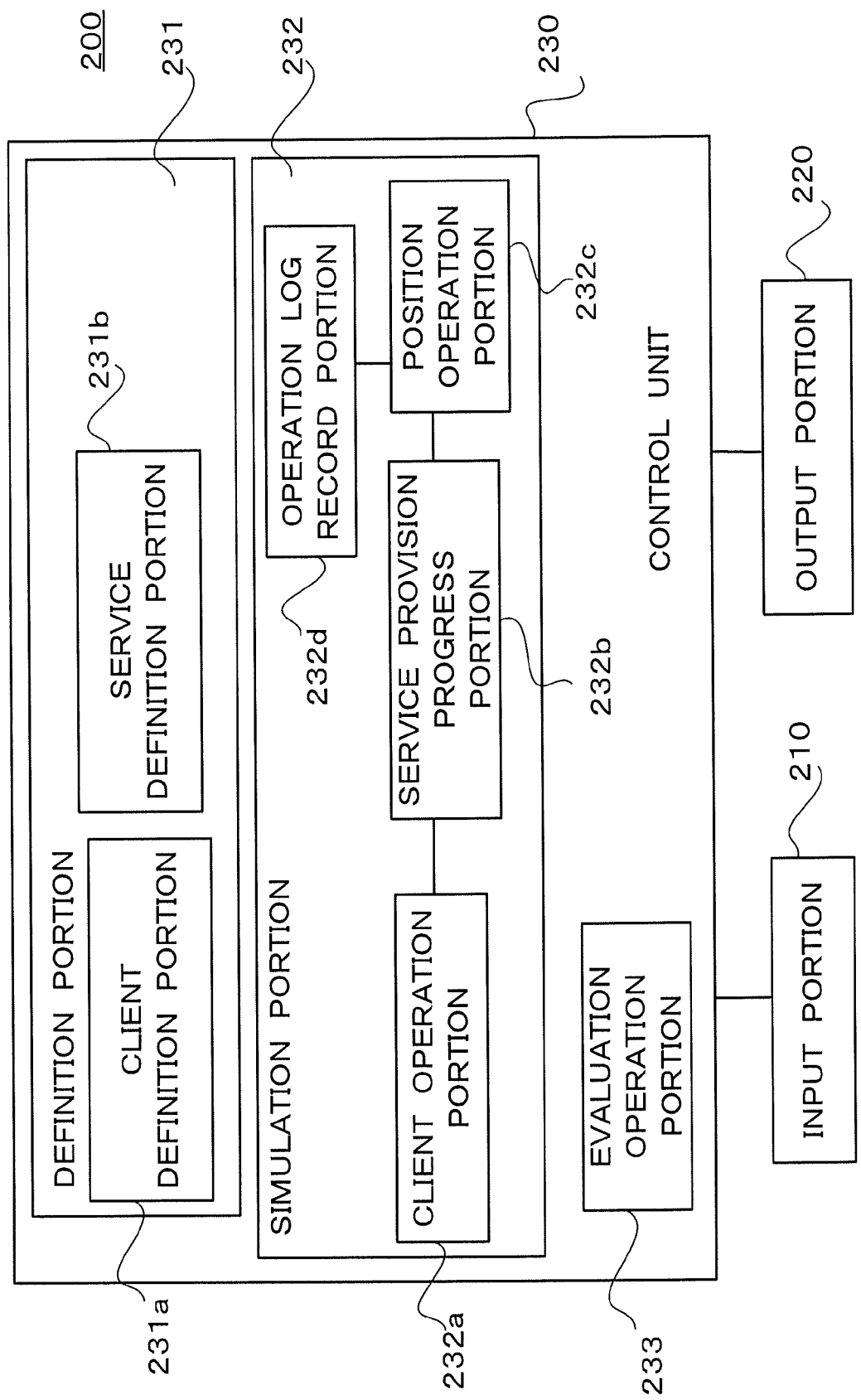
FIG. 24 is a diagram showing a configuration of hardware of the process management support system.

The hardware configuration of the process management support system of the present invention will be described. As shown in FIG. 24, this tool 200 comprises an input portion 210 for accepting input of data, an output portion 220 for outputting various kinds of data, and a control unit 230 for controlling various kinds of functions which this tool should provide. The input portion 210 includes an interface to accept data from other systems besides a keyboard and a mouse to accept input by a user. The output portion 220 includes an interface to output data to other systems besides a monitor where data and message are displayed. The control unit 230 comprises a CPU and various kinds of memory areas necessary for operations of the CPU such as a RAM and a ROM and is formed as a computer. In the ROM, a program to make the control unit 230 function is stored.

By executing the program, the control unit 230 functions as a definition portion 231, a simulation portion 121 and a evaluation operation portion 233. The definition portion 231 controls definition operations for defining each object in the SBPM for executing the simulation. The definition portion 231 comprises mainly a client definition portion 231a for controlling a definition operation with respect to the CLIENT 103 and a service definition portion 231b for controlling a definition operation with respect to the SERVICE 104. The simulation portion 232 controls a simulation operation based on the SBPM where the definitions are completed.

The simulation portion 232 comprises a client operation portion 232a, a service provision progress portion 232b, a position operation portion 232c, and an operation log record portion 232d. The client operation portion 232a simulates the motion of the CLIENT 103. The service provision progress portion 232b controls the progress of operations with respect to the provision of the SERVICE 104. The position operation portion 232c controls a process flow that operations corresponding to SRIs are executed by the POSITION 110. The operation log record portion 232d records mainly for each object, the operation time and the number of executions of various kinds of operations in the simulation. In the position operation portion 232c, an in-tray to which a work to be executed is added and an out-tray to which a work the operation of which has been completed is added are correlated to each POSITION 110. The evaluation operation portion 233 calculates based on data obtained by the simulation, the evaluation markers for evaluating an enterprise performance, and visualize and display them as a graph, a table or the like.

Figure 25:
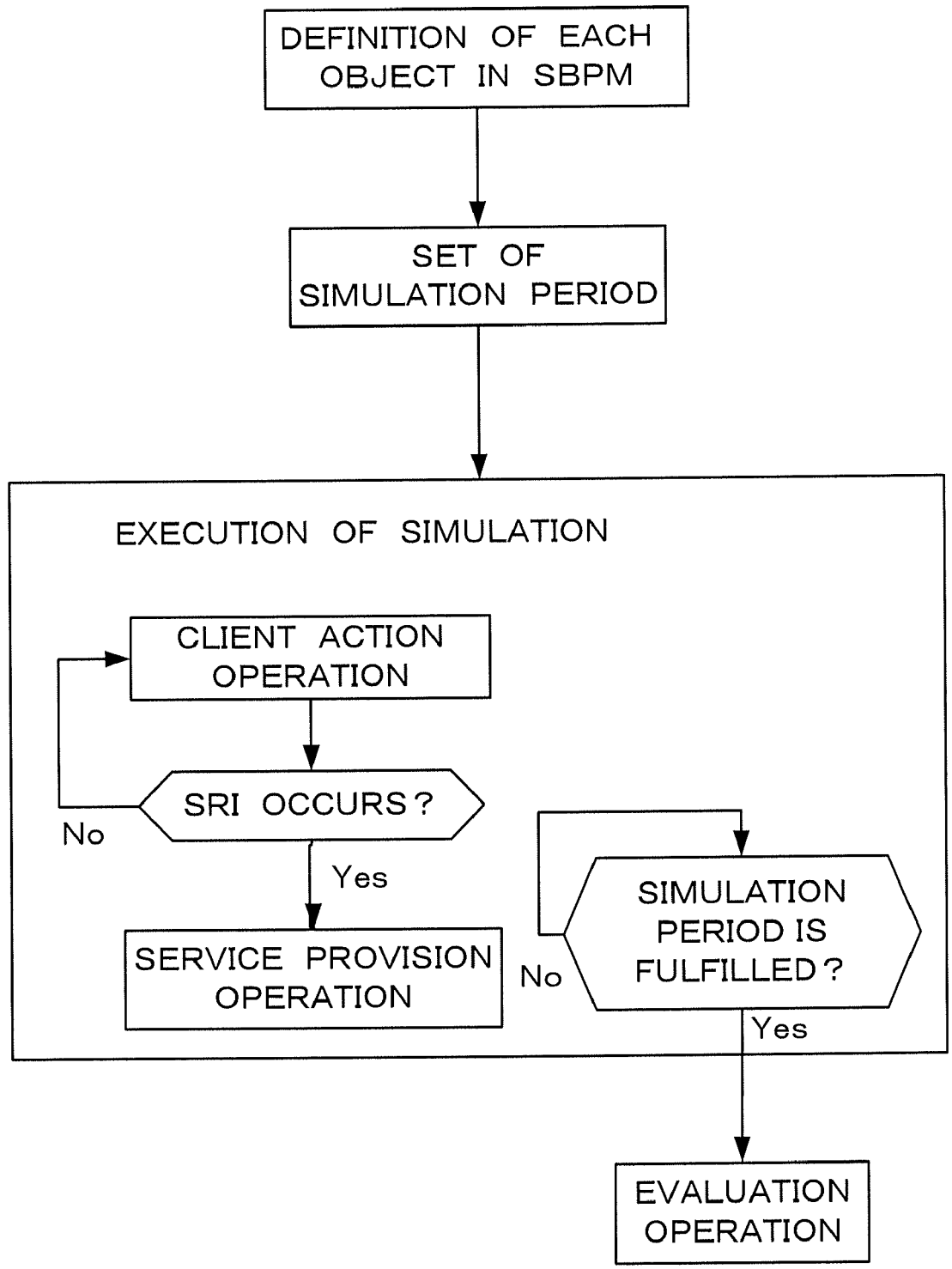
FIG. 25 is a flow chart showing an entire flow to execute the process management support system.

FIG. 25 shows an outline of sequence for executing the process management support system of the present invention. First, the definition operation for each object constituting the SBPM is executed. Next, the simulation period is determined and the simulation is executed. In the simulation, the client action operation which is an simulation of the action of the CLIENT 103 is executed. When the SRI occurs from the acting COP, the service provision operation corresponding to the SRI is executed. In the service provision operation includes the service provision progress operation and the position operation.

In a case where there are plural CLIENTs 103, the client action operation is executed with respect to each client. The SRI which is a request of service occurs from the action of each client. In this way, Through the action of each client, the operation occurs for providing the service replying to the request of each CLIENT 103. When the simulation period is fulfilled, the execution of the simulation ends and the evaluation operation is executed base on data obtained by the simulation. In the evaluation operation, the various kinds of evaluation markers with respect to each of the SRIs which have occurred during the simulation are obtained, and visualized to be displayed on a monitor like a graph or a table.

Figure 26:
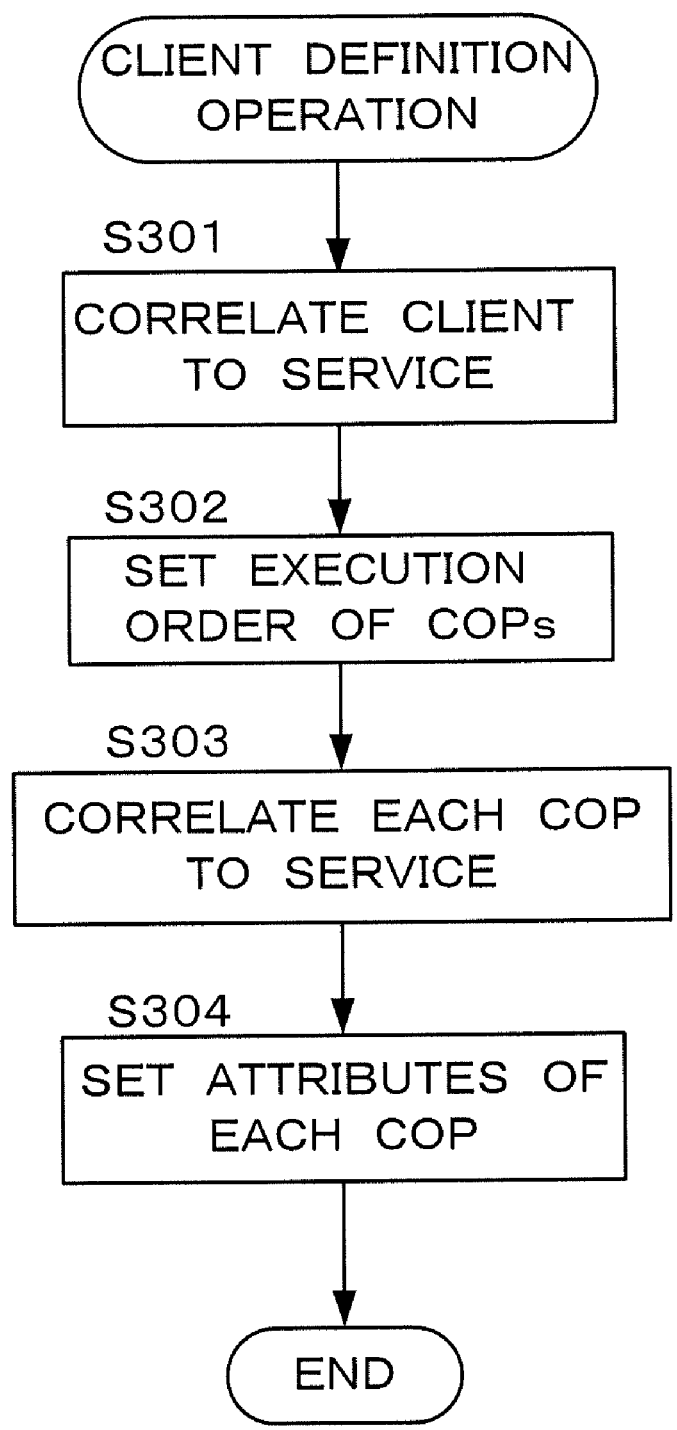
FIG. 26 is a flow chart showing the sequence of operations in the client definition operation.

In what follows, the operations to be executed by each portion in the control unit 230 will be described. The definition operation by the definition portion 231 will be described. First, the client definition operation controlled by the client definition portion 231a will be described in accordance with a flow chart shown in FIG. 26. First, in step S301, the CLIENT 103 and the SERVICE 104 are correlated to each other. Next the operation progresses to step S302 to set the execution sequence of the plural COPs and, in step S303, each service and each COP are correlated to each other. Finally, in step S304, the attributes of COP such as the occurrence condition of SRI, and the attributes of SRI such as the fee and the required skill field are set. The concrete setting method and items to be set are those mentioned in the above example. Note that the action of the CLIENT 103 which should be defined for the COP is the action where a request to the ENTERPRISE 101 is needed.

Figure 27:
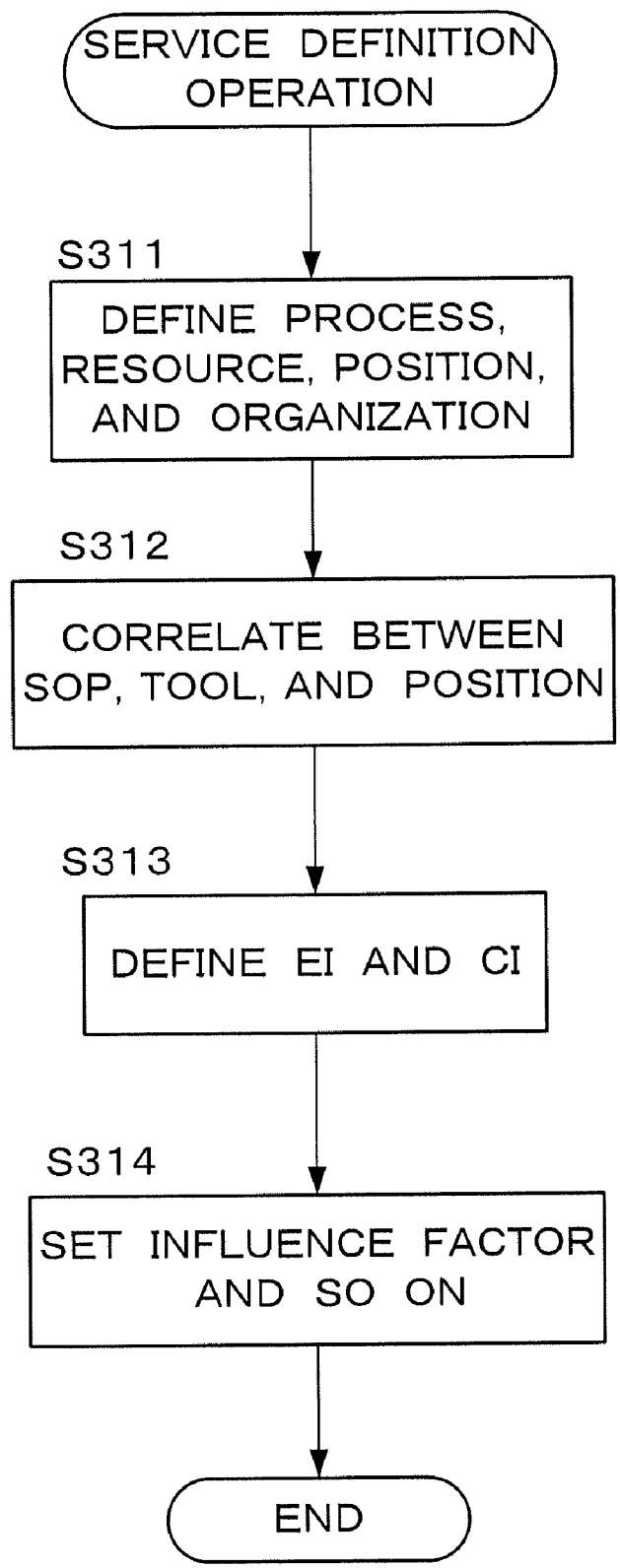
FIG. 27 is a flow chart showing the sequence of operations in the service definition operation.

Next, the service provision operation controlled by the service definition portion 231b will be described in accordance with a flow chart shown in FIG. 27. First, in step S311, each object in the PROCESS 108, the ORGANIZATION 109, the POSITION 110 and the RESOURCE 111 is defined. Thereby, the scope of service is determined. Next, the operation progresses to step S312 to correlate the SOP 130 constituting the PROCESS 108 to the TOOL 121 and the POSITION 110. In step S313, the attributes which should be correlated to the EI and the CI are defined. In step S314, items necessary for the simulation, such as the influence factor which gives an influence to operations of the POSITION 110, are set, the operations of the POSITION 110 including the operations to the EI and the CI, the operation velocity and so on. The concrete procedures and items to be set are those mentioned in the above example.

The operations relating to the simulation executed in the simulation portion 232 will be described. The simulation is executed based on time for simulation which progresses faster than actual time. Accordingly, time measurement in the simulation is measurement of the time prepared for the simulation. When operations under actual time are required, the operations are executed by converting the time for the simulation into the actual time.

Figure 28:
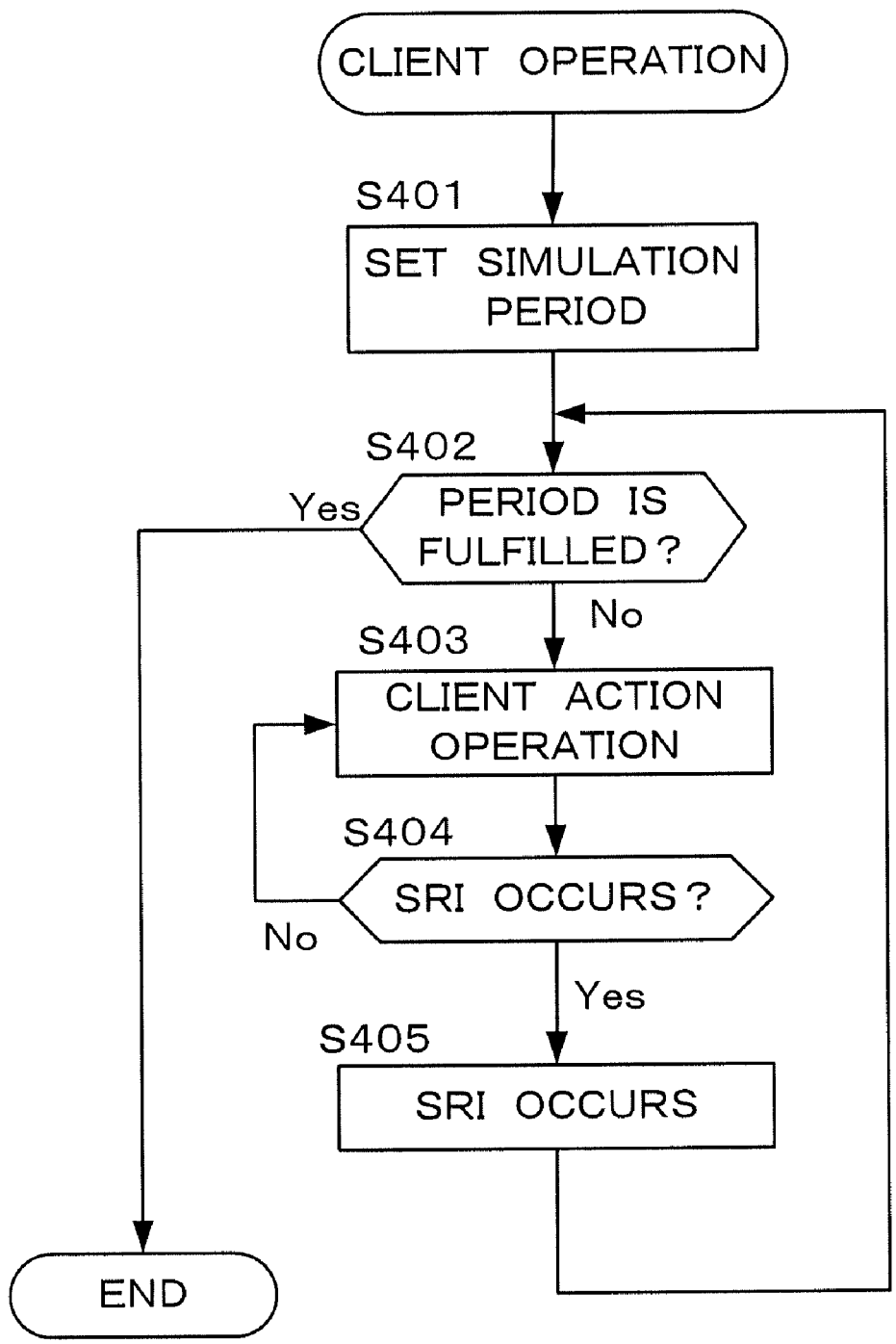
FIG. 28 is a flow chart showing the sequence of operations in the client operation.

First, the client operation controlled by the client operation portion 232a will be described in accordance with a flow chart shown in FIG. 28. In a case where there are plural CLIENTs 103, the client operation is executed with respect to each of the CLIENTs 103. First, in step S401, the simulation period is determined. This period can be determined by a user, or automatically determined based on predetermined data of the other system. Subsequently, in step 402, it is determined whether the period is fulfilled or not. When the period is fulfilled, the client operation is ended. When the period is not fulfilled, the operation progresses to step S403 to execute the client action operation. In the client action operation, as mentioned above, the plural COPs are made come into a state of "acting" in a predetermined sequence, and the timing when the SRI occurs in the acting COP is determined. The acting COP is determined by the action sequence which is defined by the successor link 105, the action time which is defined for the COP and the like.

The Occurrence timing of the SRI is determined based on the attributes of SRI, such as the probability showing a predetermined variance. In step S404, when it is determined that it is the timing when the SRI should occur, the operation progresses to step S405 where the SRI occurs from the acing COP, and returns to step S402.

Figure 29:
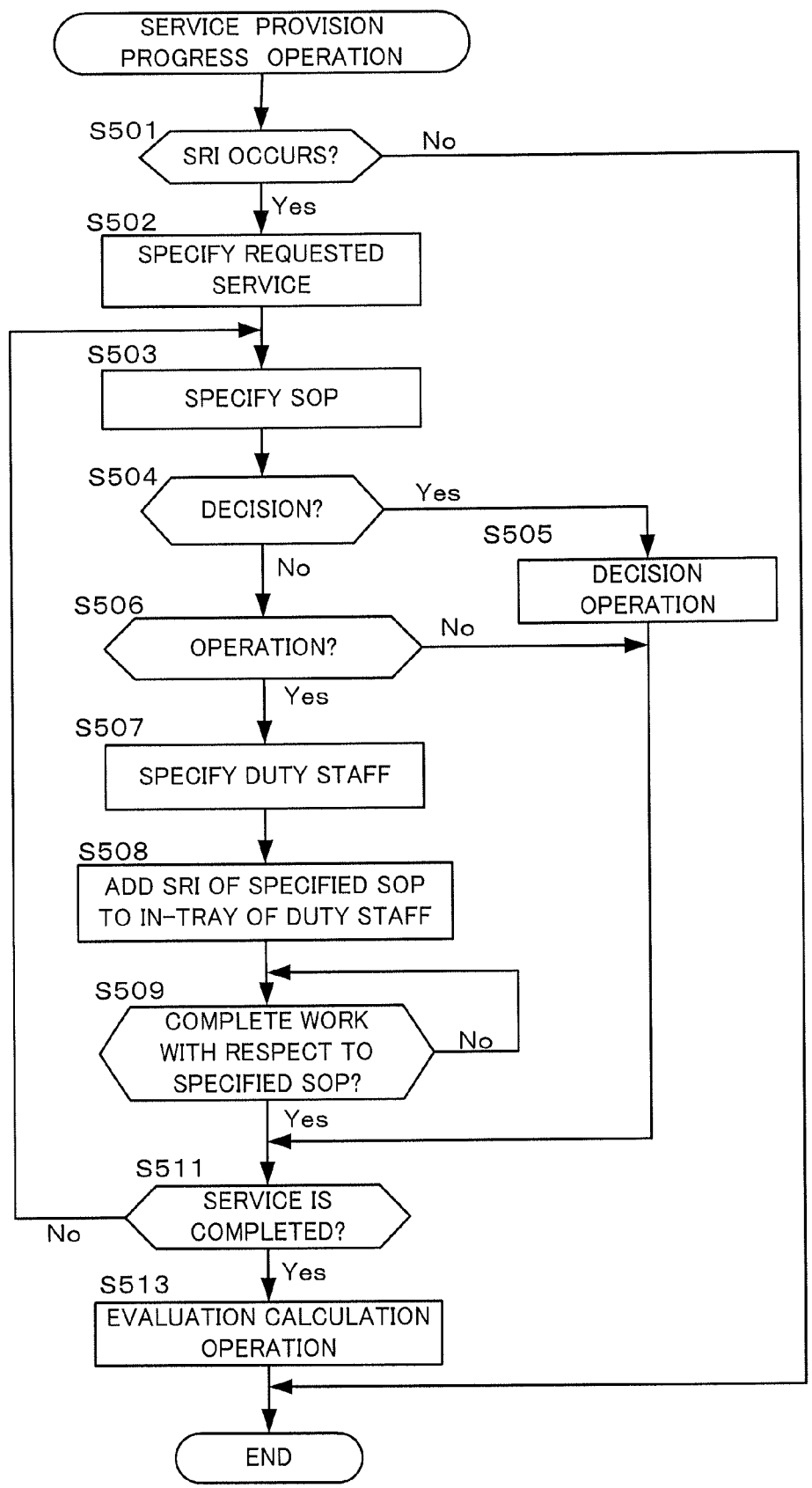
FIG. 29 is a flow chart showing the sequence of operations in the service provision progress operation.

The service provision progress operation controlled by the service provision progress portion 232b will be described in accordance with a flow chart shown in FIG. 29. In the following description, when it is needed to identify each of plural SRIs, each SRI is referred to as the one with number like "SRI-n". The service provision progress operation is executed each time the SRI occurs at any of COPs. First, in step S501, it is determined whether the SRI has occurred or not at the COP, when the SRI has not occurred, the service provision progress operation is terminated. In a case the SRI has occurred, the operation progresses to step S502 to specify the service required by the SRI. In the present embodiment, the required SERVICE 104 can be specified by the request link 107 correlated to the COP. Next, in step S503, the first one of the SOPs constituting the PROCESS 108 of the specified SERVICE 104 is specified as an object to be executed. Subsequently in step S504, it is determined whether the specified SOP is the DECISION 133 or not. When the specified SOP is, the operation progresses to step S505 to execute the decision operation.

In the decision operation in step S505, a branch destination is determined depending on the branch condition and the branch destinations correlated to the DECISION 133. When the branch destination is determined, the operation progresses to the step S511. In step S511, the provision of the SERVICE 104 has been completed or not, the SERVICE 104 being required by the SRI which has occurred. When the branch destination is the EXIT 132, it is determined that the service has been completed, and the operation progresses to step S513. When the branch destination is the SOP, it is determined that the service has not been completed, and the operation progresses to step S503 to execute the operations with respect to the SOP to be the branch destination.

In step S504, when it is determined that the specified SOP is not the DECISION 133, the operation progresses to step S506 to determine whether the specified SOP is the OPERATION 130 or not. When it is not the OPERATION 130, the operation progresses to step S511. In step S511, for example, in a case where the specified SOP is the EXIT 132, it is determined that the service is completed, and the operation progresses to step S513. When it is determined the service is not completed, the operation returns to step S503 to specify the next SOP.

In step S506, when it is determined that the specified SOP is the OPERATION 130, the procedure progress to step S507 to specify the POSITION 110 (in what follows, referred to as "the duty staff") who executes the specified SOP. The POSITION 110 to be correlated to the OPERATION 130 may be specified at the moment of defining the OPERATION 130. Subsequently, the operation progresses to step S508 to record the SRI of the specified SOP 130 (e.g. "SRI-1") as a work to an in-tray of the specified duty staff. The operation of SOP 130 after the SRI-1 is recorded in the in-tray is executed in the position operation controlled by the position operation portion 232c. The details of position operation will be described.

In step S509, it is determined whether the work with respect to the specified SOP 130 (the SOP corresponding to the SRI-1) has been completed or not. For example, when the out-tray of the duty staff accepts from the position operation portion 232c, an operation completion notice indicating that the operation with respect to the SRI-1 is completed, it is determined that the work with respect to the specified SOP 130 has been completed. When the work with respect to the SOP 130 has been completed, the operation progresses to step S511 to determine whether the service required by the SRI has been completed or not. In a case where all of the operations included in the PROCESS 108 corresponding to the SRI have been completed, that is, in a case where the next SOP is the EXIT 132, it is determined that the service is completed. In a case where the service is completed, the operation progresses to step S513 to execute an evaluation calculation operation. In the evaluation calculation operation in step S513, with respect to the SRI the operation of which has been completed, the evaluation markers with respect to the SRI are calculated based on data recorded by the operation log record portion 232d. The evaluation markers to be calculated are, as mentioned above, the profitability, the work efficiency, the service lead time, the service quality, the Work Breakdown and the like. After the evaluation calculation operation finishes, the service provision progress operation is terminated. In step S511, when it is determined that the service has not been completed, the operation returns to step S503 to specify the next SOP.

In what follows, the position operation controlled by the position operation portion 232c will be described. The position operation is the operation for simulating the procedures that the operations with respect to the SOP are executed concretely by each POSITION 110 (the duty staff or the manager). The outline of the position operation of the present invention will be described using FIG. 30. In an example shown in FIG. 30, the staff 110b is correlated to the SOP 130a as the duty staff to execute the SOP 130a. The manager 110a is correlated to the staff 110b as a boss. The in-tray 140 and the out-tray 141 are correlated to the staff 110b, and the in-tray 150 and the out-tray 151 are correlated to the manager 110a.

The procedure for executing works recorded in the in-tray 140, 150 is basically same between each POSITION 110. First, any one of the plural works recorded in the in-tray 140, 150 is selected based on the predetermined condition as a work to be executed (in what follows, referred to as "the handling work"), and the selected handling work is executed. As "the execution of the handling work", for example, the expected operation time is obtained from the above mentioned workforce and expected work volume and the expected operation time is spent. If there is an item to be determined, the determination is made based on a predetermined condition. When the handling work finishes, the handling work which has finished is recorded in the out-tray 141, 151 as "the handled work". Depending on the kind of work, any one of "the handled SRI", "the handled EI", or "the handled CI" is used.

Figure 30:
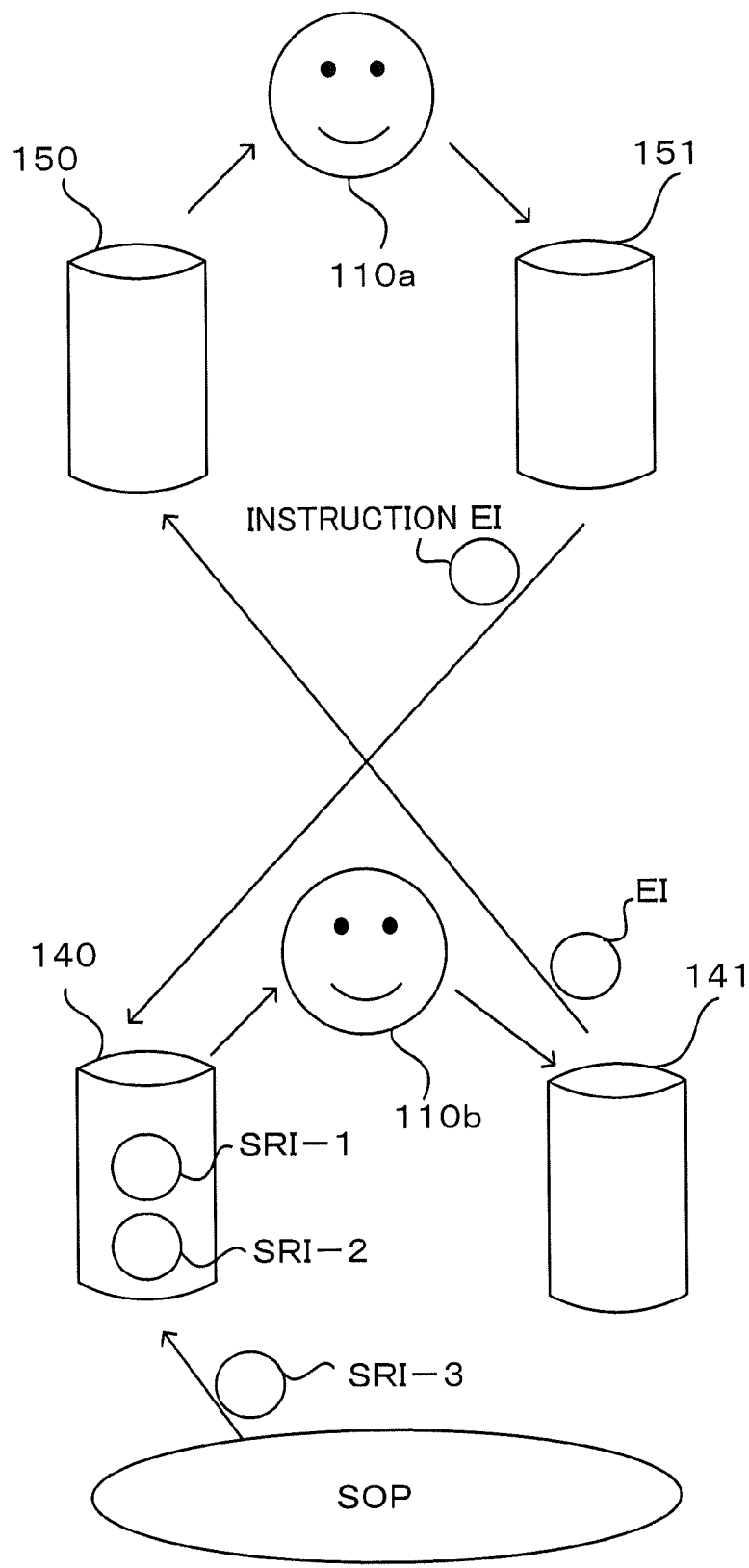
FIG. 30 is a diagram showing a state that the SRI is handled at each of the staff and the manager.

FIG. 30 shows a state that, in a situation that two SRIs (the SRI-1 and the SRI-2) have been already recorded in the in-tray 140, a SRI (the SRI-3) requiring the operation of the SOP 130a is added to the in-tray 140. The staff 110b executes the work recorded in the in-tray 140. In a case where a plurality of works exist in the in-tray 140 as shown in FIG. 30, the work to be executed is determined based on a priority level correlated to each work, a sequence the works are recorded or the like. The handled work is recorded in the out-tray 141, and then, it is notified to the service provision progress portion 232b that the operation of the corresponding SOP 130 is completed.

In addition, in the present embodiment, in a case where the Exception occurs with respect to the operation of SOP 130, the exception operation is executed to address the Exception. There is a case where the exception operation is executed only by the staff 110b, and there is a case where the exception operation is executed by obtaining from the manager 110a, an instruction indicating an addressing action. In what follow, the procedure for the case of obtaining the instruction from the manager 110a will be described. It is determined whether the Exception has occurred or not, based on a predetermined Exception occurrence condition at the moment when the handled SRI as the handled work is recorded in the out-tray 141. The handled SRI becomes a work (EI) to address the Exception and is recorded in the in-tray 150 of the manager 110a. The manager 110a executes the EIs recorded in the in-tray 150 in a sequence they are recorded.

The instruction with respect to the EI is determined by the operation at the manager 110a. The handled work which the operation is completed by the manager 110a is recorded in the out-tray 151, and is recorded as the EI with instruction (in what follows, referred to as "the instruction EI" or "the intention-determined EI" in the in-tray 140 of the staff 110b. When the instruction EI recorded in the in-tray is selected as the handling work, based on the instruction of the manager 110a, for example, the repeat operation is executed. When the repeat operation finishes, the handled EI is recorded in the out-tray 141, it is notified to the service provision progress portion 232b that the operation with respect to the SRI corresponding to the handled EI is completed.

In the present invention, in the same way as the above mentioned exception operation, also the information exchange operation which requires an operation at the other staff 110c is executed. In a case of the Information Exchange, the SRI becomes the work (CI) to address the Information Exchange. In the other staff 110c who is the other side of the information exchange, similar operation to the manager 110a in the exception operation is executed.

A temporal relation of operations of the staff 110b and the manager 110a, in a case where the SRI is recorded in the in-tray 140 of the staff 110a one after another with time, will be described using a sequence diagram shown in FIG. 31. What follows is described about operations to be executed after the Exception with respect to the SRI-0 occurs until the operation of the SRI-0 is completed by obtaining the instruction from the manager 110a. In the present invention, the works recorded in the in-tray 140, 150 are executed in a sequence they are recorded. In the in-tray 140, only the numbers of the recorded SRIs are shown. While the staff 110b is executing the SRI-0 (step S160), the SRI-1 is recorded in the in-tray 140 (step S161). The SRI-0 is, when the operation thereof finishes, recorded in the out-tray 141 as the handled SRI-0, and it is determined whether the Exception has occurred or not (step S162).

In the present invention, it is determined that the Exception occurs, and the determination of the manager 110a is required. Accordingly, the handled SRI-0 is recorded in the in-tray 150 of the manager 110a as the EI-0 (step S163). The staff 110b comes into, with respect to the EI-0, a state of the Decision Wait of the manager 110a. At this moment, in a case where the other work is recorded in the in-tray 140, the other work is executed. In the present embodiment, since the SRI-1 has been recorded, the SRI-1 is selected as the handling work (step S164), the staff 110*b* executes the SOP corresponding to the SRI-1 (step S165).

At the moment when the EX-0 is recorded in the in-tray 150, the manager 110*a* is executing the operation with respect to the EI-X0 from the other staff (step S166). When the operation with respect to the EI-X0 finished, the EI-X0 is recorded in the out-tray, and the EI-X0 with instruction is recorded in the in-tray of the other staff (step S167). When the EI-X0 is recorded in the out-tray 151, The EI-0 which is in a state of waiting operation is selected as the handling work (step S168), and the EI-0 is executed (step S169). When the EI-0 finishes, that is, when the instruction for addressing the Exception is determined, the instruction EI-0 is recorded in the out-tray 151 (step S170). Subsequently, the instruction EI-0 is also recorded in the in-tray 140 of the staff 110*b* (step S171).

In the present invention, the SRI-2 is recorded in the in-tray 140 before the instruction EI-0 is recorded (step S172). After the SRI-1 which was executing at the moment when the instruction EI-0 was recorded in the in-tray 140 is executed, the handled SRI-1 is recorded in the out-tray 141 (step S173). When the handled SRI-1 is recorded in the out-tray 141, it is determined whether the Exception has occurred or not. In the present embodiment, it is determined that the Exception has not occurred. Accordingly, it is notified to the service provision progress portion 232*b* that the operation corresponding to the SRI-1 is completed (step S174).

When the handled SRI-1 is recorded in the out-tray 141, the next work is selected from the works recorded in the in-tray 140. In the in-tray 140, the SRI-2 and the instruction EI-0 are recorded. Since the SRI-2 is recorded earlier, the SRI-2 is selected as the handling work (step S175). When the SRI-2 finishes, it is determined whether the Exception has occurred or not. In the present embodiment, it is determined that the Exception has occurred (step S176). The procedure executed from the moment of occurrence of Exception until the moment when an instruction is obtained from the manager 110*a* is similar to the case mentioned above. On the other hand, before the SRI-2 finishes, the SRI-3 is recorded in the in-tray 140 (step S177).

When the handled SRI-2 is recorded in the out-tray 141 after the SRI-2 finishes, the next handling work is selected to the staff 110*b* from the works recorded in the in-tray 140. In the in-tray 140, the SRI-3 and the instruction EI-0 are recorded. Since the instruction EI-0 is recorded earlier, the instruction EI-0 is selected as the handling work. The instruction EI-0 is executed by the staff 110*b* based on the instruction of manager 110*a* (step S179). When the EI-0 finishes, the handled EI-0 is recorded in the out-tray 141 (step S180). For the handled EI-0 for which the exception operation has been executed, without determining whether the Exception has occurred, it is notified to the service provision progress portion 232*b* that the operation with respect to the SRI-0 corresponding to the EI-0 is completed (step S181). The service provision progress portion 232*b* which has accepted the notice specifies the SOP to be executed next with respect to the SRI-0.

Figure 31:
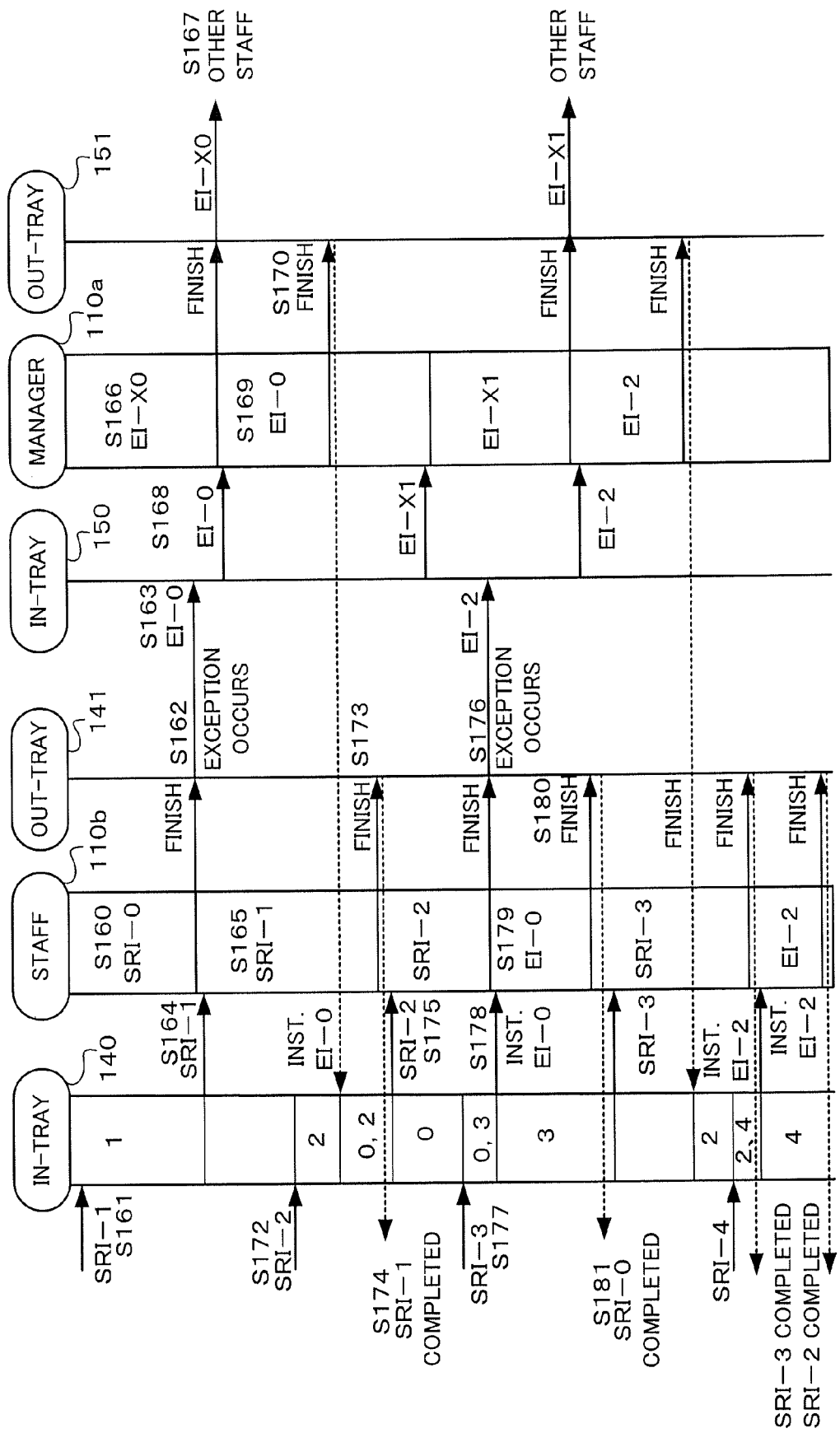
FIG. 31 is a sequence diagram showing a temporal relation of operations at each of the staff and the manager, with respect to operations of the plural SRIs.

The staff 110*b*, the manager 110*a*, the in-tray 140 and the out tray 141 of the staff 110*b*, and the in-tray 150 and the out tray 151 of the manager 110*a*, which are shown in FIG. 31, are the objects for which the operation time, the number of executions and the like with respect to each WI (SRI, CI, EI) are recorded by the operation log record portion 232*d*. For example, for each SOP, the operation time required for each SOP is recorded. With respect to the in-tray 140 and the out-tray 150, the SRI counts being recorded in the tray 140, 150 and the duration of each SRI counts are recorded. Additionally, the number of SRIs, the number of EIs and the number of CIs which are executed in the simulation are also counted.

Moreover, the operation log record portion 232*d* records the occurrence timing and the operation completion timing of each WI. The state of each POSITION 110*a* is recorded and the duration of each state is measured for each SOP. The data recorded in the simulation by the operation log record portion 232*d* is associated with the provided SERVICE 104. The operation time, the waiting time, the number of pieces and the like which are recorded in the simulation by the operation log record 232*d* are the general ones in a conventional event-driven-type simulation tool. From theses kinds of data, in the evaluation calculation operation and an evaluation operation which will be described later, it is possible to obtain the evaluation markers which are used in an actual world of the business process in various aspects.

Figure 32:
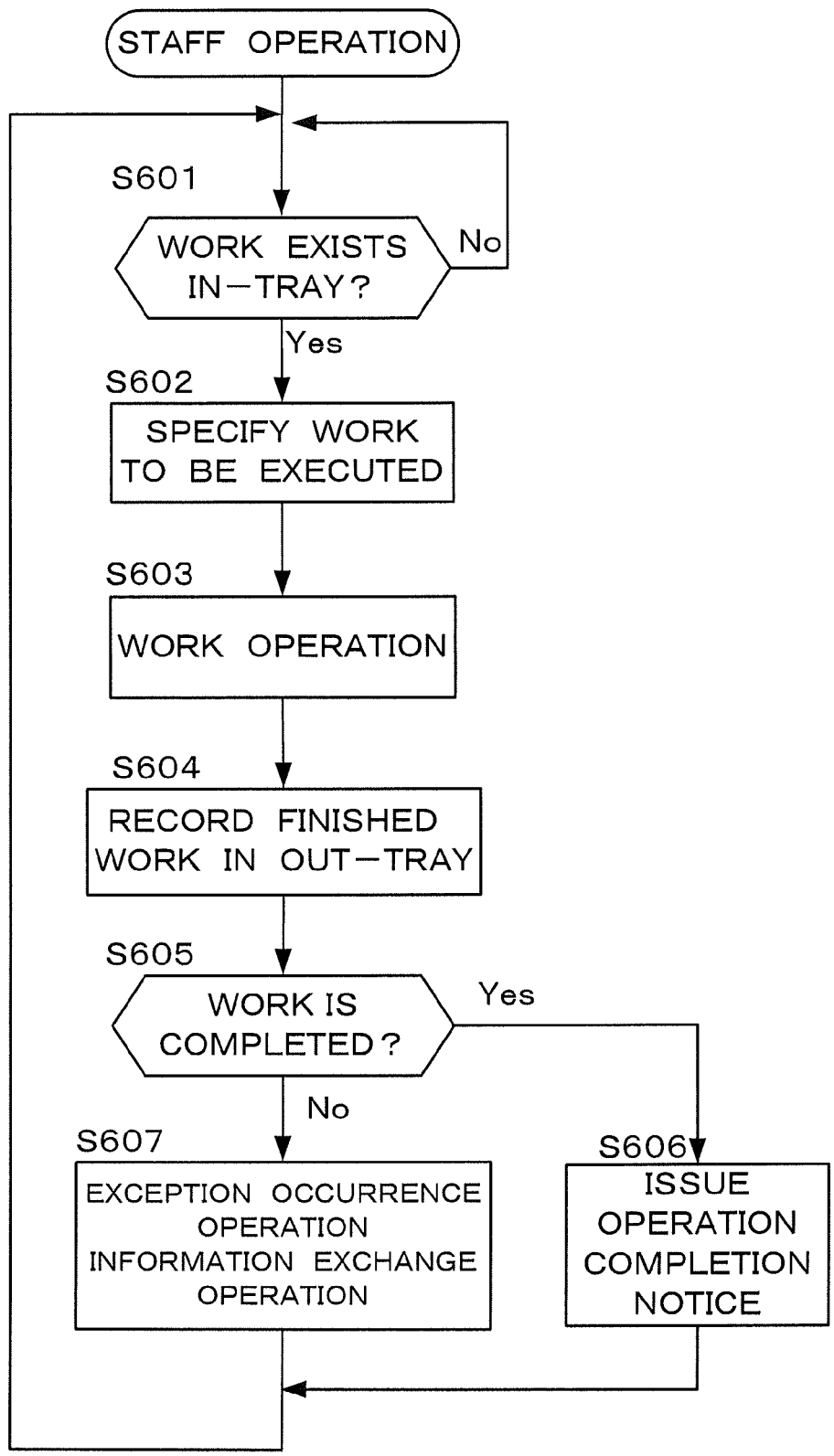
FIG. 32 is a flow chart showing the sequence of operations in the staff operation.

In the position operation, a staff operation for simulating the motion of the staff 110*b* and a manager operation for simulating the motion of the manager 110*a* are included. First, the staff operation will be described in accordance with a flowchart shown in FIG. 32. The staff operation is executed repeatedly in the simulation for each POSITION 110 as the duty staff.

First, in step S601, the in-tray 140 correlated to the staff 110*b* is referred, it is determined whether a work exists in the in-tray 140 or not. In a case where the work exists in the in-tray 140, the operation progresses to step S602 to specify the handling work from the works existing in the in-tray 140, for example, in a sequence they are recorded in the in-tray 140. Although the work includes the SRI, the EI and the CI, first, a case where the SRI is specified as the handling work will be described. The cases where the EI and the CI are selected as the handling work will be described later.

When the handling work is specified, the operation progresses to step S603 to start, as the work operation, the operation with respect to the SOP 130 corresponding to the SRI (in what follows, referred to as "the handling SOP"). In the operation with respect to the handling SOP, for example, the operation time to be obtained by executing the handling SOP is calculated. The operation time is obtained by the expected operation time (the expected work volume/the operation velocity). When the operation with respect to the handling SOP finishes in step S603, the operation progresses to step S604 to record the handled SRI with respect to the handling SOP in the out-tray 141.

Subsequently, the operation progresses to step S605 to determine whether the operation with respect to the work recorded in the out-tray 141 is completed or not. When the recorded work is the handled EI or the handled CI, it is determined that the work is completed. Then, the operation progresses to step S606 to issue to the service provision progress portion 232*b*, the operation completion notice with respect to the corresponding SRI. After notifying the operation completion, the operation returns to step S601 to execute the next work. In a case where it is not determined that the operation with respect to the work is completed, the operation progresses to step S607 to execute the exception occurrence operation and the information exchange operation. The exception occurrence operation and the information exchange operation will be described later. After the exception occurrence operation and the like finishes, the operation returns to step S601 to execute the next work recorded in the in-tray 140. The staff operation is terminated forcibly at the moment when the simulation period is fulfilled.

Figure 33:
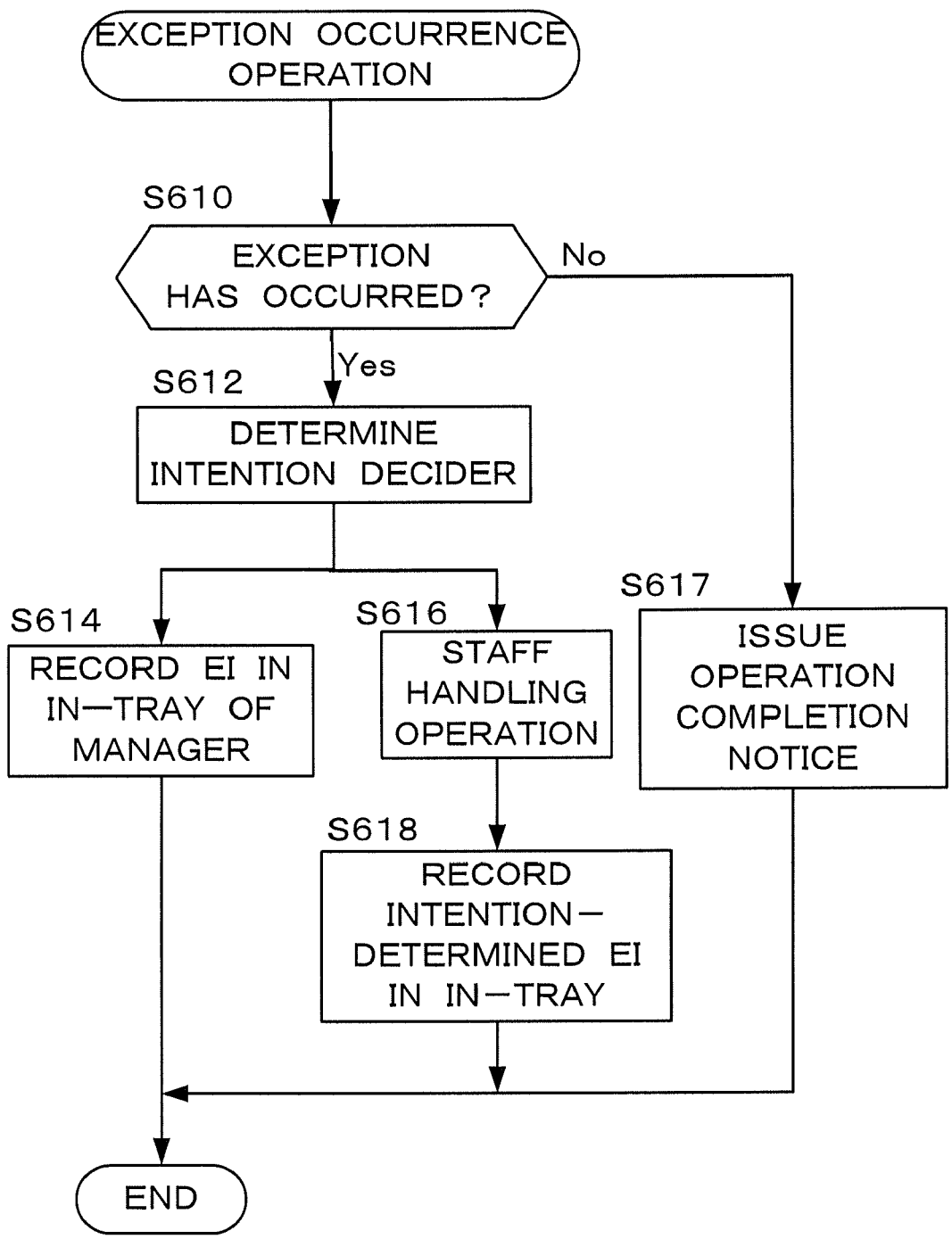
FIG. 33 is a flow chart showing the sequence of operations in the Exception occurrence operation.

The exception occurrence operation will be described in accordance with a flow chart shown in FIG. 33. First, it is determined whether the Exception has occurred or not. The occurrence of Exception is determined, as mentioned above, based on the expected occurrence ratio of Exception and the influence factor. In a case where the Exception has not occurred, the operation progresses to step S617 to issue to the service provision progress portion 232b, the operation completion notice with respect to the corresponding SRI and terminate the exception occurrence operation. In a case where the Exception has occurred, the operation progresses to step S612. In step S612, the intention decider is determined. In the present embodiment, based on the centralization of the ENTERPRISE 101, it is determined whether the Exception is handled by the manager 110a, a boss, or by the duty staff 110b. For example, the system is set so that the higher the centralization is, the more the exception operation is likely to be handled by the boss.

In a case where the manager 110a handles the Exception, the operation progresses to step S614 to record the handled SRI in the out-tray 141 in the in-tray 151 of the manager 110a as the EI and terminate the exception occurrence operation. The boss operation executed by the manager 110a will be described later. On the other hand, in step S612, in a case where the duty staff 110b handles the Exception, a staff handling operation is executed by the duty staff 110b in step S606. In the staff handling operation, the intention for addressing the Exception is determined. When this operation finishes, the operation progresses to step S618 to record the intention-determined EI in the in-tray 140 of the duty staff 110b and terminate the exception occurrence operation. The operation time of determining the intention is determined depending on the work volume and the operation velocity of the EI. The operation velocity is, in the same way as the operation velocity of the SRI, given an influence due to the skill of the staff 110b. The intention determination in the exception operation in the present invention is any one of "the rework" which means the handling SOP is completely repeated, "the half work" which means the half of handling SOP is repeated, and "the ignorance". This determination is determined based on a predetermined probability.

Figure 34:
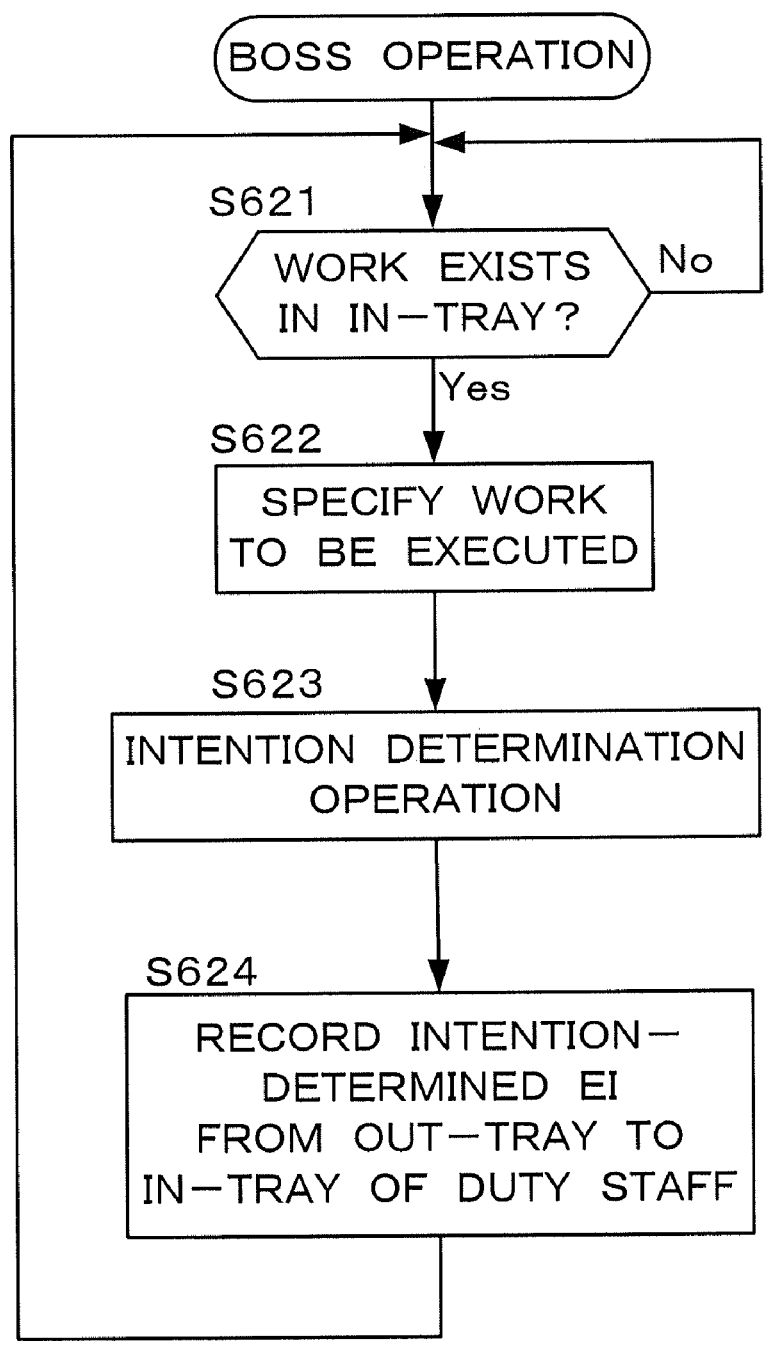
FIG. 34 is a flow chart showing the sequence of operations in the boss operation.

The boss operation which is the operation at the manager 110a will be described in accordance with a flow chart shown in FIG. 34. First, in step S621, it is determined whether the work exists in the in-tray 150 or not. The work recorded in the in-tray 150 of the manager 110a is the EI from each duty staff. In a case where the work exists in the in-tray 150, the work to be executed (the handling work) is determined. The handling work is specified in a sequence the works are recorded in the in-tray 150, in the same way as the staff operation. When the handling work is specified, an intention determination operation is executed as the work operation in step S623. In the intention determination operation, the intention of the manager 110a for addressing the Exception is determined in the same way as the staff handling operation mentioned above. When the intention is determined by the intention determination operation, the operation progresses to step S624 to record the intention-determined EI in the out-tray 151, and then record in the in-tray 140 of the duty staff.

In a case where the work specified in step S602 in the staff operation is the intention-determined EI, the EI operation is executed as the work operation in the subsequent step S603. The EI operation is an operation executed based on the intention determination correlated to the EI. For example, in a case of the EI for the SOP, the work volume of which is ten human-time, when the intention determination is "the half work", the work volume is five human-time. The position operation portion 232c changes only the work volume and executes the same operation as the usual SRI. After the EI operation finishes, the handled EI which indicates that the EI operation has finished is recorded in the out-tray 141.

Figure 35:
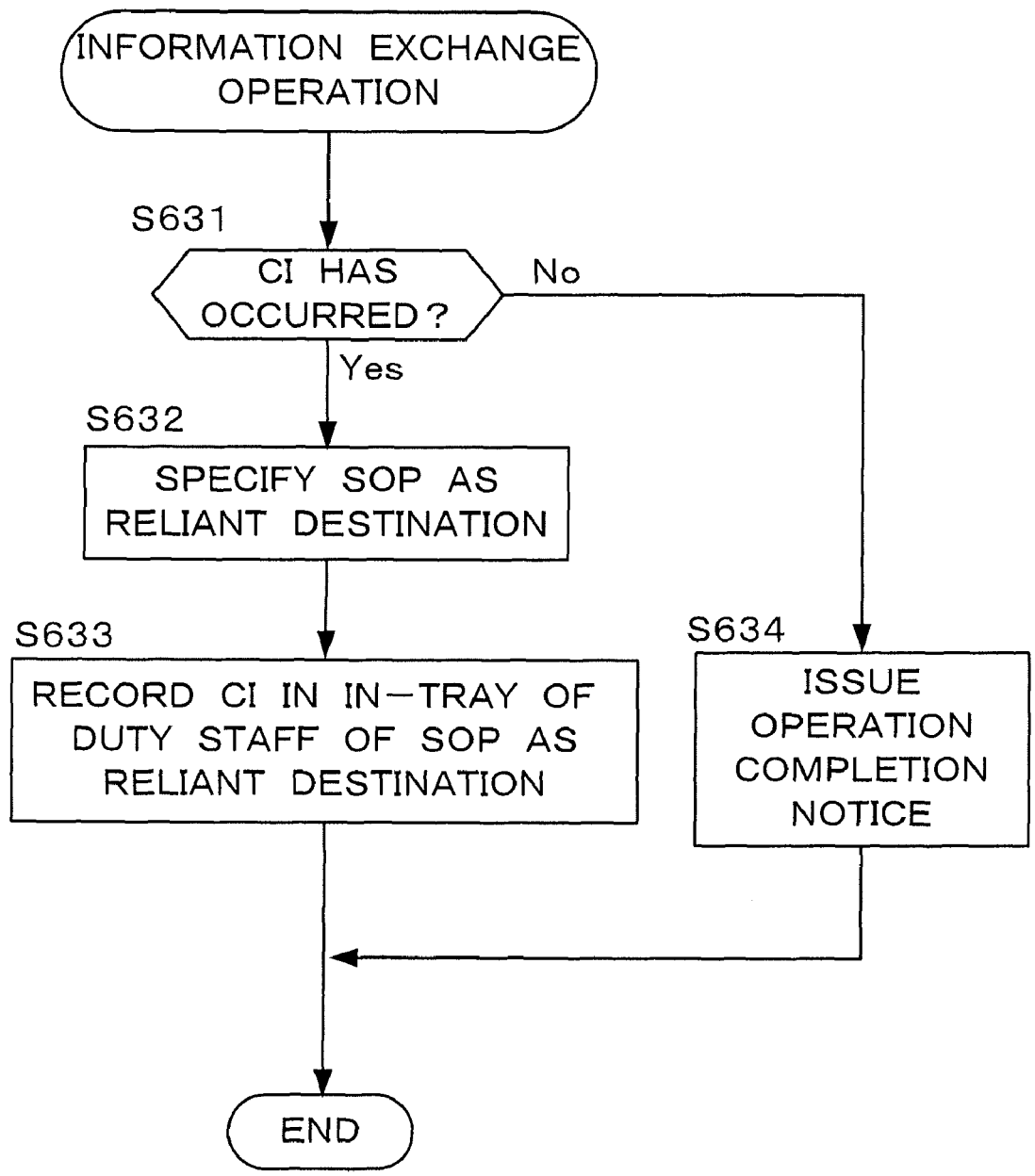
FIG. 35 is a flow chart showing the sequence of operations in the information exchange operation.

The information exchange operation will be described in accordance with a flow chart shown in FIG. 35. First, in step S631, with respect to the handling SOP, it is determined whether CI, the work for the Information Exchange has occurred or not. The occurrence of the CI is determined, as mentioned above, based on the uncertainty of the handling SOP, the formalization of the ENTERPRISE 101 and the like. For example, as the formalization is higher, the probability of executing a formal information exchange such as a meeting and a conference is hither. In a case where the CI has not occurred, the operation completion notice with respect to the corresponding SRI is issued in step S634, and then, the information exchange operation is terminated. In a case where the CI has occurred, the operation progresses step S632 to specify the SOP 130 linked as a reliant destination of information of the handling SOP by the communication link 119. When the SOP 130 as the reliant destination of information is specified, the operation progresses to step S633 to record the CI with respect to the handling SOP in the in-tray of the duty staff of the SOP as the reliant destination of information (in what follow, referred to as "the reliant destination staff") and terminate the information exchange operation.

The staff operation for the reliant destination staff will be described. When, in step S602 in the staff operation for the reliant destination staff, the CI is specified as the handling work, in step S603, the CI operation as the work operation is executed. In the CI operation, the operation time is calculated depending on the work volume correlated to the CI, and the time is spent. When the CI operation finished, the handled SRI with respect to the handling SOP is recorded in the out-tray 141 of the duty staff 110b via the out-tray of the reliant destination staff.

Figure 36:
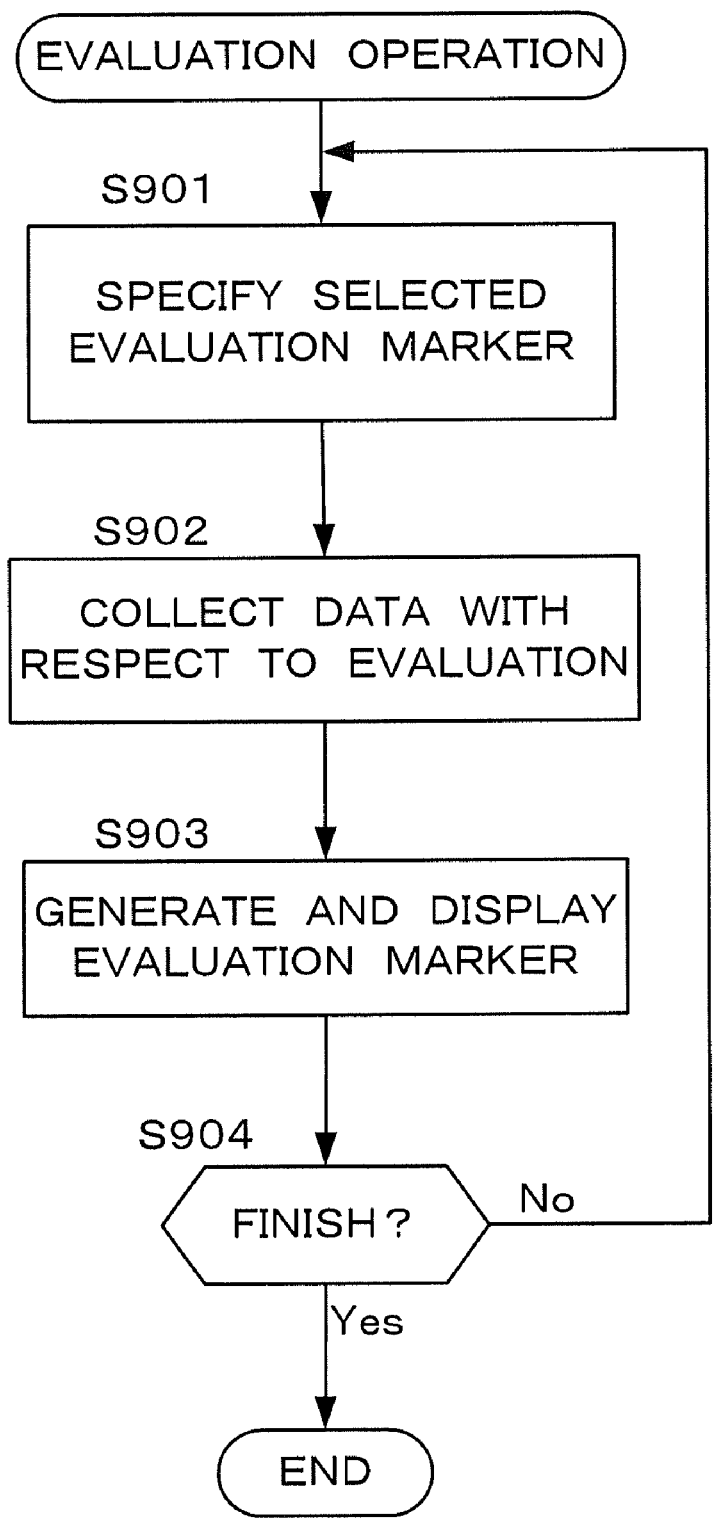
FIG. 36 is a flow chart showing the sequence of operations in the evaluation operation.

Finally, the evaluation operation controlled by the evaluation operation portion 233 will be described in accordance with a flow chart shown in FIG. 36. First, in step S901, a specific evaluation marker is selected from a predetermined menu by a user to specify the evaluation marker to be displayed. Next, in step S902, the data with respect to the evaluation calculated in step S513 for all SRIs in order to calculate the selected evaluation marker is collected. In step S903, the selected evaluation marker is calculated based on the collected data, and displayed on a monitor as a graph, a table or the like as mentioned above. After that, the operation progresses to step S904 to determine whether the evaluation operation finishes or not. In a case of terminating the evaluation operation, the evaluation operation is terminated. In a case of not terminating, the operation returns to step S901. For example, when a predetermined end operation is performed by a user, it is determined that the evaluation operation is terminated.

The control unit 230 as the client definition portion 231a functions as the COP definition device by step S302, functions as the COP correlating device by step S303, and functions as the occurrence condition definition device by step S304. The control unit 230 as the service definition portion 231b functions as the SOP definition device by step S311 and step S312. The control unit 230 as the simulation portion 232 functions as the client operation progress device by step S403, and functions as the request occurrence device by step S404, and functions as the service provision device by the service provision progress operation and the staff operation.

Further, the control unit 230 functions as the evaluation operation device by the evaluation operation. The control unit 230 as the service definition portion 231b function as the group definition device by step S311, and functions as the group allocation device by step S312. The control unit 230 as the simulation portion 232 function as the handling SOP specification device by step S503, functions as the queue record device by step S508, and functions as the operation execution device by the staff operation.

The present invention is not limited to the above embodiment, and can be executed as various embodiments. For example, in the above embodiment, for each POSITION 110, the head-count, the workforce and the like are set, and the operation is executed based on the set information. However, it is possible to correlate each member belonging to the ORGANIZATION 109 to each POSITION 110. In what follows, the procedure for correlating each member to each POSITION 110 will be described.

Figure 37:
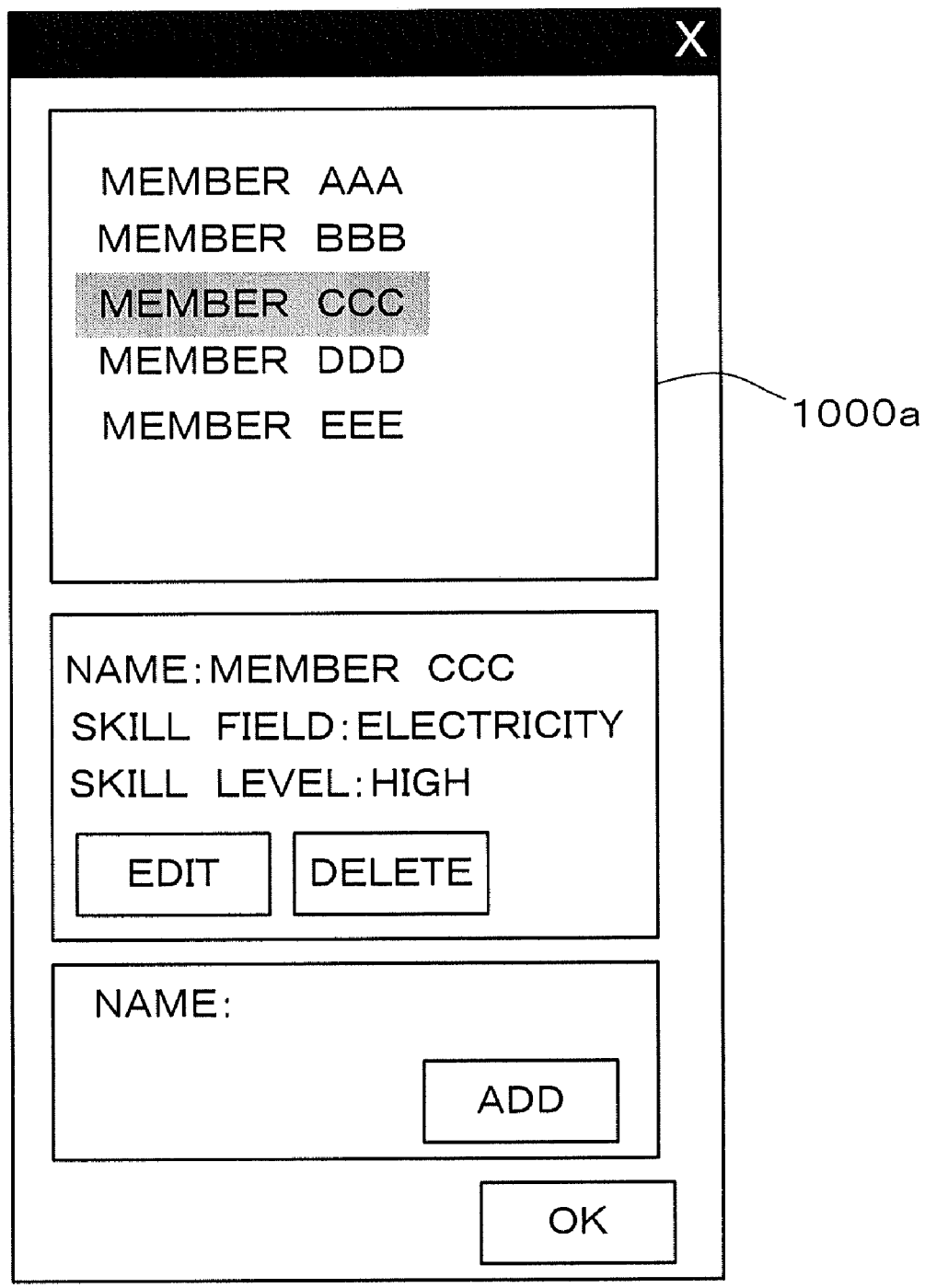
FIG. 37 is a diagram showing a screen for creating member list.

First, a member list is created. The member list can be created in a screen for creating member list 1000 as shown in FIG. 37. In the screen for creating member list 1000, the name and the attributes of each member can be recorded. As the attributes of member, for example, the skill level, the skill field, the experience level, the salary and the like are prepared. In the list portion 1000a, the members recorded in the member list are displayed. FIG. 37 shows a state that the five people, from the member AAA to the member EEE, are displayed in the list portion 1000a. For example, all of the members can be displayed by a predetermined scroll operation.

Figure 38:
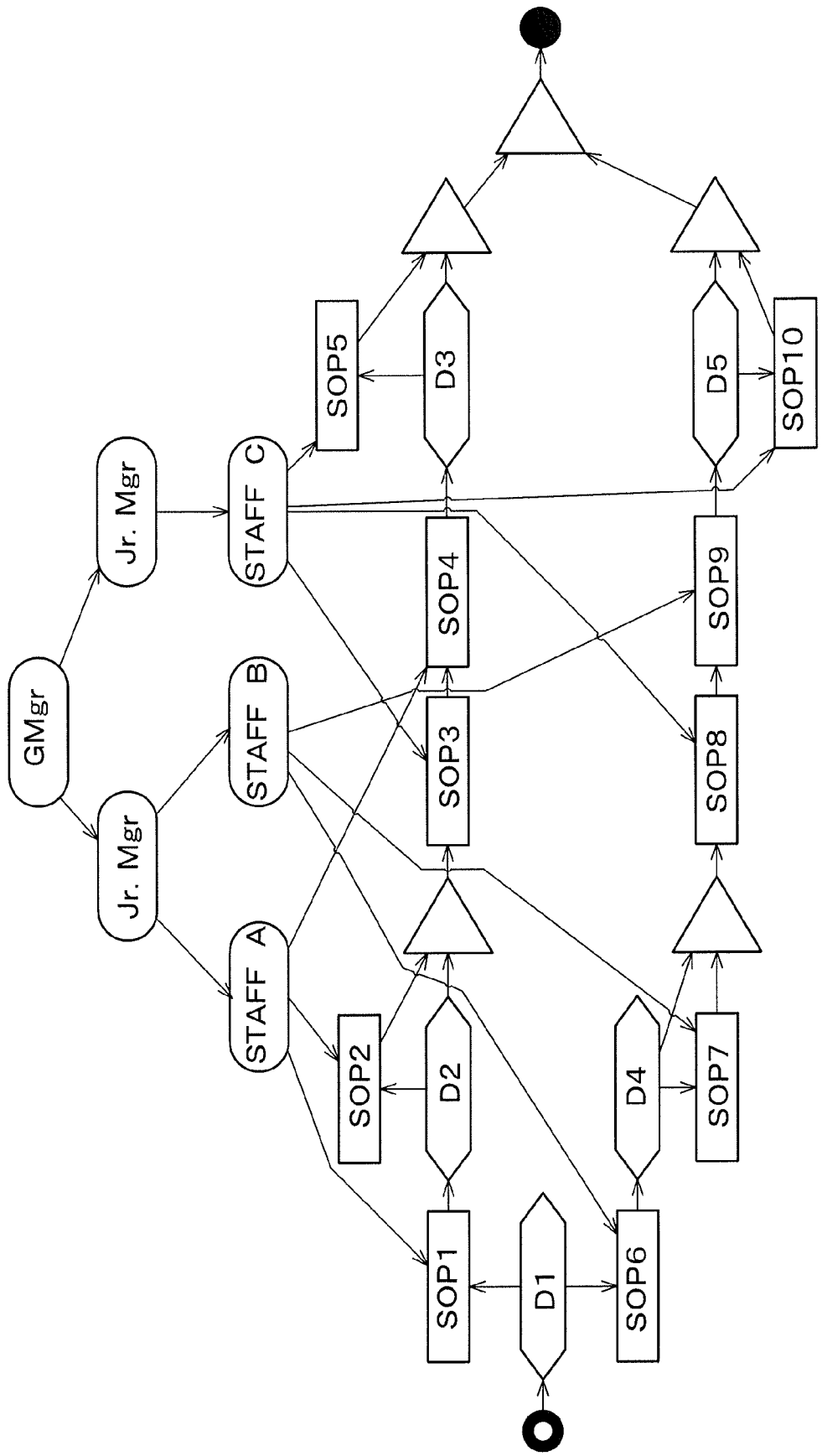
FIG. 38 is a diagram showing an example of the process of service in the present invention.
Figure 39:
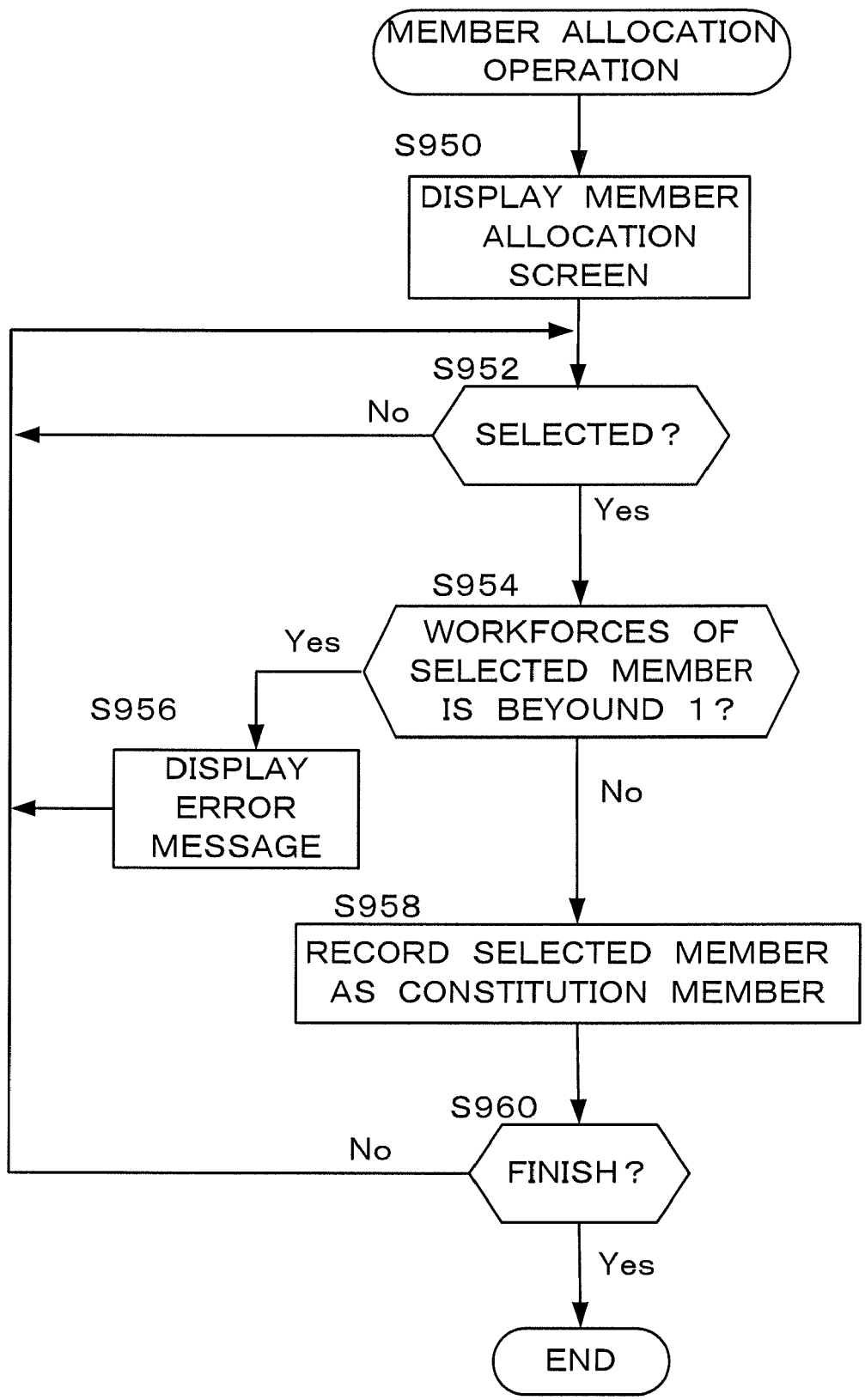
FIG. 39 is a flow chart showing the sequence of operation in the member allocation operation.

In what follows, the member allocation operation for allocating the members to the POSITION 110 in the PROCESS 108 shown in FIG. 36 will be described in accordance with a flow chart shown in FIG. 39. The member allocation operation is controlled by the control unit 230. In the PROCESS 108 shown in FIG. 38, each POSITION 110 is correlated to each SOP. In what follows, a case where the staff A is the POSITION 110, the object to be handled, will be described. First, in step S950, for correlating the members to the staff A, the POSITION 110 which is the object to be handled, the member allocation screen 1100 is displayed on a monitor.

For example, the staff A, the object to be handled, is selected in the PROCESS 108 displayed in the monitor by a predetermined selection method, and thereby, a member allocation screen 1100 as shown in FIG. 40 is displayed. When the member allocation screen 1100 is displayed, the procedure comes into a state of member selection waiting, and in step S952, it is determined whether the member to be correlated to the staff A is selected or not. In the member selection portion 1100a, the members recorded in the member list is displayed by a pull-down menu. Then, when an addition button is clicked, it is determined that "the displayed members are selected as the members constituting the staff A".

At the moment of selecting the member, with respect to the selected members, the ratio of workforce to be provided to the staff A is set. The workforce to be provided to a POSITION 110 indicates a ratio under the assumption that the maximum value of workforce for one member is 1. The members correlated to the staff A is displayed in the allocated member display portion 1100b. FIG. 40 shows an example that each of the member AAA and the member BBB is correlated to the staff A with the workforce of 0.5. In the member selection portion 1100a, the member CCC is selected, the ratio of workforce to be provided is set, and the addition button is clicked. Thereby, it is determined that the member CCC is selected. Subsequently, in step S954, it is determined whether a sum of workforces of the member CCC selected is beyond 1 or not.

In this way, in the present embodiment, each member can be allocated to plural POSITIONs, and the system is designed so that the sum of workforces to be provided to each POSITION is not beyond 1. For example, an accumulation value of workforces to be provided to POSITIONs 110 can be correlated to each member as the provision workforce. When the provision workforce of the member CCC is beyond 1, the operation progresses to step S956 to display an error message and return to step S952. When the provision workforce is not beyond 1, the operation progresses to step S958 to update the provision workforce of the member CCC and record the member CCC as a member to constitute the staff A. Thereby, the member CCC is allocated to the POSITION (staff A).

Next, in step S960, it is determined whether the member allocation operation is terminated or not. When it is determined that the member allocation operation is terminated, the member allocation operation is terminated. When it is determined that the member allocation operation is not terminated, the operation returns to step S952 to further add a member. For example, when the member allocation screen 1100 is closed, it is determined that the member allocation operation is terminated. in a case where the member is allocated to the staff A by the above mentioned way, the workforce of staff A is a total of the provision workforces with respect to the staff A of each member. The cost of staff A is a total of salaries of members. In the operation using the skill level as the staff A, for example, an average of the levels of the members allocated to the staff A, the lowest level or the highest level or the levels may be used as the skill level of staff A.

Additionally, if it is assumed that the TOOL 121 is a concept indicating a group of tools which the ENTERPRISE 101 can utilize, it is possible to set the TOOL 121 in the same way as the POSITION 110. First, a list of tolls which the ENTERPRISE 101 can utilize is created. Next, each tool recorded in the list is allocated to any of the TOOL 121 as a tool constituting the TOOL 121. At the moment of this allocation, the ratio of execution ability of the tool, which is provided to the TOOL 121 where the tool is allocated, is set in a range between 0 to 1. The execution ability of the TOOL 121 is a total of the ratios of execution ability of the TOOLs allocated. The system is designed so that with respect to each tool, a sum total of ratios of execution ability to be provided to at least one TOOL 121 where the tool is allocated is not beyond 1.

Further, the system may be designed so that each of the definition portion 231, the simulation portion 232, and the evaluation operation portion 233 is provided in a physically different control unit 230, and necessary data may be obtained by data communication. There could be various kinds of the client to request a service and the service provider to provide the service, such as a case of an airplane (the client) and an airplane management company (the service provider), a case of an airport (the client) and an airport management company (the service provider), and a case of a building (the client) and a building management company (the service provider).

Further, the system may be designed so that the simulation can be executed in consideration of an action period of the client and an action period of the service provider. For example, it could be designed that the action start timing and action end timing of the client is set as the definition of the COP, the action start timing and action end timing of the service provider is set as the definition of the SOP, and in the simulation the client and the service provider can act only in their action period respectively. Thereby, in a case where the client is geographically far from the service provider, it is possible to execute the simulation more precisely. In addition, the sequence of procedure in each of the flow charts referred in the present invention can be changeable as long as the present invention can be realized.

The invention claimed is:

1. A process management support system for simulating a business process that a service provider provides as a service to at least one client, in order to evaluate the business process, the process management support system comprising:
   a client definition portion configured to define contents of action of each of the clients;
   a service definition portion configured to define a service to be provided by the service provider; and
   a simulation portion configured to simulate a process flow in which a request of service occurs due to the action of each client in a predetermined period, and the service is provided by the service provider, wherein:
   the client definition portion has:
      a COP definition device configured to correlate a plurality of actions executed by each client to a plurality of client operations (COPs) respectively and define for each client, a mode of progress of the COPs at the moment of the simulation;
      a COP correlating device configured to correlate each of the plurality of COPs to a service to be provided by the service provider to each of the COPs; and
      an occurrence conditions definition device configured to define a condition for making a request of service occur from each of the COPs, the service definition portion has:
      an SOP definition device configured to define a procedure through which the service provider provides the service correlated to the COP by executing a sequence of a plurality of service operations (SOPs), each SOP being a unit of operation to be correlated to a human resource or a material resource of the service provider, and
   the simulation portion has:
      a client operation progress device configured to specify a COP to be executed based on the mode of progress for each of the clients;
      a request occurrence device configured to make a request of the service occur based on the condition, the service being correlated to the COP specified by the client operation progress device; and
      a service provision device configured to, each time when the request occurs, execute operations for providing the service correlated to the specified COP by, as the procedure defined by the SOP definition device with respect to the service, executing each of the plurality of SOPs in the sequence defined using the human resource or the material resource correlated to each SOP.

2. The process management support system according to claim 1, wherein the COP correlating device defines for each of the requests which occur from each COP, attributes of the request.

3. The progress management support system according to claim 2, wherein
   the COP correlating device correlates the each of the COPs to data defined by the service definition portion with respect to the service to be provided to each of the COPs,
   the simulation portion executes the operations based on the data defined by the service definition portion, and
   an evaluation operation device configured to:
      manage data to be obtained due to a simulation by the simulation portion, the data being correlated to the service, and
      calculate an evaluation marker for evaluating a performance of the service provider that provides the service based on the data obtained.

4. The process management support system according to claim 3, wherein the evaluation operation device, based on the evaluation marker using the request as a unit, calculates statistics of the evaluation maker.

5. The process management support system according to claim 1, wherein:
   the service definition portion comprises:
      a group definition device configured to define a plurality of groups constituting each service provider; and
      a group allocation device configured to correlate each of the plurality of groups to any of the SOPs as a group who executes the SOP, the service provision device comprises:
      a handling SOP specification device configured to specify the SOP to be executed in accordance with a predetermined sequence;
      a queue record device configured to record the SOP specified in a waiting queue of the group correlated to the SOP; and
      an operation execution device configured to determine, from operations recorded in the waiting queue, an operation to be executed by the group correlated to the SOP, and make the correlated group execute the operation to be executed.

6. The process management support system according to claim 5, wherein
   the operation execution device records, in a case where it is necessary for the operation to be executed to be executed also by the other group, the operation to be executed in the waiting queue of the other groups, determines the operation to be executed next from the operations recorded in the waiting queue of the correlated group, and makes the correlated group execute the operation to be executed next.

7. The process management support system according to claim 1, wherein:
   the service definition portion comprises:
      a member definition device to define a plurality of members included in the service provider;
      a group allocation device to correlate to each of the SOPs, the group to execute the SOP; and
      a member allocation device to correlate at least one of the plurality of members to at least one of the plurality of groups, the member allocation device comprising:
      a workforce set device to set, with respect to each of the members, a workforce to be provided by the member to the at least one group correlated to the member;
      a workforce control device to control the workforce set device, so that a sum of the workforces is not beyond a predetermined upper limit, the workforces being provided by the member to the at least one group correlated to the member, and
      the service provision device makes a total of workforces set to the group, as a workforce of the group, influence operation velocity of the SOP which is executed by the group.

8. The process management support system according to claim 1, wherein:
   the service provision portion comprises:
      a tool definition device to define a plurality of tools utilized by each service provider;

a tool group allocation device to correlate to each of the SOPs, a tool group which is utilized to execute the SOP; and a tool allocation device to correlate at least one of the plurality of tools to at least one of the plurality of tool groups, the tool allocation device comprising:

an execution ability set device to set, with respect to each of the tools, execution ability to be provided by the tool to the at least one tool group correlated to the tool; and an execution ability control device to control the execution ability set device, so that a sum of the operation abilities is not beyond a predetermined upper limit, the operation ability being provided by the tool to the at least one tool group correlated to the tool, and the service provision device makes a total of set operation abilities in the tool group as a workforce of the tool group influence operation velocity of the SOP which is executed by the tool group.

9. The process management support system according to claim 2, wherein the service definition portion comprises:

a group definition device configured to define a plurality of groups constituting each service provider; and a group allocation device to correlate each of the plurality of groups to any of the SOPs as a group who executes the SOP, the service provision device comprises:

a handling SOP specification device to specify the SOP to be executed in accordance with a predetermined sequence;

a queue record device to record the SOP specified in a waiting queue of the group correlated to the SOP; and an operation execution device to determine, from operations recorded in the waiting queue, an operation to be executed by the group correlated to the SOP, and make the correlated group execute the operation to be executed.

10. The process management support system according to claim 3, wherein:

the service definition portion comprises:

a group definition device configured to define a plurality of groups constituting each service provider; and a group allocation device to correlate each of the plurality of groups to any of the SOPs as a group who executes the SOP, the service provision device comprises:

a handling SOP specification device to specify the SOP to be executed in accordance with a predetermined sequence;

a queue record device to record the SOP specified in a waiting queue of the group correlated to the SOP; and an operation execution device to determine, from operations recorded in the waiting queue, an operation to be executed by the group correlated to the SOP, and make the correlated group execute the operation to be executed.

11. The process management support system according to claim 4, wherein the service definition portion comprises:

a group definition device configured to define a plurality of groups constituting each service provider; and a group allocation device to correlate each of the plurality of groups to any of the SOPs as a group who executes the SOP, the service provision device comprises:

a handling SOP specification device to specify the SOP to be executed in accordance with a predetermined sequence;

a queue record device to record the SOP specified in a waiting queue of the group correlated to the SOP; and an operation execution device to determine, from operations recorded in the waiting queue, an operation to be executed by the group correlated to the SOP, and make the correlated group execute the operation to be executed.

12. The process management support system according to claim 2, wherein:

the service definition portion comprises:

a member definition device to define a plurality of members included in the service provider;

a group allocation device to correlate to each of the SOPs, the group to execute the SOP; and a member allocation device to correlate at least one of the plurality of members to at least one of the plurality of groups, the member allocation device comprising:

a workforce set device to set, with respect to each of the members, a workforce to be provided by the member to the at least one group correlated to the member;

a workforce control device to control the workforce set device, so that a sum of the workforces is not beyond a predetermined upper limit, the workforces being provided by the member to the at least one group correlated to the member, and the service provision device makes a total of workforces set to the group, as a workforce of the group, influence operation velocity of the SOP which is executed by the group.

13. The process management support system according to claim 3, wherein:

the service definition portion comprises:

a member definition device to define a plurality of members included in the service provider;

a group allocation device to correlate to each of the SOPs, the group to execute the SOP; and a member allocation device to correlate at least one of the plurality of members to at least one of the plurality of groups, the member allocation device comprising:

a workforce set device to set, with respect to each of the members, a workforce to be provided by the member to the at least one group correlated to the member;

a workforce control device to control the workforce set device, so that a sum of the workforces is not beyond a predetermined upper limit, the workforces being provided by the member to the at least one group correlated to the member, and the service provision device makes a total of workforces set to the group, as a workforce of the group, influence operation velocity of the SOP which is executed by the group.

14. The process management support system according to claim 4, wherein:

the service definition portion comprises:

a member definition device to define a plurality of members included in the service provider;

a group allocation device to correlate to each of the SOPs, the group to execute the SOP; and a member allocation device to correlate at least one of the plurality of members to at least one of the plurality of groups, the member allocation device comprising:

a workforce set device to set, with respect to each of the members, a workforce to be provided by the member to the at least one group correlated to the member;

a workforce control device to control the workforce set device, so that a sum of the workforces is not beyond a predetermined upper limit, the workforces being provided by the member to the at least one group correlated to the member, and the service provision device makes a total of workforces set to the group, as a workforce of the group, influence operation velocity of the SOP which is executed by the group.

15. The process management support system according to claim 2, wherein:

the service provision portion comprises:

a tool definition device to define a plurality of tools utilized by each service provider;

a tool group allocation device to correlate to each of the SOPs, a tool group which is utilized to execute the SOP; and a tool allocation device to correlate at least one of the plurality of tools to at least one of the plurality of tool groups, the tool allocation device comprising:

an execution ability set device to set, with respect to each of the tools, execution ability to be provided by the tool to the at least one tool group correlated to the tool; and an execution ability control device to control the execution ability set device, so that a sum of the operation abilities is not beyond a predetermined upper limit, the operation ability being provided by the tool to the at least one tool group correlated to the tool, and the service provision device makes a total of set operation abilities in the tool group as a workforce of the tool group influence operation velocity of the SOP which is executed by the tool group.

16. The process management support system according to claim 3, wherein:

the service provision portion comprises:

a tool definition device to define a plurality of tools utilized by each service provider;

a tool group allocation device to correlate to each of the SOPs, a tool group which is utilized to execute the SOP; and a tool allocation device to correlate at least one of the plurality of tools to at least one of the plurality of tool groups, the tool allocation device comprising:

an execution ability set device to set, with respect to each of the tools, execution ability to be provided by the tool to the at least one tool group correlated to the tool; and an execution ability control device to control the execution ability set device, so that a sum of the operation abilities is not beyond a predetermined upper limit, the operation ability being provided by the tool to the at least one tool group correlated to the tool, and the service provision device makes a total of set operation abilities in the tool group as a workforce of the tool group influence operation velocity of the SOP which is executed by the tool group.

17. The process management support system according to claim 4, wherein:

the service provision portion comprises:

a tool definition device to define a plurality of tools utilized by each service provider;

a tool group allocation device to correlate to each of the SOPs, a tool group which is utilized to execute the SOP; and a tool allocation device to correlate at least one of the plurality of tools to at least one of the plurality of tool groups, the tool allocation device comprising:

an execution ability set device to set, with respect to each of the tools, execution ability to be provided by the tool to the at least one tool group correlated to the tool; and an execution ability control device to control the execution ability set device, so that a sum of the operation abilities is not beyond a predetermined upper limit, the operation ability being provided by the tool to the at least one tool group correlated to the tool, and the service provision device makes a total of set operation abilities in the tool group as a workforce of the tool group influence operation velocity of the SOP which is executed by the tool group.

18. A computer-implemented simulation method for process management support that causes a computer to simulate a business process that a service provider provides as a service to at least one client to evaluate the business process, wherein the method causes the computer to execute steps comprising:

a client definition step of defining contents of action of each of the clients;

a service definition step of defining a service to be provided by the service provider; and a simulation step of simulating a process flow in which a request of service occurs due to the action of each client in a predetermined period, and the service is provided by the service provider, wherein:

the client definition step includes:

a COP definition step of correlating a plurality of actions executed by each client to a plurality of client operations (COPs) respectively and defining for each client, a mode of progress of the COPs at the moment of the simulation;

a COP correlating step of correlating each of the plurality of COPs to a service to be provided by the service provider to each of the COPs; and an occurrence conditions definition step of defining a condition for making a request of service occur from each of the COPs, the service definition step includes:

an SOP definition step of defining a procedure through which the service provider provides the service correlated to the COP by executing a sequence of a plurality of service operations (SOPs), each SOP being a unit of operation to be correlated to a human resource or a material resource of the service provider, and the simulation step includes:

a client operation progress step of specifying a COP to be executed based on the mode of progress for each of the clients;

a request occurrence step of making a request of the service occur based on the condition, the service being correlated to the COP specified by the client operation progress step; and a service provision step of, each time when the request occurs, executing operations for providing the service correlated to the specified COP by, as the procedure defined by the SOP definition step with respect to the service, executing each of the SOPs in the sequence defined using the human resource or the material resource correlated to each SOP.

19. The simulation method according to claim 18, wherein the COP correlating step defines attributes of the request for each of the requests which occur from each COP.

* * * * *